(12) United States Patent
Nagai et al.

(10) Patent No.: US 8,233,872 B2
(45) Date of Patent: Jul. 31, 2012

(54) RADIO-FREQUENCY COMMUNICATION DEVICE

(75) Inventors: Takuya Nagai, Nagoya (JP); Tsuyoshi Ohashi, Hashima (JP); Hironori Hirata, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 558 days.

(21) Appl. No.: 12/287,028

(22) Filed: Oct. 3, 2008

(65) Prior Publication Data

US 2009/0130981 A1 May 21, 2009

Related U.S. Application Data

(63) Continuation-in-part of application No. PCT/JP2007/055454, filed on Mar. 16, 2007.

(30) Foreign Application Priority Data

| Apr. 3, 2006 | (JP) | ................................. 2006-102031 |
| May 15, 2006 | (JP) | ................................. 2006-135531 |
| Jun. 26, 2006 | (JP) | ................................. 2006-175936 |
| Jun. 29, 2006 | (JP) | ................................. 2006-180160 |

(51) Int. Cl.
*H04B 1/10* (2006.01)
(52) U.S. Cl. ........................ 455/296; 455/278.1; 455/78
(58) Field of Classification Search .................... 455/78, 455/278.1, 296, 63.1, 67.11
See application file for complete search history.

(56) References Cited

U.S. PATENT DOCUMENTS

| 3,665,304 A | * | 5/1972 | Maybach | ........................ 324/85 |
| 5,428,831 A | * | 6/1995 | Monzello et al. | ............. 455/296 |
| 5,729,829 A | * | 3/1998 | Talwar et al. | ................ 455/63.1 |
| 7,756,480 B2 | * | 7/2010 | Loh | ............................... 455/63.1 |
| 2002/0072344 A1 | * | 6/2002 | Souissi | ......................... 455/296 |
| 2004/0106381 A1 | * | 6/2004 | Tiller | ............................. 455/73 |
| 2004/0160322 A1 | * | 8/2004 | Stilp | ............................ 340/572.1 |
| 2007/0206704 A1 | * | 9/2007 | Zhou et al. | ..................... 375/316 |

FOREIGN PATENT DOCUMENTS

| JP | 8-122429 A | | 5/1996 |
| JP | 10-62518 A | | 3/1998 |
| JP | 11-136173 A | | 5/1999 |
| JP | 11-163952 A | | 6/1999 |
| JP | 2000-286772 A | | 10/2000 |
| JP | 2002158599 A | * | 5/2002 |
| JP | 2005-328382 A | | 11/2005 |
| JP | 2006-33446 A | | 2/2006 |
| JP | 2006-41929 A | | 2/2006 |
| JP | 2006-81050 A | | 3/2006 |

* cited by examiner

*Primary Examiner* — Temesgh Ghebretinsae
*Assistant Examiner* — Gennadiy Tsvey
(74) *Attorney, Agent, or Firm* — McCarter & English LLP

(57) ABSTRACT

There is provided a radio-frequency communication device that can sufficiently eliminate a leakage signal from a transmission side included in a received signal. The communication device includes a cancel amplitude controlling unit 62 selectively suppressing supply of a cancel signal to a cancel signal synthesizing unit 52, a received-signal terminating unit 50 selectively terminating a received-signal input terminal 64*i*, a signal strength detecting unit 78 detecting a signal strength, a memory unit 82 storing a signal strength detected by the signal strength detecting unit 78, a signal strength comparing unit 80 comparing a plurality kinds of signal strengths read out from the memory unit 82, and a cancel signal controlling unit 72 controlling an amplitude and/or a phase of the cancel signal based on a result of the comparison by the signal strength comparing unit 80. Thus, suppressing the cancel signal by the cancel amplitude controlling unit 62 enables accurate detection of a strength of the received signal, as well as terminating the received signal by the received-signal terminating unit 50 enables accurate detection of a strength of the cancel signal.

16 Claims, 24 Drawing Sheets

RADIO-FREQUENCY COMMUNICATION DEVICE

CROSS REFERENCE TO RELATED APPLICATIONS

This application is a continuation-in-part of PCT/JP2007/055454 filed Mar. 16, 2007, which claimed priority to Japanese Patent Application Nos. 2006-102031, 2006-135531, 2006-180160 and 2006-175936, the contents of which are incorporated herein by reference.

TECHNICAL FIELD

The present invention relates to an improvement in a radio-frequency communication device that includes a cancellation circuit for suppressing a leakage signal from a transmission side.

BACKGROUND ART

There is known a radio-frequency communication device including a transmission section that transmits a predetermined transmitted signal via a transmission antenna and a reception section that receives, via a reception antenna, a reply signal returned in response to the transmitted signal. For example, there is illustrated a radio-frequency tag communication device (an interrogator) of an RFID (Radio-Frequency Identification) system that reads out information from a compact radio-frequency tag (a transponder) storing predetermined information, in a noncontacting manner. In the RFID system, even when the radio-frequency tag is dusty or located out of sight, communication between the radio-frequency communication device and the radio-frequency tag allows read-out of information stored in the tag. Thus, practical application of the system is expected in various fields such as product management and inspection processes.

Meanwhile, usually, the radio-frequency tag communication device transmits a predetermined transmitted signal (an interrogating wave) toward the radio-frequency tag via an antenna, as well as receives, via an antenna, a reply signal (a response wave) returned from the radio-frequency tag receiving the transmitted signal. In this manner, the communication device communicates information with the radio-frequency tag. Sometimes, the received reply signal includes a strong leakage signal (a direct wave) mixed from a transmission side, thereby resulting in increase in the entire signal strength of the received signal. Increased signal strength exceeds allowable amplifier input strength, thus inhibiting an amplifier from providing its sufficient amplifying effect. As a result, the amplifier cannot sufficiently amplify a reply signal component from the radio-frequency tag. Accordingly, there has been a problem of reducing an SN ratio (a signal-to-noise ratio).

In view of this, there is proposed a technique for eliminating a leakage signal from the transmission side, such as a carrier phase noise suppressing circuit described in Patent Literature 1. The technique generates a cancel signal having a frequency and a signal strength equal to those of a carrier component and a phase opposite to that of the carrier component, and then adds the cancel signal to a received signal to input to a reception circuit. This renders a signal having a large signal-to-noise ratio, thereby increasing reception sensitivity.

[Patent Literature 1] JP-A-1998-62518
[Patent Literature 2] JP-A-1996-122429

DISCLOSURE OF INVENTION

Problems to be Solved by the Invention

Eliminating sufficiently a leakage signal in a received signal by using the foregoing technique requires accurate detection of respective signal strengths of the received signal and a cancel signal. However, the conventional circuit, which has a difficulty in suitably separating them, cannot accurately detect the respective signal strengths of the signals. This hinders sufficient elimination of the leakage signal in the received signal. Thus, the development of a radio-frequency communication device has been demanded to sufficiently eliminate a leakage signal from a transmission side in a received signal.

In addition, signals such as a received signal and a cancel signal inevitably include some noise. Such noise cannot be reduced, although a leakage signal in a received signal can be reduced by synthesizing the cancel signal with the received signal. There exists limitation of improvement in the SN ratio. Furthermore, noise included in the received signal is added to noise in the cancel signal. The noise in the cancel signal becomes larger following to amplification of the cancel signal. Thus, amplifying the cancel signal so as to completely eliminate the leakage signal in the received signal leads to an increase in the noise in the cancel signal. This conversely causes a problem of reducing the SN ratio. In addition, increasing a suppressing amount of a leakage signal from the transmission side, namely, increasing an elimination rate thereof leads to extremely significant fluctuation of a synthesized signal due to a small fluctuation of a phase and an amplitude of the cancel signal. This is likely to destabilize signal reception, thus degrading the SN ratio and causing modulation error. Therefore, the development of a radio-frequency communication device has been demanded that improves an SN ratio while suitably eliminating a leakage signal from the transmission side included in a received signal.

The present invention has been made in view of the above circumstances, and has an object to provide a radio-frequency communication device that can sufficiently eliminate a leakage signal from the transmission side included in a received signal, and a radio-frequency communication device that improves the SN ratio while suitably eliminating the leakage signal from the transmission side included in the received signal.

Means for Solving the Problems

For achieving the above object, a first invention is relates to a radio-frequency communication device comprising a splitting unit splitting a carrier wave component of a transmitted signal transmitted via a transmission antenna, an amplitude controlling unit controlling an amplitude of the carrier wave component split by the splitting unit, a-phase controlling unit controlling a phase of the carrier wave component split by the splitting unit, and a cancel signal synthesizing unit adding a cancel signal generated with the carrier wave component via the amplitude controlling unit and the phase controlling unit to a received signal received via a reception antenna.

The radio-frequency communication device is characterized by a cancel signal supply suppressing unit that selectively suppresses supply of the cancel signal to the cancel signal synthesizing unit; a received-signal terminating unit that selectively terminates a received-signal input terminal from the reception antenna to the cancel signal synthesizing unit; a signal strength detecting unit that detects a strength of the cancel signal, the received signal, or a synthesized signal of the cancel signal and the received signal; a memory unit that stores the signal strength detected by the signal strength detecting unit; a signal strength comparing unit that compares a plurality kinds of signal strengths read out from the memory unit with each other, or compares the plurality kinds of signal strengths with the signal strength detected by the signal strength detecting unit; and a cancel signal controlling unit that controls an amplitude and/or a phase of the cancel signal via the amplitude controlling unit and/or the phase controlling unit based on a comparison result by the signal strength comparing unit.

For achieving the above object, a second invention relates to a radio-frequency communication device that transmits a transmitted signal via a transmission antenna, and receives, via a reception antenna, a reply signal returned from a communication object in response to the transmitted signal to thereby perform information communication with the communication object.

The radio-frequency communication device is characterized by a direct wave detecting unit that detects a direct wave component from a transmission side in a received signal received via the reception antenna; a signal processing unit that processes the direct wave component detected by the direct wave detecting unit; a cancel signal generating unit that generates a cancel signal suppressing the direct wave component from the transmission side in the received signal based on a processing result by the signal processing unit; and a cancel signal synthesizing unit that synthesizes the cancel signal generated by the cancel signal generating unit and the received signal received via the reception antenna.

For achieving the above object, a third invention relates to a radio-frequency communication device transmitting a transmitted signal via a transmission antenna and receiving, via a reception antenna, a reply signal returned from a communication object in response to the transmitted signal to perform information communication with the communication object.

The radio-frequency communication device is characterized by a transmission amplifier that modulates a carrier wave based on a predetermined transmission data to output the transmitted signal; a cancel signal generating unit that includes a cancel phase shifting unit controlling a phase of a cancel signal based on the carrier wave, and a cancellation amplifier having substantially the same characteristics as those of the transmission amplifier for amplifying the cancel signal; and a cancel signal synthesizing unit that adds a cancel signal generated by the cancel signal generating unit to a received signal received via the reception antenna.

For achieving the above object, a fourth invention relates to a radio-frequency communication device transmitting a transmitted signal via a transmission antenna, and receiving, via a reception antenna, a reply signal returned from a communication object in response to the transmitted signal to perform information communication with the communication object.

The radio-frequency communication device is characterized by a cancel signal generating unit that generates a cancel signal controlling a leakage signal from a transmission side based on a carrier wave component of the transmitted signal transmitted via the transmission antenna; a cancel signal synthesizing unit that synthesizes the cancel signal generated by the cancel signal generating unit and a received signal received via the reception antenna; a signal strength detecting unit that detects a signal strength of a synthesized signal synthesized by the cancel signal synthesizing unit; and a cancel signal controlling unit that controls a phase and/or an amplitude of the cancel signal such that a signal strength detected by the signal strength detecting unit falls within a predetermined designated range not including zero.

ADVANTAGES OF THE INVENTION

As described above, the first invention relates to the radio-frequency communication device comprising the splitting unit splitting a carrier wave component of a transmitted signal transmitted via a transmission antenna, the amplitude controlling unit controlling an amplitude of the carrier wave component split by the splitting unit, the phase controlling unit controlling a phase of the carrier wave component split by the splitting unit, and the cancel signal synthesizing unit adding a cancel signal generated with the carrier wave component via the amplitude controlling unit and the phase controlling unit to a received signal received via a reception antenna.

The first invention is characterized by the cancel signal supply suppressing unit that selectively suppresses supply of the cancel signal to the cancel signal synthesizing unit; the received-signal terminating unit that selectively terminates a received-signal input terminal from the reception antenna to the cancel signal synthesizing unit; the signal strength detecting unit that detects a strength of the cancel signal, the received signal, or a synthesized signal of the cancel signal and the received signal; the memory unit that stores the signal strength detected by the signal strength detecting unit; the signal strength comparing unit that compares a plurality kinds of signal strengths read out from the memory unit with each other, or compares the plurality kinds of signal strengths with the signal strength detected by the signal strength detecting unit; and the cancel signal controlling unit that controls an amplitude and/or a phase of the cancel signal via the amplitude controlling unit and/or the phase controlling unit based on a comparison result by the signal strength comparing unit.

Thus, suppressing the cancel signal by the cancel signal supply suppressing unit enables accurate detection of the strength of the received signal, whereas terminating the received signal by the received-signal terminating unit enables accurate detection of the strength of the cancel signal. Accordingly, there can be provided the radio-frequency communication device that can sufficiently eliminate the leakage signal from the transmission side included in the received signal.

In the first invention, preferably, the received-signal terminating unit includes a circuit switching unit that switches a circuit between the reception antenna and the received-signal input terminal, and a termination resistance connected to the circuit switching unit; and upon detection of the strength of the cancel signal, the circuit switching unit connects the received-signal input terminal to the termination resistance. In this manner, using the circuit switching unit to terminate a received signal allows a signal path upon reception and a termination path upon termination to be switched by the practical mode.

Preferably, the received-signal terminating unit includes, at a side of the reception antenna relative to the circuit switching unit and the termination resistance, a second circuit switching unit that switches a circuit between the reception antenna and the circuit switching unit and a second termination resistance connected to the second circuit switching unit, and upon detection of the strength of the cancel signal, the second circuit switching unit connects the reception antenna and the second termination resistance. In this manner, connecting the reception antenna to the termination resistance allows the condition of the reception antenna to be the same upon control of the cancel signal and upon reception. This enables the respective signal strengths of the received signal received via the reception antenna and the cancel signal to be more accurately detected.

Preferably, upon detection of the strength of the received signal, the cancel signal supply suppressing unit controls the amplitude of the carrier wave component such that an output from the amplitude controlling unit is maximally reduced. This can suppress supply of a cancel signal to the cancel signal synthesizing unit by the practical mode, without providing any additional structure.

Preferably, the cancel signal supply suppressing unit includes a third circuit switching unit that switches a circuit between the amplitude controlling unit and a cancel signal input terminal and a third termination resistance connected to the third circuit switching unit, the cancel signal supply suppressing unit connecting the cancel signal input terminal and the third termination resistance upon detection of the strength of the received signal. In this manner, using the third circuit switching unit enables an input of the cancel signal to the cancel signal input terminal to be maximally suppressed. Additionally, reducing maximally an output from the amplitude controlling unit enables suppression of reflection toward the cancellation circuit.

Preferably, the transmission antenna and the reception antenna are individually provided as separate antennas. This can maximally reduce influence on the transmission side upon control of the cancel signal.

Preferably, the transmission antenna and the reception antenna are integrally provided as an antenna commonly used for transmission and reception. This can maximally simplify the structure of the device.

Preferably, upon detection of the strength of the cancel signal, the transmission antenna transmits a transmitted signal having a signal strength smaller than that of a transmitted signal to communicate with a predetermined communication object. This can prevent transmission of an unnecessarily large transmitted signal, thereby achieving power consumption reduction and suppressing influence on other stations.

Preferably, first, in a state allowing the cancel signal supply suppressing unit to suppress cancel signal supply to the cancel signal synthesizing unit, the cancel signal controlling unit allows the signal strength detecting unit to detect a strength of the received signal and then allows the memory unit to store a result of the detection; next, in a state releasing the suppression of the cancel signal supply to the cancel signal synthesizing unit and allowing the received-signal terminating unit to terminate the received-signal input terminal, the cancel signal controlling unit controls an amplitude of the cancel signal such that a cancel signal strength detected by the signal strength detecting unit is made equal to the strength of the received signal stored in the memory unit; and then, in a state releasing the termination of the received-signal input terminal by the received-signal terminating unit, the cancel signal controlling unit controls a phase of a cancel signal such that the strength of a synthesized signal of a received signal and the cancel signal detected by the signal strength detecting unit is maximally reduced. In this manner, controlling separately the amplitude of and the phase of the cancel signal can facilitate the control of the cancel signal.

Preferably, first, in a state allowing the cancel signal supply suppressing unit to suppress cancel signal supply to the cancel signal synthesizing unit, the cancel signal controlling unit allows the signal strength detecting unit to detect a strength of each of an in-phase component and a quadrature component of the received signal and then allows the memory unit to store a result of the detection; next, in a state releasing the suppression of the cancel signal supply to the cancel signal synthesizing unit and allowing the received-signal terminating unit to terminate the received-signal input terminal, the cancel signal controlling unit controls the amplitude and/or the phase of the cancel signal such that a strength of each of the in-phase component and the quadrature component of the cancel signal detected by the signal strength detecting unit is made equal to the strength of each of the in-phase and the quadrature components of the received signal stored in the memory unit; and then, after controlling the phase of the cancel signal to be rotated by 180 degrees, the cancel signal controlling unit releases the termination of the received-signal input terminal by the received-signal terminating unit. In this manner, controlling simultaneously the amplitude of and the phase of the cancel signal enables the cancel signal to be controlled in a relatively short time.

Preferably, first, in a state allowing the cancel signal supply suppressing unit to suppress cancel signal supply to the cancel signal synthesizing unit, the cancel signal controlling unit allows the signal strength detecting unit to detect respective strengths of an in-phase component and a quadrature component of the received signal and then allows the memory unit to store a result of the detection; next, in a state releasing the suppression of the cancel signal supply to the cancel signal synthesizing unit and allowing the received-signal terminating unit to terminate the received-signal input terminal, the cancel signal controlling unit controls the amplitude and/or the phase of the cancel signal such that respective in-phase and quadrature components of the cancel signal detected by the signal strength detecting unit are made equal to the respective strengths of the in-phase and the quadrature components of the received signal stored in the memory unit, whereas plus and minus signs of the in-phase and the quadrature components of the cancel signal are opposite to those of the in-phase and the quadrature components of the received signal; and then the cancel signal controlling unit releases the termination of the received-signal input terminal by the received-signal terminating unit. In this manner, the amplitude of and the phase of the cancel signal is simultaneously controlled, as well as phase rotation is not required. This enables the cancel signal to be controlled in a maximally short time.

Preferably, the cancel signal controlling unit executes the cancel signal control prior to transmission of information to the predetermined communication object. This enables a reception condition to be made suitable before communicating with the communication object.

Preferably, the cancel signal controlling unit executes the cancel signal control during transmission of information to the predetermined communication object. This enables a reception condition to be made suitable upon reception of the transmitted signal transmitted from the communication object.

Preferably, the cancel signal controlling unit executes the cancel signal control at every switching of a frequency of the transmitted signal. This enables the leakage signal from the transmission side changing with the frequency of the transmitted signal to be suitably suppressed by the cancel signal set at every switching of the frequency thereof.

Preferably, the cancel signal controlling unit executes the cancel signal control, when the strength of the synthesized signal of the received signal and the cancel signal detected by the signal strength detecting unit is equal to or larger than a predetermined value. This enables the timing for requiring control of the cancel signal to be suitably determined.

Preferably, the transmission antenna includes an array antenna having a plurality of transmission antenna elements as the transmission antenna and a transmission phase controlling unit that controls respective phases of transmitted signals sent to the respective transmission antenna elements to control a transmission directivity, and upon a phase change of the transmission phase controlling unit, the cancel signal controlling unit executes the cancel signal control. This enables the leakage signal from the transmission side changing with a weight for the array antenna to be suitably suppressed by the cancel signal set at every switching of the antenna weight.

Preferably, the reception antenna includes an array antenna having a plurality of reception antenna elements and a reception phase controlling unit that controls respective phases of received signals sent from the respective reception antenna elements to control a reception directivity, and upon a phase change of the reception phase controlling unit, the cancel signal controlling unit executes the cancel signal control. This enables the leakage signal from the transmission side changing with a weight for the array antenna to be suitably suppressed by the cancel signal set at every switching of the weight.

Preferably, the radio-frequency communication device is further comprised of a homodyne detection circuit as a demodulating unit for the received signal. In this manner, in a homodyne detection circuit particularly greatly influenced by a leakage signal from the transmission side, the leakage signal from the transmission side can be suitably suppressed.

Preferably, the radio-frequency communication device is a radio-frequency communication tag device that transmits a predetermined transmitted signal via the transmission antenna to a radio-frequency tag, and receives, via the reception antenna, a reply signal returned from the radio-frequency tag in response to the transmitted signal to perform information communication with the radio-frequency tag. In this manner, in the radio-frequency tag communication device particularly greatly influenced by a leakage signal from the transmission side, the leakage signal from the transmission side can be suitably suppressed.

The second invention relates to the radio-frequency communication device that transmits the transmitted signal via the transmission antenna, and receives, via the reception antenna, the reply signal returned from the communication object in response to the transmitted signal to thereby perform information communication with the communication object. The radio-frequency communication device is characterized by the direct wave detecting unit that detects the direct wave component from a transmission side in the received signal received via the reception antenna the signal processing unit that processes the direct wave component detected by the direct wave detecting unit; the cancel signal generating unit that generates a cancel signal suppressing the direct wave component from the transmission side in the received signal based on a processing result by the signal processing unit; and the cancel signal synthesizing unit that synthesizes the cancel signal generated by the cancel signal generating unit and the received signal received via the reception antenna.

This enables accurate detection of a direct wave, namely, a leakage signal from the transmission side, thereby suitably controlling the cancel signal based on a the detection result. Thus, there can be provided a radio-frequency communication device that can sufficiently eliminate a leakage signal from the transmission side included in a received signal.

In the second invention, preferably, the cancel signal generating unit includes a cancel phase controlling unit controlling a phase of the cancel signal and/or a cancel amplitude controlling unit controlling an amplitude of the cancel signal. Thereby, the cancel signal can be controlled by the practical mode.

Preferably, the radio-frequency communication device further comprises a circuit switching unit that switches a first circuit supplying the received signal received via the reception antenna to the signal processing unit, and a second circuit supplying the direct wave component detected by the direct wave detecting unit to the signal processing unit. This can simplify the structure of the circuit.

Preferably, the radio-frequency communication device further comprises an A/D converting unit that digitally converts the received signal received via the reception antenna or the direct wave component detected by the direct wave detecting unit to supply the converted signal or component to the signal processing unit. This enables various processings regarding the received signal or the direct wave component to be performed by digital signal processing.

Preferably, the direct wave detecting unit includes a direct wave extracting unit that extracts the direct wave component in the received signal in accordance with a difference between the received signal received via the reception antenna and a predetermined reference signal; a reference adjusting unit provided between the direct wave extracting unit and the A/D converting unit to determine a reference value of the A/D converting unit, and a switch that connects or disconnects a circuit between the direct wave extracting unit and the reference adjusting unit. Thereby, the direct wave component included in the received signal can be detected by the practical mode.

Preferably, the signal processing unit calculates a calculation value for determining the phase and/or the amplitude of the cancel signal based on the reference value and an actual output value in the digital conversion of the direct wave component by the A/D converting unit, using a predetermined relationship; and the cancel signal generating unit controls the phase and/or the amplitude of the cancel signal based on the calculation value using a predetermined relationship. This enables the cancel signal to be suitably controlled based on the direct wave component.

Preferably, the signal processing unit includes a memory unit storing a signal supplied from the A/D converting unit to allow the memory unit to store the reference value prior to the digital conversion of the direct wave component by the A/D converting unit. This enables the direct wave component to be suitably processed based on a reference value stored in the memory unit.

Preferably, comprising a quadrature demodulating unit that demodulates the received signal received via the reception antenna as mutually quadrature I-phase component and Q-phase component. In this manner, in a quadrature detection circuit particularly greatly influenced by a leakage signal from the transmission side, a leakage signal from the transmission side can be suitably suppressed within a broad phase range.

Preferably, the direct wave detecting unit, the A/D converting unit and the circuit switching unit are provided corresponding to each of the I-phase component and the Q-phase component demodulated by the quadrature demodulating unit. This enables immediate detection of a direct wave component corresponding to each of the I-phase and the Q-phase components.

Preferably, the direct wave detecting unit, the A/D converting unit and the circuit switching unit are provided corresponding to each of the I-phase component and the Q-phase component demodulated by the quadrature demodulating unit; and further comprising a reference adjusting unit provided between the direct wave extracting unit and the A/D converting unit corresponding to each of the I-phase component and the Q-phase component to determine reference values of the A/D converting units, a switch that connects or disconnects a circuit between the direct wave extracting unit and the reference adjusting unit corresponding to each of the I-phase component or the Q-phase component, and a second circuit switching unit that switches a first circuit supplying an output from the direct wave extracting unit provided corresponding to the I-phase component to the switch and a second circuit supplying an output from the direct wave extracting unit provided corresponding to the Q-phase component to the switch. This enables a direct wave component corresponding to each of the I-phase and the Q-phase components to be detected by the simplified circuit.

Preferably, regarding each of the I-phase and the Q-phase components supplied via the direct wave detecting unit and the A/D converting unit, the signal processing unit calculates an calculation value determining the phase and/or the amplitude of the cancel signal based on a reference value and an actual output value by the digital conversion by the A/D converting unit using a predetermined relationship. This enables calculation of an operation value for controlling the cancel signal based on the direct wave component.

Preferably, regarding each of the I-phase and the Q-phase components supplied via the direct wave detecting unit and the A/D converting unit, the signal processing unit obtains a difference between the reference value and the actual output value by the digital conversion by the A/D converting unit to calculate a square root of a sum of squares of the respective differences corresponding to the I-phase and the Q-phase components as the calculation value. This enables calculation of an operation value for controlling the cancel signal based on the direct wave component by the practical mode.

Preferably, the cancel signal generating unit controls the phase and/or the amplitude of the cancel signal such that the calculation value calculated by the signal processing unit is maximally reduced. This enables the cancel signal to be controlled based on the operation value by the practical mode.

Preferably, the cancel signal generating unit controls the phase and/or the amplitude of the cancel signal based on a larger one of the difference between the reference value and the actual output value in the digital conversion by the A/D converting unit calculated corresponding to the I-phase component, and the difference between the reference value and the actual output value in the digital conversion by the A/D converting unit calculated corresponding to the Q-phase component by the signal processing unit. This enables the cancel signal to be controlled based on the operation value by the practical mode.

Preferably, the signal processing unit processes the direct wave component in the received signal received via the reception antenna in response to a carrier wave or a signal including a predetermined command transmitted via the transmission antenna. This enables processings such as detection of the direct wave component and control of the cancel signal to be performed for both the carrier wave not including a command and the signal including a command.

Preferably, the communication object is a radio-frequency tag that enables writing and/or reading of information via a radio-frequency communication; and the radio-frequency communication device transmits a predetermined transmitted signal to the radio-frequency tag by the transmission antenna, and receives, via the reception antenna, a reply signal returned from the radio-frequency tag in response to the transmitted signal to perform information communication with the radio-frequency tag. In this manner, in a radio-frequency tag communication device particularly greatly influenced by a leakage signal from the transmission side, the leakage signal from the transmission side can be suitably suppressed.

The third invention relates to the radio-frequency communication device transmitting a transmitted signal via a transmission antenna and receiving, via a reception antenna, the reply signal returned from a communication object in response to the transmitted signal to perform information communication with the communication object.

The radio-frequency communication device is characterized by the transmission amplifier that modulates a carrier wave based on a predetermined transmission data to output the transmitted signal; the cancel signal generating unit that includes a cancel phase shifting unit controlling a phase of a cancel signal based on the carrier wave, and a cancellation amplifier having substantially the same characteristics as those of the transmission amplifier for amplifying the cancel signal; and the cancel signal synthesizing unit that adds a cancel signal generated by the cancel signal generating unit to a received signal received via the reception antenna.

Thus, the cancellation amplifier having substantially the same characteristics as those of the transmission amplifier used in the transmission circuit is used in the cancellation circuit. This can maximally equalize the characteristics of noise included in the leakage signal from the transmission side with the characteristics of noise included in the cancel signal. Additionally, adding the cancel signal to the received signal enables such noise to be suitably reduced. Accordingly, there can be provided the radio-frequency communication device that can improve an SN ratio while suitably eliminating the leakage signal from a transmission side included in the received signal.

In the third invention, the transmission antenna is an array antenna comprised of a plurality of antenna elements, and includes a transmission amplifier having, in response to each of the antenna elements, substantially the same characteristics as those of the cancellation amplifier. In this manner, in the radio-frequency communication device including the practical array antenna, the SN ratio can be maximally improved while suitably eliminating a leakage signal from the transmission side included in the received signal.

Preferably, the transmission amplifier and the cancellation amplifier are variable gain amplifiers capable of varying an amplification factor thereof. In this manner, changing the respective amplification factors of the transmission amplifier and the cancellation amplifier as needed enables the SN ratio to be maximally improved while more suitably eliminating the leakage signal from the transmission side included in the received signal.

Preferably, comprising a transmission filter disposed in a signal transmission path between the transmission amplifier and the transmission antenna, and a cancellation filter disposed in a signal transmission path between the cancellation amplifier and the cancel signal synthesizing unit and having substantially the same characteristics as those of the transmission filter. In this manner, the cancellation filter having substantially the same characteristic as that of the transmission filter used in the transmission circuit is provided in the cancellation circuit. This can maximally equalize the characteristics of noise included in a leakage signal from the transmission side with the characteristics of noise included in a cancel signal.

Preferably, the cancel signal generating unit generates the cancel signal by controlling, via the cancellation amplifier, an amplitude of a carrier wave component of the transmitted signal transmitted via the transmission antenna. This provides an advantage that no variable attenuator or the like is additionally needed to control an amplitude of the cancel signal.

Preferably, the cancel signal generating unit generates the cancel signal by modulating, via the cancellation amplifier, the carrier wave component of the transmitted signal transmitted via the transmission antenna based on the transmission data. This can maximally equalize the characteristics of noise included in a leakage signal from the transmission side with the characteristics of noise included in the cancel signal.

Preferably, the radio-frequency communication device further comprises a phase shifting unit controlling-a phase of the transmitted signal transmitted via the transmission antenna or a phase of the received signal received via the reception antenna. In this manner, in the practical radio-frequency communication device capable of performing phased array control, the SN ratio is improved while suitably eliminating the leakage signal from a transmission side included in the received signal.

Preferably, the phase shifting unit has substantially the same characteristics as those of the cancel phase shifting unit. In this manner, there is provided the phase shifting unit that has substantially the same characteristics as those of the cancel phase shifting unit used in the cancellation circuit. This can maximally equalize the characteristics of noise included in the leakage signal from the transmission side with the characteristics of noise included in the cancel signal upon phased array control.

Preferably, the radio-frequency communication device further comprises a cancel signal controlling unit that controls a phase and/or an amplitude of the cancel signal generated by the cancel signal generating unit such that the amplitude of the cancel signal is made equal to that of the received signal and the phase of the cancel signal is made opposite to that of the received signal, received via the reception antenna. This can maximally eliminate the leakage signal from the transmission side included in the received signal.

Preferably, the radio-frequency communication device is a radio-frequency communication tag device that transmits a predetermined transmitted signal via the transmission antenna to a radio-frequency tag as the communication object, and receives, via the reception antenna, a reply signal returned from the radio-frequency tag in response to the transmitted signal to perform information communication with the radio-frequency tag. In this manner, in the radio-frequency tag communication device particularly greatly influenced by the leakage signal from the transmission side, the SN ratio can be improved while suitably eliminating the leakage signal from the transmission side.

The fourth invention relates to a radio-frequency communication device transmitting a transmitted signal via a transmission antenna, and receiving, via a reception antenna, a reply signal returned from a communication object in response to the transmitted signal to perform information communication with the communication object.

The radio-frequency communication device is characterized by the cancel signal generating unit that generates a cancel signal controlling a leakage signal from a transmission side based on a carrier wave component of the transmitted signal transmitted via the transmission antenna; the cancel signal synthesizing unit that synthesizes the cancel signal generated by the cancel signal generating unit and a received signal received via the reception antenna; the signal strength detecting unit that detects a signal strength of a synthesized signal synthesized by the cancel signal synthesizing unit; and the cancel signal controlling unit that controls a phase and/or an amplitude of the cancel signal such that a signal strength detected by the signal strength detecting unit falls within a predetermined designated range not including zero.

Thus, the cancel signal is amplified such that the leakage signal included in the received signal is not completely but necessarily and sufficiently cancelled. This enables an increase in noise included in the cancel signal to be suppressed, resulting in suppression of reduction in the SN ratio. Additionally, the leakage signal from the transmission side is not suppressed more than necessary. Thus, fluctuation of the synthesized signal due to fluctuation of the phase and the amplitude of the cancel signal can be maximally reduced, thereby stabilizing reception. Therefore, there can be provided a radio-frequency communication device that can improve the SN ratio while suitably eliminating the leakage signal from the transmission side in the received signal, thereby enabling stable reception.

Preferably, the cancel signal is controlled such that the leakage signal included in the received signal is necessarily and sufficiently cancelled. Accordingly, the cancel signal can be controlled easier than the control to cancel the leakage signal completely, and the cancel signal is allowed to be converged quickly.

In the fourth invention, preferably, the signal strength detecting unit detects a signal strength of the received signal received via the reception antenna; and the cancel signal controlling unit controls the amplitude of the cancel signal such that a signal strength of the cancel signal is made smaller than the signal strength of the received signal detected by the signal strength detecting unit. In this manner, suppressing amplification of the cancel signal to a small extent enables suppression of an increase in noise included in the cancel signal.

Preferably, the cancel signal controlling unit controls the cancel signal such that the signal strength of the synthesized signal detected by the signal strength detecting unit falls within the predetermined range and the signal strength of the cancel signal is maximally reduced. This enables the cancel signal to be amplified by the practical mode so as to necessarily and sufficiently eliminate the leakage signal from the transmission side.

Preferably, the radio-frequency communication device further comprises a quadrature demodulating unit that executes quadrature-demodulation of the synthesized signal output from the cancel signal generating unit, and wherein the signal strength detecting unit detects a signal strength of a direct current component of a demodulated signal demodulated by the quadrature demodulating unit. This enables the signal strengths of the synthesized signal and the received signal to be detected by the practical mode.

Preferably, the radio-frequency communication device further comprises a splitting unit that splits the synthesized signal output from the cancel signal synthesizing unit into parts, and wherein the signal strength detecting unit detects a signal strength of the part of the synthesized signal split by the splitting unit. This enables the signal strengths of the synthesized signal and the received signal to be detected by the practical mode.

Preferably, upon initial setting of the cancel signal, a carrier wave is transmitted via the transmission antenna to allow the cancel signal controlling unit to control a cancel signal in accordance with a received signal received via the reception antenna in response to the carrier wave, and the amplitude and/or the phase of the cancel signal are/is stored in the memory unit as initial values at a moment when the signal strength of the synthesized signal detected by the signal strength detecting unit falls within the predetermined range. This enables the cancel signal to be amplified by the practical mode so as to necessarily and sufficiently eliminate the leakage signal from the transmission side.

Preferably, after the initial setting of the cancel signal, the cancel signal controlling unit controls the phase and/or the amplitude of the cancel signal based on the initial values stored in the memory unit. This enables the cancel signal to be maximally immediately converged based on the initial value stored in the memory unit.

Preferably, the memory unit stores the phase and/or the amplitude of the cancel signal as a control history of the cancel signal whenever necessary, and when the signal strength of the synthesized signal detected by the signal strength detecting unit is outside the predetermined range upon control of the phase and/or the amplitude of the cancel signal based on the initial values stored in the memory unit, the cancel signal controlling unit controls the phase and/or the amplitude of the cancel signal based on the control history stored in the memory unit. This enables the cancel signal to be maximally immediately converged based on the initial value and the control history stored in the memory unit.

Preferably, the radio-frequency communication device further comprises an amplifying unit that amplifies the synthesized signal output from the cancel signal synthesizing unit, and a quadrature demodulating unit that executes quadrature-demodulation of the synthesized signal amplified by the amplifying unit, and wherein the predetermined range is determined in advance such that the signal strength of the cancel signal is maximally reduced within a range causing no saturation of the amplifying unit or the quadrature demodulating unit. In this manner, suppressing amplification of the cancel signal to a maximally small extent can suppress an increase in noise included in the cancel signal.

Preferably, the predetermined range is less than a saturation-starting input value of the amplifying unit or the quadrature demodulating unit, and is within a range from the saturation-starting input value to 3 or 10 dB. This can suitably prevents saturation of the amplifying unit or the quadrature demodulating unit, as well as can necessarily and sufficiently eliminates the leakage signal from the transmission side.

Preferably, the predetermined range corresponds to a ringed region surrounding a predetermined region where the synthesized-signal strength is minimal in an xy orthogonal projection of a three-dimensional quadrature coordinate system with an x axis representing the amplitude of the cancel signal, a y axis representing the phase of the cancel signal, and a z axis representing the synthesized-signal strength. In this manner, suppressing amplification of the cancel signal to a small extent can suppress an increase in noise included in the cancel signal.

Preferably, the radio-frequency communication device further comprises a transmission and reception common antenna used as the transmission antenna and the reception antenna, wherein the transmission and reception common antenna is connected to a transmission-side circuit and a reception-side circuit via a transmission and reception separating unit. In this manner, in the radio-frequency communication device including the practical transmission and reception common antenna, the SN ratio can be improved while suitably eliminating a leakage signal from the transmission side included in a received signal.

Preferably, the radio-frequency communication device is a radio-frequency communication tag device that transmits a predetermined transmitted signal to a radio-frequency tag as a communication object via a transmission antenna, and receives, via the reception antenna, a reply signal returned from the radio-frequency tag in response to the transmitted signal to perform information communication with the radio-frequency tag. In this manner, in the radio-frequency tag communication device particularly greatly influenced by the leakage signal from the transmission side, the SN ratio can be improved while suitably eliminating the leakage signal from the transmission side.

Figure 1:
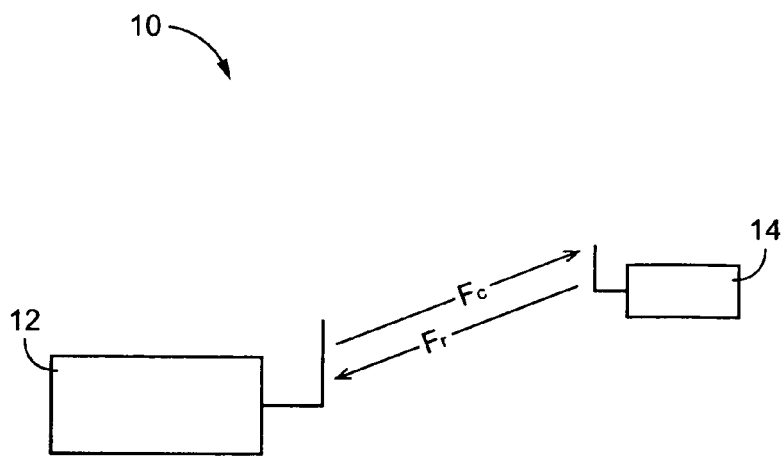
FIG. 1 is an illustration of a radio-frequency tag communication system suitably using a radio-frequency communication device of the present invention.

10: radio-frequency tag communication system
12, 84, 92, 98: radio-frequency tag communication device
14: radio-frequency tag 16: radio-frequency tag circuit element 18: antenna
20: IC circuit section 22: rectifying unit 24: power supply unit
26: clock extracting unit 28: memory unit 30: modulating and demodulating unit
32: controlling unit 34: central controlling unit 36: carrier wave generating unit
38: first splitter 40: second splitter 42: transmission amplifier
44: transmission antenna 46: cancel signal generating unit 48: reception antenna
50, 86: received-signal terminating unit 52: cancel signal synthesizing unit
54: quadrature demodulating unit 56: cancel phase control signal D/A converting unit
58: cancel amplitude control signal D/A converting unit
60: cancel phase controlling unit 62: cancel amplitude controlling unit
64: circuit switching unit 64i: received-signal input terminal
66: termination resistance 68: transmission controlling unit
70: transmission information outputting unit 72: cancel signal controlling unit
74: cancel signal supply suppression controlling unit
76: received-signal termination controlling unit
78: signal strength detecting unit 80: signal strength comparing unit
82: memory unit 88: second circuit switching unit
90: second termination resistance 94: third circuit switching unit
94i: cancel signal input terminal 96: third termination resistance
100: array antenna 102: antenna elements 104: reception separating units
106: received-signal synthesizing unit 108: phase controlling units
110: directivity controlling unit 112: phase control signal D/A converting units
114: first low pass filter 116: first A/D converting unit 118: second low pass filter
120: second A/D converting unit 212, 284: radio-frequency tag communication device
216: antenna 218: transmitting and receiving unit 220: local oscillator
222: cancel signal generating unit 224: cancel signal synthesizing unit
226: quadrature demodulating unit 228: I-phase direct wave detecting unit
230: I-phase band pass filter 232: I-phase A/D converting unit
234: I-phase circuit switching unit 236: Q-phase direct-wave detecting unit
238: Q-phase band pass filter 240: Q-phase A/D converting unit
242: Q-phase circuit switching unit 244: signal processing unit
246: controlling unit 248: variable phase shifter 250: variable attenuator
252: I-phase direct wave extracting unit 254: I-phase reference adjusting unit
256: I-phase switch 258: Q-phase direct wave extracting unit
260: Q-phase reference adjusting unit 262: Q-phase switch
264: memory unit 286: reference adjusting unit 288: switch
290: second circuit switching unit 312: radio-frequency tag communication device
318: array antenna 320: local oscillator 322: carrier-wave amplifying unit
324: transmission and reception modules 326: antenna elements
328: received-signal synthesizing unit 330, 400, 404, 408: cancel signal generating unit 332: cancel signal synthesizing unit 334: variable amplifying unit
336: homodyne detection circuit 338: I-phase LPF 340: I-phase A/D converting unit
342: I-phase memory unit 344: Q-phase LPF 346: Q-phase A/D converting unit
348: Q-phase memory unit 350: transmission and reception phase controlling unit
352: transmission data generating unit 354: cancel phase controlling unit
356: cancel amplitude controlling unit 358: cancel phase shifting unit
360: cancellation amplifier 362: cancellation attenuator 364: switch
366: transmission phase shifting unit 368: transmission amplifier
370: transmission filter 372: transmission and reception separating unit
374: reception phase shifting unit 402: cancellation filter
406: multiplying unit 410: RF switch
412, 480: radio-frequency tag communication device
420: local oscillator 422: transmission amplifier
424: transmission and reception separating unit
426: antenna 428: cancel signal synthesizing unit 430: local signal amplifying unit
432: cancel signal generating unit 434: synthesized-signal amplifying unit
436: quadrature demodulating unit 438: A/D converter
440,484: signal strength detecting unit 442: controlling unit
444: variable phase shifting unit 446: variable attenuating unit 448: memory unit
450: cancel signal controlling unit 482: splitting unit

BEST MODE FOR CARRYING OUT THE INVENTION

Hereinafter, preferred embodiments of the present invention will be described in detail based on drawings.
[Embodiments]
FIG. 1 is a diagram illustrating a radio-frequency i.e. wireless tag communication system 10 suitably using a radio-frequency communication device of a first invention. The radio-frequency tag communication system 10 is a so-called RFID (Radio Frequency Identification) system including a radio-frequency tag communication device 12 as one embodiment of the radio-frequency communication device of the first invention, and a singular or plurality of radio-frequency tags 14 (FIG. 1 shows a single tag) as a communication object for the radio-frequency tag communication device 12. The radio-frequency tag communication device 12 serves as an interrogator in the RFID system, and the radio-frequency tag 14 serves as a transponder in the system.

Specifically, the radio-frequency tag communication device 12 transmits an interrogating wave $F_c$ (a transmitted signal) to the radio-frequency tag 14. The radio-frequency tag 14 receives the interrogating wave $F_c$ to modulate it based on a predetermined information signal (a transmission data) and returns as a response wave $F_r$ (a reply signal) to the radio-frequency tag communication device 12. In this manner, the radio-frequency tag communication device 12 communicates information with the radio-frequency tag 14. The radio-frequency tag communication system 10 is, for example, used for product management and the like in a predetermined communication area. Preferably, the radio-frequency tag 14 is integrally provided with a product, for example, by attaching it on the product as a controlled object.

Figure 2:
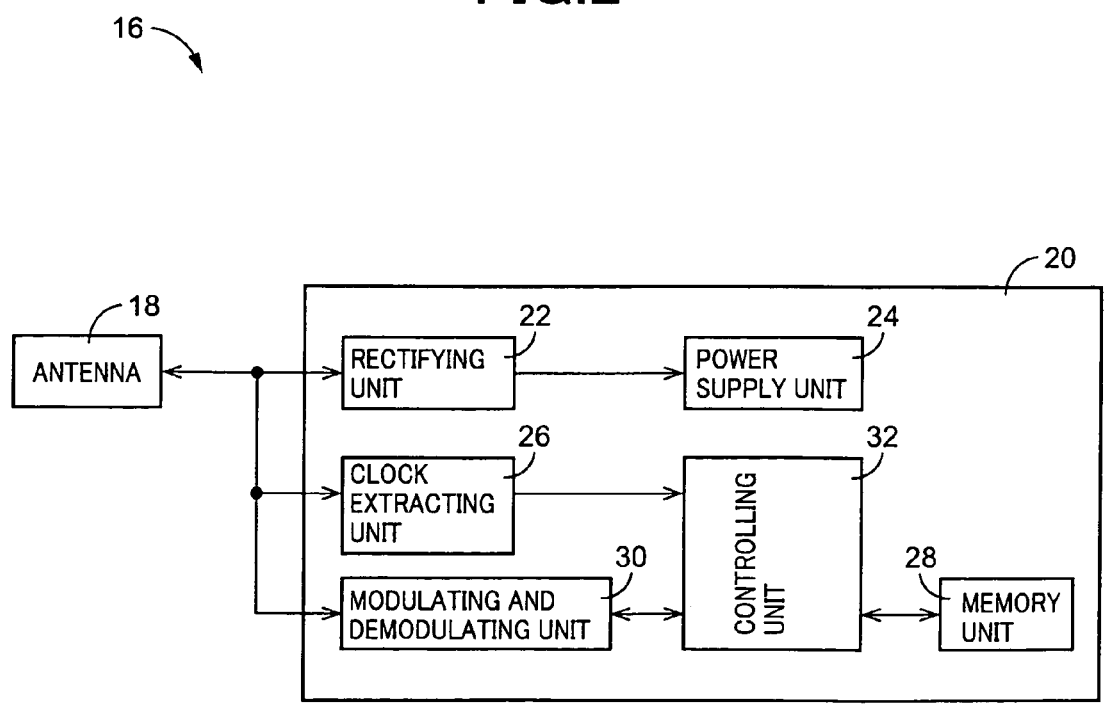
FIG. 2 is an illustration of a structure of a radio-frequency tag circuit element incorporated in a radio-frequency tag as a communication object for the radio-frequency communication device of the present invention.

FIG. 2 is a diagram illustrating a structure of a radio-frequency tag circuit element 16 incorporated in the radio-frequency tag 14. As shown in FIG. 2, the radio-frequency tag circuit element 16 is constructed by an antenna 18 used for communication with the radio-frequency tag communication device 12, and an IC circuit section 20 connected to the antenna 18 to process signals transmitted from the radio-frequency tag communication device 12.

The IC circuit section 20 functionally includes a rectifying unit 22 that rectifies the interrogating wave $F_c$ transmitted from the radio-frequency tag communication device 12 and received by the antenna 18, a power supply unit 24 that accumulates energy of the interrogating wave $F_c$ rectified by the rectifying unit 22, a clock extracting unit that extracts a clock signal from a carrier wave received by the antenna 18 to supply to a controlling unit 32, a memory unit 28 that serves as a memory unit capable of storing a predetermined information signal, a modulating and demodulating unit 30 i.e. modulating/demodulating unit 30 connected to the antenna 18 to modulate and demodulate a signal, and the controlling unit 32 that controls operation of the radio-frequency tag circuit element 16 via the rectifying unit 22, the clock extracting unit 26, the modulating and demodulating unit 30, and the like.

The controlling unit 32 communicates with the radio-frequency tag communication device 12 to execute basic controls such as a control of storing the predetermined information in the memory unit 28, and a control of allowing the modulating and demodulating unit 30 to modulate the interrogating wave $F_c$ received by the antenna 18 based on the information signal stored in the memory unit 28 so as to reflectively return as the response wave $F_r$ from the antenna 18.

Figure 3:
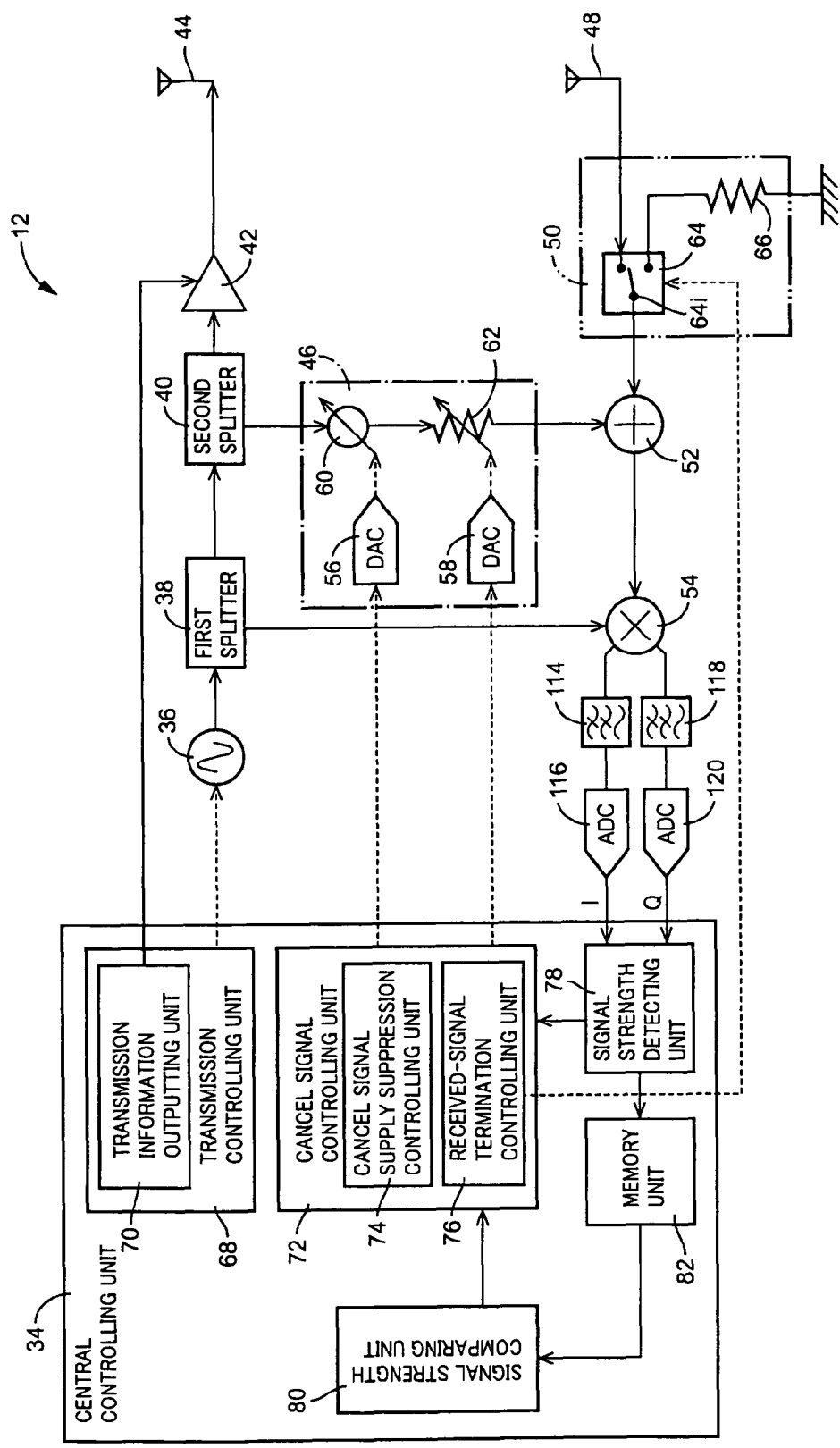
FIG. 3 is an illustration of a structure of a radio-frequency tag communication device as an embodiment of a radio-frequency communication device according to a first invention.

FIG. 3 is a diagram illustrating a structure of the radio-frequency tag communication device 12. As shown in FIG. 3, the radio-frequency tag communication device 12 of the present embodiment communicates information with the radio-frequency tag 14 to execute at least one of reading and writing information in the radio-frequency tag 14.

The radio-frequency tag communication device 12 includes a central controlling unit 34, a carrier wave generating unit 36, a first splitter 38, a second splitter 40, and a transmission amplifier 42. The central controlling unit 34 controls overall operations of the radio-frequency tag communication device 12 by allowing an information signal in the interrogating wave $F_c$ to the radio-frequency tag 14 to be output, controlling a strength of the interrogating wave $F_c$, controlling a phase and/or an amplitude of a cancel signal described below, and the like. The carrier wave generating unit 36 generates a carrier wave having a predetermined frequency and a predetermined strength in response to a control signal supplied from the central controlling unit 34; the first splitter 38 splits the carrier wave generated by the carrier wave generating unit 36 into parts to be fed to the second splitting unit 40 and supplied to a quadrature demodulating unit 54; the second splitter 40 splits the carrier wave supplied from the first splitter 38 into parts to be fed to the transmission amplifier 42 and supplied to a cancel signal generating unit 46; and the transmission amplifier 42 superimposes an information signal (transmitted information) supplied from the central controlling unit 34 on the carrier wave supplied from the second splitter 40 to transmit as the interrogating wave $F_c$, via a transmission antenna 44 to the radio-frequency tag 14.

The radio-frequency tag communication device 12 also includes a cancel signal generating unit 46, a reception antenna 48, a received-signal terminating unit 50, and a cancel signal synthesizing unit 52. The cancel signal generating unit 46 controls a phase and/or an amplitude of the carrier wave from the second splitter 40 to allow the wave to be output as a cancel signal; the reception antenna 48 receives a reply signal or the like returned from the radio-frequency tag 14; the received-signal terminating unit 50 selectively terminates a received-signal input terminal from the reception antenna 48 to the cancel signal synthesizing unit 52; and the cancel signal synthesizing unit 52 adds the cancel signal supplied from the cancel signal generating unit 46 to an input signal supplied from the reception antenna 48 via the received-signal terminating unit 50.

Furthermore, the radio-frequency tag communication device 12 includes, in addition to the quadrature demodulating unit 54, a first low pass filter 114, a first A/D converting unit 116, a second low pass filter 118, and a second A/D converting unit 120. The quadrature demodulating unit 54 multiplies the received signal, which has been synthesized with the cancel signal by the cancel signal synthesizing unit 52, by the carrier wave supplied from the first splitter 38 to convert into an in-phase component (an in-phase signal: an I-phase component) and a quadrature component (a quadrature signal: a Q-phase component) so as to supply those components to the central controlling unit 34. The first low pass filter 114 eliminates unnecessary harmonic content in an in-phase signal output from the quadrature demodulating unit 54; the first A/D converting unit 116 converts an output of the first low pass filter 114 into a digital signal; the second low pass filter 118 eliminates unnecessary harmonic content in a quadrature signal output from the quadrature demodulating unit 54; and the second A/D converting unit 120 converts an output of the second low pass filter 118 into a digital signal.

The cancel signal generating unit 46 also includes a cancel phase control signal D/A converting unit 56, a cancel amplitude control signal D/A converting unit 58, a cancel phase controlling unit 60, and a cancel amplitude controlling unit 62. The cancel phase control signal D/A converting unit 56 converts a cancel phase control signal supplied from the central controlling unit 34 into an analog signal. The cancel amplitude control signal D/A converting unit 58 converts a cancel amplitude control signal supplied from the central controlling unit 34 into an analog signal. The cancel phase controlling unit 60 is a variable phase shifter that controls a phase of a carrier wave (a carrier wave component) split by the second splitter 40 in response to the cancel phase control signal supplied via the cancel phase control signal D/A converting unit 56. The cancel amplitude controlling unit 62 is a variable attenuator that controls an amplitude of a phase-controlled carrier wave output from the cancel phase controlling unit 60 in response to the cancel amplitude control signal supplied via the cancel amplitude control signal D/A converting unit 58.

In this manner, in the radio-frequency tag communication device 12, the second splitter 40 serves as a splitting unit that splits a carrier wave component of a transmitted signal transmitted via the transmission antenna 44. The cancel phase controlling unit 60 and the cancel amplitude controlling unit 62 control the phase and the amplitude of the carrier wave split by the second splitter 40 to output as a cancel signal. Then, the cancel signal synthesizing unit 52 adds the cancel signal to a received signal.

The received-signal terminating unit 50 includes a circuit switching unit 64 that switches a circuit between the reception antenna 48 and a received-signal input terminal 64*i* and a termination resistance 66 of, for example, approximately 50 ohm, which is connected to the circuit switching unit 64. The reception antenna 48 and the termination resistance 66 are connected in parallel to the circuit switching unit 64. Switching by the circuit switching unit 64 allows the reception antenna 48 and the termination resistance 66 to be alternatively connected to the received-signal input terminal 64*i*. An opposite end of the termination resistance 66 from the circuit switching unit 64 is grounded.

The central controlling unit 34 is a so-called microcomputer system that includes a CPU, a ROM and a RAM, and uses a temporary storage function of the RAM to execute signal processing in accordance with a program prestored in the ROM. The central controlling unit 34 has controlling functions of a transmission controlling unit 68, a cancel signal controlling unit 72, a signal strength detecting unit 78, a signal strength comparing unit 80, and the like, as well as includes a memory unit 82 such as the RAM or a hard disc.

The transmission controlling unit 68 controls transmission of the interrogating wave $F_c$ (the transmitted signal) to the radio-frequency tag 14. Thus, the transmission controlling unit 68 includes a transmission information outputting unit 70 outputting transmission information (an information signal) that is to be transmitted to the radio-frequency tag 14. In information communication with the radio-frequency tag 14, the transmission controlling unit 68 allows the transmission information outputting unit 70 to output a predetermined information signal to supply the signal to the transmission amplifier 42, as well as controls a frequency, a strength, and the like of the carrier wave output from the carrier wave generating unit 36. Additionally, without allowing the transmission information outputting unit 70 to output the information signal, the transmission controlling unit 68 may also allow the carrier wave generating unit 36 to generate only a carrier wave to output the carrier wave including no information signal via the transmission antenna 44.

The cancel signal controlling unit 72 controls the cancel signal generated by the cancel signal generating unit 46, and specifically, supplies a predetermined cancel phase control signal to the cancel phase controlling unit 60 via the cancel phase control signal D/A converting unit 56 to control a phase of the cancel signal. In addition to control of the phase of the cancel signal, the cancel signal controlling unit 72 supplies a predetermined cancel amplitude control signal to the cancel amplitude controlling unit 62 via the cancel amplitude control signal D/A converting unit 58 to control the amplitude of the cancel signal.

To suitably control the cancel signal, the cancel signal controlling unit 72 includes a cancel signal supply suppression controlling unit 74 serving as a cancel signal supply suppressing unit and a received-signal termination controlling unit 76. The cancel signal supply suppression controlling unit 74 selectively suppresses supply of the cancel signal to the cancel signal synthesizing unit 52 via the cancel amplitude controlling unit 62. The received-signal termination controlling unit 76 selectively terminates the received-signal input terminal 64*i* from the reception antenna 48 to the cancel signal synthesizing unit 52 via the received-signal terminating unit 50.

Specifically, the cancel signal supply suppression controlling unit 74 selectively suppresses the supply of the cancel signal to the cancel signal synthesizing unit 52 via the cancel amplitude controlling unit 62 as the variable attenuator. In other words, the cancel signal supply suppression controlling unit 74 changes the cancel amplitude control signal such that an output from the cancel amplitude controlling unit 62 is maximally reduced, thereby suppress the supply of the cancel signal to the cancel signal synthesizing unit 52. On the other hand, the cancel signal supply suppression controlling unit 74 necessarily and sufficiently increases the output from the cancel amplitude controlling unit 62, thereby supply a cancel signal to the cancel signal synthesizing unit 52. In short, in the present embodiment, the cancel amplitude controlling unit 62 serves as a cancel signal supply suppressing unit that selectively suppresses supply of a cancel signal to the cancel signal synthesizing unit 52.

In addition, specifically, the received-signal termination controlling unit 76 allows the circuit switching unit 64 to connect the received-signal input terminal 64i to the termination resistance 66 to terminate the received-signal input terminal 64i from the reception antenna 48 to the cancel signal synthesizing unit 52. On the other hand, the received-signal termination controlling unit 76 allows the circuit switching unit 64 to connect the received-signal input terminal 64i to the reception antenna 48 to input a received signal from the reception antenna 48 to the cancel signal synthesizing unit 52.

The signal strength detecting unit 78 detects the strength of a signal input to the central controlling unit 34. Specifically, the signal strength detecting unit 78 detects strengths of a cancel signal generated by the cancel signal generating unit 46, of a received signal received via the reception antenna 48, and of a synthesized signal of the cancel signal and the received signal synthesized by the cancel signal synthesizing unit 52.

In the radio-frequency tag communication device 12 of the present embodiment, the quadrature demodulating unit 54 converts every signal input to the central controlling unit 34 into an in-phase signal and a quadrature phase signal. Accordingly, the signal strength detecting unit 78 detects strengths of the in-phase signal and the quadrature phase signal obtained by conversion of the quadrature demodulating unit 54 and a demodulated result. As a mode for the detection, the strength of each of the in-phase signal and the quadrature phase signal may be detected, or a sum of squares of the in-phase signal and the quadrature phase signal may be detected as the signal's own strength.

The memory unit 82 stores strengths of a plurality of kinds of signals detected by the signal strength detecting unit 78. The signal strength comparing unit 80 compares the strengths of those kinds of signals read from the memory unit 82 to supply a result of the comparison to the cancel signal controlling unit 72.

The cancel signal supply suppression controlling unit 74, preferably, suppresses the supply of the cancel signal to the cancel signal synthesizing unit 52 upon detection of the strength of the received signal received via the reception antenna 48. Specifically, when the signal strength detecting unit 78 detects the strength of the received signal received via the reception antenna 48, the cancel signal supply suppression controlling unit 74 controls an amplitude of the cancel signal so as to maximally reduce an output from the cancel amplitude controlling unit 62. Thereby, the signal strength detecting unit 78 can accurately detect the strength of the received signal received via the reception antenna 48.

The received-signal termination controlling unit 76, preferably, terminates the received-signal input terminal 64i from the reception antenna 48 to the cancel signal synthesizing unit 52 upon detection of the strength of a cancel signal generated by the cancel signal generating unit 46. Specifically, when the signal strength detecting unit 78 detects the strength of the cancel signal generated by the cancel signal generating unit 46, the received-signal termination controlling unit 76 controls the circuit switching unit 64 so as to connect the received-signal input terminal 64i to the termination resistance 66. Thereby, the signal strength detecting unit 78 can accurately detect the strength of the cancel signal generated by the cancel signal generating unit 46.

Upon detection of the strengths of the received signal and of the cancel signal in the cancel signal control, the transmission controlling unit 68 preferably transmits, via the transmission antenna 44, a transmitted signal having a signal strength smaller than that of a transmitted signal transmitted via the transmission antenna 44 to communicate with the radio-frequency tag 14. Controlling the cancel signal only needs detection of the received signal received via the reception antenna 48, namely of a leakage signal from a transmission side, and detection of the cancel signal so as to compare the both signals. Accordingly, there is no need to output a transmitted signal having a relatively large strength enough to allow the radio-frequency tag 14 to return the response wave $F_r$. It is enough to output a carrier wave having a signal strength smaller than in the communication with the radio-frequency tag 14.

The cancel signal controlling unit 72 controls a phase and/or an amplitude of the cancel signal based on a result of the comparison by the signal strength comparing unit 80. Specifically, the signal strength comparing unit 80 compares the strengths of the plurality kinds of signals stored in the memory unit 82 with each other, or the strengths of the signals with a signal strength detected by the signal strength detecting unit 78. This changes the cancel phase control signal supplied to the cancel phase controlling unit 60 and/or the cancel amplitude control signal supplied to the cancel amplitude controlling unit 62. Hereinafter will be described each of three modes for the cancel signal control by the cancel signal controlling unit 72.

In a first control mode, initially, the cancel signal controlling unit 72 allows the cancel signal supply suppression controlling unit 74 to suppress the supply of the cancel signal to the cancel signal synthesizing unit 52. In that state, the cancel signal controlling unit 72 allows the transmission controlling unit 68 to output a transmitted signal via the transmission antenna 44. Following that, the cancel signal controlling unit 72 allows the signal strength detecting unit 78 to detect a strength of a received signal received by the reception signal 48 (a sum of respective squares of an in-phase component and a quadrature component) so as to allow the memory unit 82 to store a result of the detection. Thereby, the signal strength detecting unit 78 can accurately detect the strength of the received signal received via the reception antenna 48. The strength of the received signal is approximately equal to a strength of the leakage signal from the transmission side.

Next, the cancel signal controlling unit 72 releases the suppression of the supply of the cancel signal to the cancel signal synthesizing unit 52 (namely, the unit 72 returns the strength of the cancel signal to a necessary and sufficient level), as well as allows the received-signal termination controlling unit 76 to terminate the received-signal input terminal 64i. In that state, the transmission controlling unit 68 allows the carrier wave generating unit 36 to generate a carrier wave. The cancel signal controlling unit 72 controls an amplitude of a cancel signal such that a strength of the cancel signal detected by the signal strength detecting unit 78 (a sum of respective squares of an in-phase component and a quadrature component) is equal to the strength of the received signal stored in the memory unit 82. In this manner, the signal strength detecting unit 78 can accurately detect the strength of the cancel signal generated by the cancel signal generating unit 46. Additionally, the cancel signal controlling unit 72 can control the amplitude of the cancel signal such that the strength of the cancel signal is approximately equal to the strength of the received signal stored in the memory unit 82, namely the strength of the leakage signal from the transmission side.

The cancel signal controlling unit 72 allows the transmission controlling unit 68 to transmit a transmitted signal via the transmission antenna 44, and controls a phase of the cancel signal so as to maximally reduce a strength of a synthesized signal of the received signal and the cancel signal detected by the signal strength detecting unit 78. The cancel signal controlling unit 72 executes the control in a state of release of the termination of the received-signal input terminal 64i by the received-signal termination controlling unit 76. This enables the phase of the cancel signal to be controlled such that the leakage signal from the transmission side is maximally suppressed.

In a second control mode, initially, in the state in which the cancel signal supply suppression controlling unit 74 suppresses the supply of a cancel signal to the cancel signal synthesizing unit 52, the transmission controlling unit 68 outputs a transmitted signal via the transmission antenna 44. Next, the signal strength detecting unit 78 detects respective strengths of an in-phase component and a quadrature component of a received signal output from the quadrature demodulating unit 54, and then, the memory unit 82 stores a detection result. Thereby, the signal strength detecting unit 78 can accurately detect the respective strengths of the in-phase component and the quadrature component of the received signal received via the reception antenna 48.

Next, the suppression of the supply of the cancel signal to the cancel signal synthesizing unit 52 is released and the received-signal termination controlling unit 76 terminates the received-signal input terminal 64i. In that state, the transmission controlling unit 68 allows the carrier wave generating unit 36 to generate a carrier wave. The cancel signal controlling unit 72 controls an amplitude and/or a phase of a cancel signal via the cancel phase controlling unit 60 and the cancel amplitude controlling unit 62 so as to equalize the respective strengths of the in-phase and the quadrature components of the cancel signal detected by the signal strength detecting unit 78 with the strengths of those of the received signal stored in the memory unit 82. Thereby, the signal strength detecting unit 78 can accurately detect the strength of the cancel signal generated by the cancel signal generating unit 46. Thus, the cancel signal controlling unit 72 can control the phase and/or the amplitude of the cancel signal such that the cancel signal is approximately equal to the received signal stored in the memory unit 82, namely the leakage signal from the transmission side.

The cancel signal controlling unit 72 controls the phase of the cancel signal via the cancel phase controlling unit 60 such that the phase of the cancel signal is rotated by 180 degrees. Thereafter, the cancel signal controlling unit 72 releases the termination of the received-signal input terminal 64i by the received-signal termination controlling 76. This enables the cancel signal to be controlled such that the leakage signal from the transmission side is maximally suppressed.

In a third control mode, initially, in the state in which the cancel signal supply suppression controlling unit 74 suppresses the supply of a cancel signal to the cancel signal synthesizing unit 52, the transmission controlling unit 68 outputs a transmitted signal via the transmission antenna 44. Then, the signal strength detecting unit 78 detects respective strengths of an in-phase component and a quadrature component of a received signal output from the quadrature demodulating unit 54, and the memory unit 82 stores a detection result. Thereby, the signal strength detecting unit 78 can accurately detect the strengths of the in-phase and the quadrature components of the received signal received via the reception antenna 48.

Next, the suppression of the supply of the cancel signal to the cancel signal synthesizing unit 52 is released, and the received-signal termination controlling unit 76 terminates the received-signal input terminal 64i. In that state, the transmission controlling unit 68 allows the carrier wave generating unit 36 to generate a carrier wave. The cancel signal controlling unit 72 controls an amplitude and/or a phase of a cancel signal via the cancel phase controlling unit 60 and the cancel amplitude controlling unit 62 so as to equalize the strengths of the in-phase and the quadrature components of the cancel signal detected by the signal strength detecting unit 78 with the strengths of those of the received signal stored in the memory unit 82, and so as to reverse the plus and minus signs of the in-phase and the quadrature components of the cancel signal relative to those of the received signal. Thereafter, the cancel signal controlling unit 72 releases the termination of the received-signal input terminal 64i by the received-signal termination controlling unit 76. In this manner, the cancel signal controlling unit 72 can control the cancel signal such that the leakage signal from the transmission side is maximally suppressed.

Hereinabove has been described the cancel signal control (a cancellation circuit control) performed by the cancel signal controlling unit 72. There may be considered various timings for the control, such as (a) the control is executed before (preferably, immediately before) transmitting information to the radio-frequency tag 14 as the communication object; (b) the control is executed during transmission of information to the radio-frequency tag 14 as the communicating object; (c) the control is executed every time the transmission controlling unit 68 switches the frequency of a transmitted signal (a carrier wave); and (d) the control is executed when the strength of a synthesized signal of a received signal and a cancel signal detected by the signal strength detecting unit 78 is equal to or larger than a predetermined value.

In the mode (a), controlling the cancel signal before transmitting information to the radio-frequency tag 14 can provide a suitable reception condition before communication with the radio-frequency tag 14. In the mode (b), controlling the cancel signal during the communication with the radio-frequency tag 14 can provide a suitable reception condition upon reception of a reply signal returned from the radio-frequency tag 14. As in the mode (c), when controlling the cancel signal at every switching of the frequency of the transmitted signal, the leakage signal from the transmission side changing with the frequency of the transmitted signal can be suitably suppressed by a cancel signal set at every switching of the frequency. In the mode (d), the cancel signal is controlled when the strength of the synthesized signal detected by the signal strength detecting unit 78 is equal to or larger than a predetermined value. This mode enables cancel signal control when determined that the cancel signal cannot sufficiently suppress the leakage signal from the transmission side.

As described above, the radio-frequency communication device 12 of the present embodiment includes the cancel amplitude controlling unit 62 serving as the cancel signal supply suppressing means that selectively suppresses the supply of a cancel signal to the cancel signal synthesizing unit 52, the received-signal terminating unit 50 that selectively terminates the received-signal input terminal 64i from the reception antenna 48 to the cancel signal synthesizing unit 52, the signal strength detecting unit 78 that detects the strengths of the cancel signal, a received signal, or a synthesized signal of the signals, the memory unit 82 that stores signal strengths detected by the signal strength detecting unit 78, the signal strength comparing unit 80 that compares the strengths of a plurality of kinds of signals read from the memory unit 82 with each other or with signal strengths detected by the signal strength detecting unit 78, and the cancel signal controlling unit 72 that controls an amplitude and/or a phase of the cancel signal via the cancel amplitude controlling unit 62 and/or the cancel phase controlling unit 60 based on a comparison result by the signal strength comparing unit 80.

Thus, suppressing the cancel signal by the cancel signal supply suppressing unit enables accurate detection of the strength of the received signal. Additionally, terminating the received signal by the received-signal terminating unit 50 enables accurate detection of the strength of the cancel signal. In short, there can be provided a radio-frequency communication device that can sufficiently eliminate a leakage signal from the transmission side included in a received signal.

The received-signal terminating unit 50 includes the circuit switching unit 64 switching the circuit between the reception antenna 48 and the received-signal input terminal 64*i*, and the termination resistance 66 connected to the circuit switching unit 64. The circuit switching unit 64 connects the received-signal input terminal 64*i* to the termination resistance 66 upon detection of the strength of the cancel signal. Accordingly, using the circuit switching unit 64 for termination of a received signal enables a signal path upon reception and a termination path upon termination to be switched by the practical mode.

The cancel signal supply suppression controlling unit 74 controls an amplitude of the carrier wave component so as to maximally reduce an output from the cancel amplitude controlling unit 62, upon detection of the strengths of the received signal. Accordingly, without providing any especially new structure, the supply of a cancel signal to the cancel signal synthesizing unit can be suppressed by the practical mode.

The transmission antenna 44 and the reception antenna 48 are individually provided as separate antennas, thereby enabling a maximum reduction in influence on the transmission side upon the control of the cancel signal.

Upon detection of the strength of the cancel signal, the transmission controlling unit 68 communicates with the radio-frequency tag 14 as the communication object to transmit, via the transmission antenna 44, a transmitted signal having a signal strength smaller than a transmitted signal via the transmission antenna 44. This can prevent transmission of a wastefully large transmitted signal, thereby achieving power savings and suppressing influence on other stations.

The cancel signal controlling unit 72, initially, allows the cancel amplitude controlling unit 62 to suppress the supply of a cancel signal to the cancel signal synthesizing unit 52. In that state, the cancel signal controlling unit 72 allows the signal strength detecting unit 78 to detect a strength of the received signal and allows the memory unit 82 to store a detection result. Next, the cancel signal controlling unit 72 controls an amplitude of the cancel signal such that the strength of the cancel signal detected by the signal strength detecting unit 78 is equal to the strength of the received signal stored in the memory unit 82. The cancel signal controlling unit 72 executes the control in that states of release of the suppression of the cancel signal supply to the cancel signal synthesizing unit 52 and termination of the received-signal input terminal 64*i* by the received-signal terminating unit 50.

Furthermore, in that state of release of the termination of the received-signal input terminal 64*i* by the received-signal terminating unit 50, the cancel signal controlling unit 72 controls a phase of the cancel signal so as to maximally reduce a strength of a synthesized signal of the received signal and the cancel signal detected by the signal strength detecting unit 78. Accordingly, separately controlling the amplitude and the phase of the cancel signal can facilitate the control of the cancel signal.

The cancel signal controlling unit 72, initially, allows the cancel amplitude controlling unit 62 to suppress the supply of a cancel signal to the cancel signal synthesizing unit 52. In that state, the cancel signal controlling unit 72 allows the signal strength detecting unit 78 to detect respective strengths of an in-phase component and a quadrature component of the received signal and allows the memory unit 82 to store a detection result. Next, the cancel signal controlling unit 72 controls the amplitude and/or the phase of the cancel signal so as to equalize strengths of the in-phase and the quadrature components of the cancel signal detected by the signal strength detecting unit 78 with the strengths of those of the received signal stored in the memory unit 82. The control is executed in that states of release of the suppression of the cancel signal supply to the cancel signal synthesizing unit 52 and termination of the received-signal input terminal 64*i* by the received-signal terminating unit 50.

Additionally, after controlling the phase of the cancel signal so as to rotate the phase of the cancel signal by 180 degrees, the cancel signal controlling unit 72 releases the termination of the received-signal input terminal 64*i* by the received-signal terminating unit 50. Accordingly, simultaneously controlling the amplitude and the phase of the cancel signal enables the cancel signal to be controlled in a relatively short time.

The cancel signal controlling unit 72, initially, allows the cancel amplitude controlling unit 62 to suppress the supply of a cancel signal to the cancel signal synthesizing unit 52. In that state, the cancel signal controlling unit 72 allows the signal strength detecting unit 78 to detect respective strengths of an in-phase component and a quadrature component of the received signal and allows the memory unit 82 to store a result of the detection.

Next, the cancel signal controlling unit 72 controls an amplitude and/or a phase of a cancel signal so as to equalize the strengths of the in-phase and the quadrature components of the cancel signal detected by the signal strength detecting unit 78 with the strengths of those of the received signal stored in the memory unit 82, and so as to reverse the plus and minus signs of the in-phase and the quadrature components of the cancel signal relative to those of the received signal. The cancel signal controlling unit 72 executes the control in that states of release of the suppression of the cancel signal supply to the cancel signal synthesizing unit 52 and termination of the received-signal input terminal 64*i* by the received-signal terminating unit 50. Thereafter, the cancel signal controlling unit 72 releases the termination of the received-signal input terminal 64*i* by the received-signal terminating unit 50. Accordingly, simultaneously controlling the amplitude and the phase of the cancel signal and eliminating the need for phase rotation enable the cancel signal to be controlled in a maximally short time.

Before transmission of information to the radio-frequency tag 14 as the communication object, the cancel signal controlling unit 72 controls a cancel signal. This can provide a suitable reception condition before communication with the radio-frequency tag 14.

During transmitting information to the radio-frequency tag 14 as the communication object, the cancel signal controlling unit 72 controls a cancel signal. This can secure a suitable reception condition upon reception of a reply signal returned from the radio-frequency tag 14.

The cancel signal controlling unit 72 controls a cancel signal at every switching of the frequency of the transmitted signal. This enables a leakage signal from the transmission side changing with the frequency of the transmitted signal to be suitably suppressed by a cancel signal set at every switching of the frequency thereof.

The cancel signal controlling unit 72 controls a cancel signal when the strength of a synthesized signal of the received signal and the cancel signal detected by the signal strength detecting unit 78 is equal to or larger than a predetermined value. This enables a timing for requiring the control of a cancel signal to be suitably determined.

The radio-frequency tag communication device 12 includes the homodyne detection circuit including the quadrature demodulating unit 54 as a demodulating unit for the received signal. Thus, with the homodyne detection circuit having a particularly great influence on the leakage signal from the transmission side, the leakage signal from the transmission side can be suitably suppressed.

Preferably, the radio-frequency tag communication device 12 transmits a predetermined transmitted signal via the transmission antenna 44 to the radio-frequency tag 14, and receives, via the reception antenna 48, a reply signal from the radio-frequency tag 14 in response to the transmitted signal. In this manner, the radio-frequency tag communication device 12 communicates information with the radio-frequency tag 14. Therefore, the radio-frequency tag communication device 12 particularly greatly influenced by a leakage signal from the transmission side can suitably suppress the leakage signal from the transmission side.

Next will be described in detail other preferable embodiments of the radio-frequency communication device of the first invention, with reference to drawings. In the description below, elements common among embodiments will be given the same reference numerals and descriptions thereof will be omitted.

Figure 4:
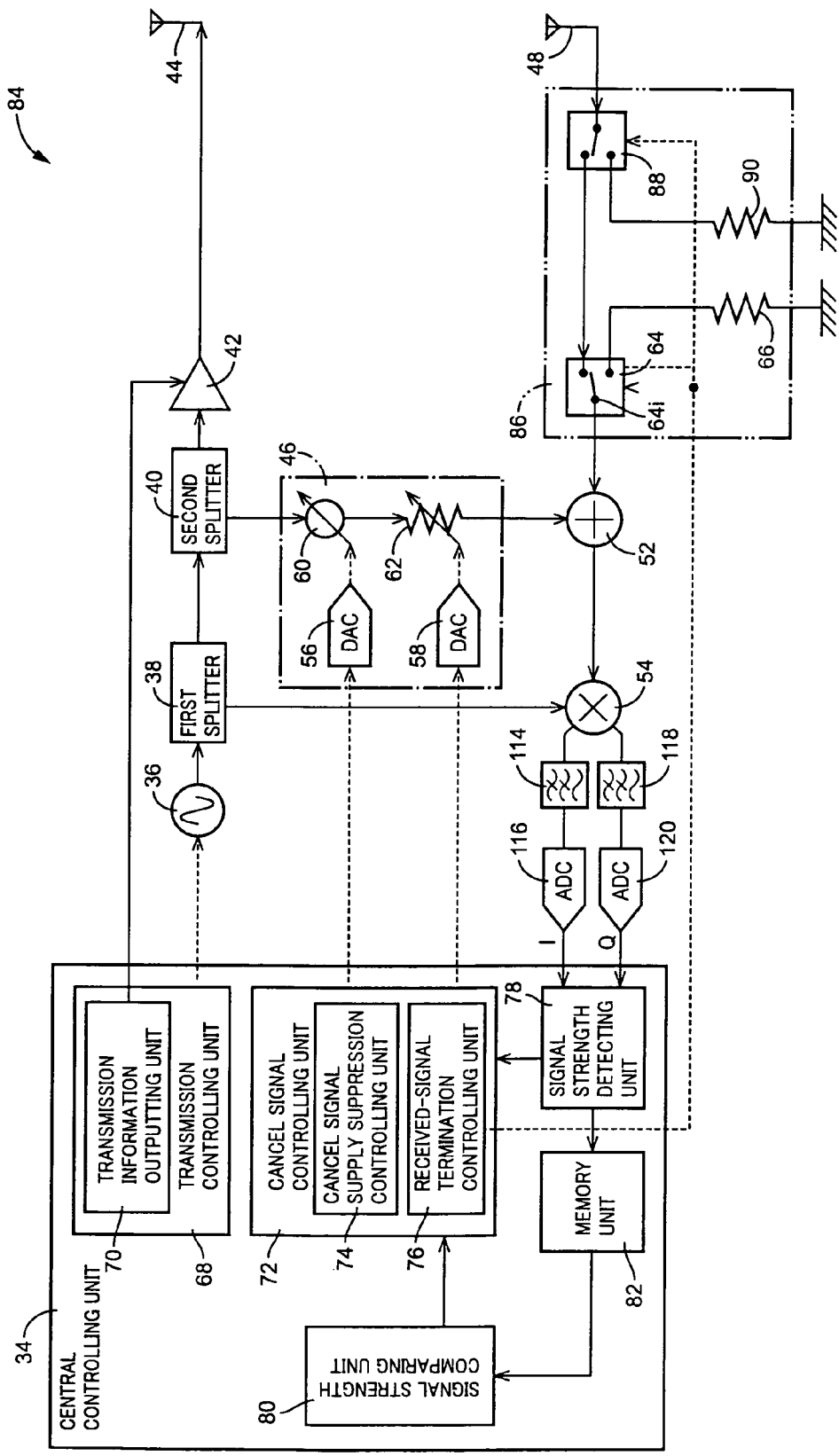
FIG. 4 is an illustration of a structure of a radio-frequency tag communication device as another embodiment of the radio-frequency communication device according to the first invention.

FIG. 4 is a diagram illustrating a structure of a radio-frequency tag communication device 84 as another embodiment of the first invention. As shown in FIG. 4, the radio-frequency tag communication device 84 includes a received-signal terminating unit 86 that selectively terminates the received-signal input terminal 64*i* from the reception antenna 48 to the cancel signal synthesizing unit 52. In addition to the circuit switching unit 64 and the termination resistance 66 included in the foregoing received-signal terminating unit 50, the received-signal terminating unit 86 includes a second circuit switching unit 88 switching a circuit between the reception antenna 48 and the circuit switching unit 64 and a second termination resistance 90 of, for example, approximately 50 ohm, which is connected to the second circuit switching unit 88. The second circuit switching unit 88 and the second termination resistance 90 are provided on a side closer to the reception antenna 48 than to the circuit switching unit 64 and the termination resistance 66.

The circuit switching unit 64 and the second termination resistance 90 are connected in parallel to the second circuit switching 88. The second circuit switching unit 88 switches the circuit switching unit 64 and the second termination resistance 90 to alternately connect them to the reception antenna 48, (although they may not be directly connected to the antenna). An opposite end of the second termination resistance 90 from the second circuit switching unit 88 is grounded.

The received-signal termination controlling unit 76 included in the central controlling unit 34 allows the circuit switching unit 64 to connect the received-signal input terminal 64*i* to the termination resistance 66, as well as allows the second circuit switching unit 88 to connect the reception antenna 48 to the second termination resistance 90. This terminates the received-signal input terminal 64*i* from the reception antenna 48 to the cancel signal synthesizing unit 52. On the other hand, the circuit switching unit 64 connects the received-signal input terminal 64*i* to the reception antenna 48, as well as the second circuit switching unit 88 connects the reception antenna 48 to the circuit switching unit 64. This allows a received signal to be input from the reception antenna 48 to the cancel signal synthesizing unit 52.

A timing of circuit termination by the received-signal terminating unit 86 is the same as in the foregoing embodiment. Upon detection of the strength of the cancel signal or the like, the received-signal terminating unit 86 terminates the received-signal input terminal 64*i* from the reception antenna 48 to the cancel signal synthesizing unit 52.

As described above, in the present embodiment, the received-signal terminating unit 86 includes the second circuit switching unit 88 switching the circuit between the reception antenna 48 and the circuit switching unit 64, and the second termination resistance 90 connected to the second circuit switching unit 88, which are provided on the side of the reception antenna 48 relative to the circuit switching unit 64 and the termination resistance 66. The second circuit switching unit 88 connects the reception antenna 48 to the second termination resistance 90 upon detection of the strength of the cancel signal. Thus, connecting the reception antenna 48 to the second termination resistance 90 enables the reception antenna 48 to be in the same condition between upon control of a cancel signal and upon reception of a signal. This can lead to more accurate detection of respective signal strengths of a received signal received via the reception antenna 48 and a cancel signal.

Figure 5:
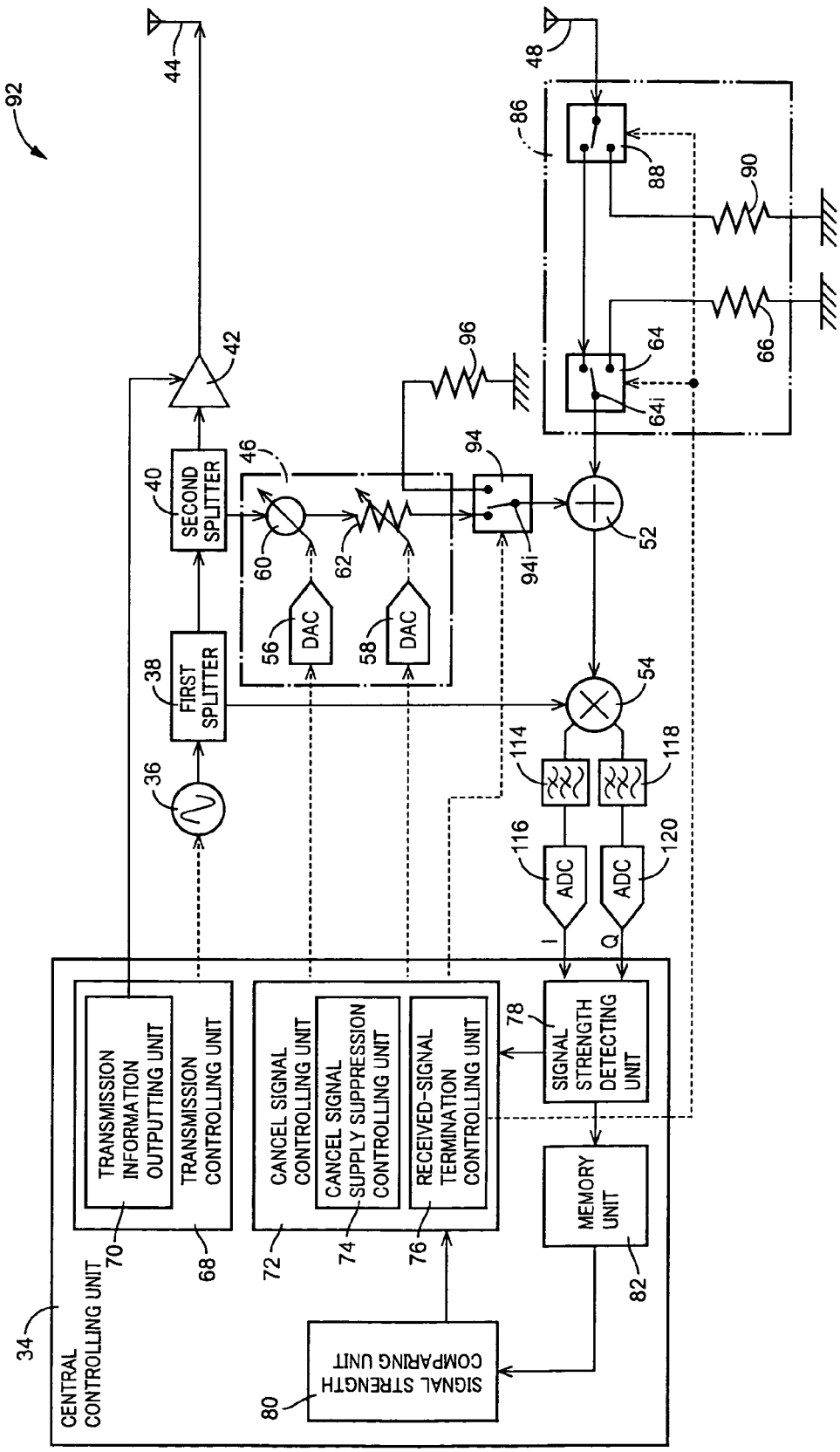
FIG. 5 is an illustration of a structure of a radio-frequency tag communication device as still another embodiment of the radio-frequency communication device according to the first invention.

FIG. 5 is a diagram illustrating a structure of a radio-frequency tag communication device 92 as a still another embodiment of the radio-frequency communication device according to the first invention. As shown in FIG. 5, the radio-frequency tag communication device 92 of the present embodiment includes a third circuit switching unit 94 that switches a circuit between the cancel amplitude controlling unit 62 and a cancel signal input terminal 94*i*, and a third termination resistance 96 of, for example, 50 ohm, which is connected to the third circuit switching unit 94.

The cancel amplitude controlling unit 62 and the third termination resistance 96 are connected in parallel to the third circuit switching unit 94. Switching by the third circuit switching unit 94 allows the cancel amplitude controlling unit 62 and the third termination resistance 96 to be alternately connected to the cancel signal input terminal 94*i*.

An opposite end of the third termination resistance 96 from the third circuit switching unit 94 is grounded. The third circuit switching unit 94 and the third termination resistance 96 serve as part of the cancel signal supply suppressing unit that selectively suppresses supply of a cancel signal to the cancel signal synthesizing unit 52. The third circuit switching unit 94 is switched in response to a control signal from the cancel signal supply suppression controlling unit 74. Specifically, the cancel signal supply suppression controlling unit 74 included in the central controlling unit 34 allows the third circuit switching unit 94 to connect the cancel signal input terminal 94*i* to the third termination resistance 96. This terminates the cancel signal input terminal 94*i* from the cancel signal generating unit 46 to the cancel signal synthesizing unit 52, thereby suppressing the supply of a cancel signal to the cancel signal synthesizing unit 52. Meanwhile, the third circuit switching unit 94 is allowed to connect the cancel amplitude controlling unit 62 to the cancel signal input terminal 94i, thereby allowing a cancel signal to be input from the cancel signal generating unit 46 to the cancel signal synthesizing unit 52.

A timing for suppressing the supply of a cancel signal to the cancel signal synthesizing unit 52 is the same as in the foregoing embodiment. Upon detection of the strength of a received signal received via the reception antenna 48 or the like, the third circuit switching unit 94 executes circuit switching to suppress the supply of a cancel signal generated by the cancel signal generating unit 48 to the cancel signal synthesizing unit 52. Additionally, upon the suppression of the cancel signal, preferably, a cancel amplitude control signal supplied to the cancel amplitude controlling unit 62 is controlled such that an output from the cancel amplitude controlling unit 62 is maximally reduced, as in the foregoing embodiment.

As described above, in the present embodiment, the cancel signal supply suppressing unit includes the third circuit switching unit 94 switching the circuit between the cancel amplitude controlling unit 62 and the cancel signal input terminal 94i and the third termination resistance 96 connected to the third circuit switching unit 94. Upon detection of a strength of the received signal, the cancel signal input terminal 94i and the third termination resistance 96 are connected to each other. Accordingly, using the third circuit switching unit 94 enables input of a cancel signal to the cancel signal input terminal 94i to be maximally suppressed. In addition, maximally reducing output from the cancel amplitude controlling unit 62 enables reflection to a cancellation circuit side to be suppressed.

Figure 6:
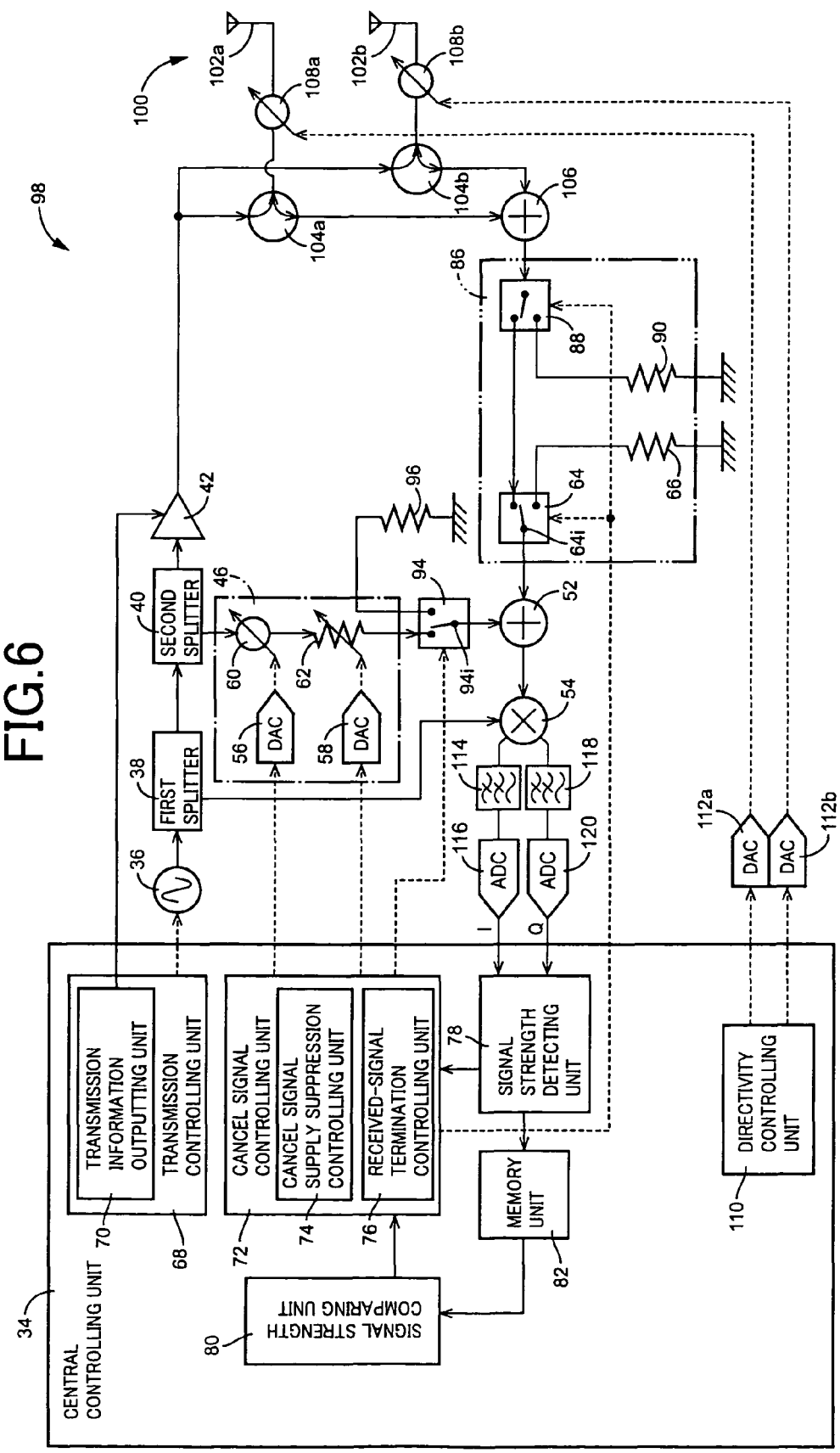
FIG. 6 is an illustration of a structure of a radio-frequency tag communication device as still another embodiment of the radio-frequency communication device according to the first invention.

FIG. 6 is an illustration of a structure of a radio-frequency tag communication device 98 as still another embodiment of the radio-frequency communication device according to the first invention. As shown in FIG. 6, the radio-frequency tag communication device 98 of the present embodiment includes an array antenna 100 commonly used for both transmission and reception and comprised of a plurality of (two in FIG. 6) antenna elements 102a and 102b, a plurality of (two in FIG. 6) transmission and reception separating units 104a and 104b, and a received-signal synthesizing unit 106. The transmission and reception separating units 104a and 104b, respectively, supply a transmitted signal output from the transmission amplifier 42 to the antenna elements 102a and 102b, as well as, respectively, supply received signals received by the antenna elements 102a and 102b to the received-signal synthesizing unit 106. The received-signal synthesizing unit 106 synthesizes the respective received signals corresponding to the antenna elements 102a and 102b and supplied via the transmission and reception separating units 104a and 104b to input to the received-signal terminating unit 86.

There are also provided phase controlling units 108a and 108b commonly used for both transmission and reception. The phase controlling units 108a and 108b control phases of a transmitted signal and/or a received signal corresponding to the antenna elements 102a and 102b in response to a phase controlling signal supplied from the central controlling unit 34. The central controlling unit 34 functionally includes a directivity controlling unit 110 that supplies a phase control signal to the phase controlling units 108a and 108b to control a transmission directivity and/or a reception directivity of the array antenna 100. Furthermore, there are provided a plurality of (two in FIG. 6) phase control signal D/A converting units 112a and 112b that convert a phase control signal output from the directivity controlling unit 110 into an analog signal to supply to the phase controlling units 108a and 108b.

In the radio-frequency tag communication device 98 of the present embodiment, the cancel signal controlling unit 72 executes the cancel signal control described above, when the directivity controlling unit 110 changes a phase of the array antenna 100. Thereby, since a leakage signal from a transmission side changes with the phase of the array antenna 100, optimization of the cancel signal can be achieved as needed.

As described above, the radio-frequency tag communication device 98 of the present embodiment includes the array antenna 100 as the transmission antenna comprised of the antenna elements 102a and 102b, and the phase controlling units 108a and 108b controlling the phases of transmitted signals transmitted to the antenna elements 102a and 102b so as to control the transmission directivity. Along with the phase changing of the array antenna 100, the cancel signal controlling unit 72 controls a cancel signal. Therefore, a leakage signal from the transmission side changing with a weight for the array antenna 100 can be suitably suppressed by a cancel signal set at every switching of the antenna weight.

Additionally, the radio-frequency tag communication device 98 of the present embodiment includes the array antenna 100 as the reception antenna comprised of the antenna elements 102a and 102b, and the phase controlling units 108a and 108b controlling the respective phases of received signals sent to the antenna elements 102a and 102b so as to control the reception directivity. Upon the phase changing of the array antenna 100, the cancel signal controlling unit 72 controls a cancel signal. This enables a leakage signal from the transmission side changing with a weight for the array antenna 100 to be suitably suppressed by a cancel signal set at every switching of the antenna weight.

The transmission antenna and the reception antenna are integrally provided as the array antenna 100 used for both transmission and reception, thus enabling the structure of the communication device to be maximally simplified.

Next will be described cancellation circuit controls by the central controlling unit 34 in the foregoing radio-frequency tag communication devices 12, 84, 92, and 98, by referring to flowcharts of FIGS. 7 to 10. The cancellation circuit controls (the cancel signal controls) shown by the flowcharts of FIGS. 7 to 10 described in detail below can be applied to any of the foregoing radio-frequency tag communication devices 12, 84, 92, and 98. The control shown in FIGS. 7 to 8 corresponds to the first control mode exemplified in the description of the radio-frequency tag communication device 12; the control shown in FIG. 9 corresponds to the second control mode; and the control shown in FIG. 10 corresponds to the third control mode.

Figure 7:
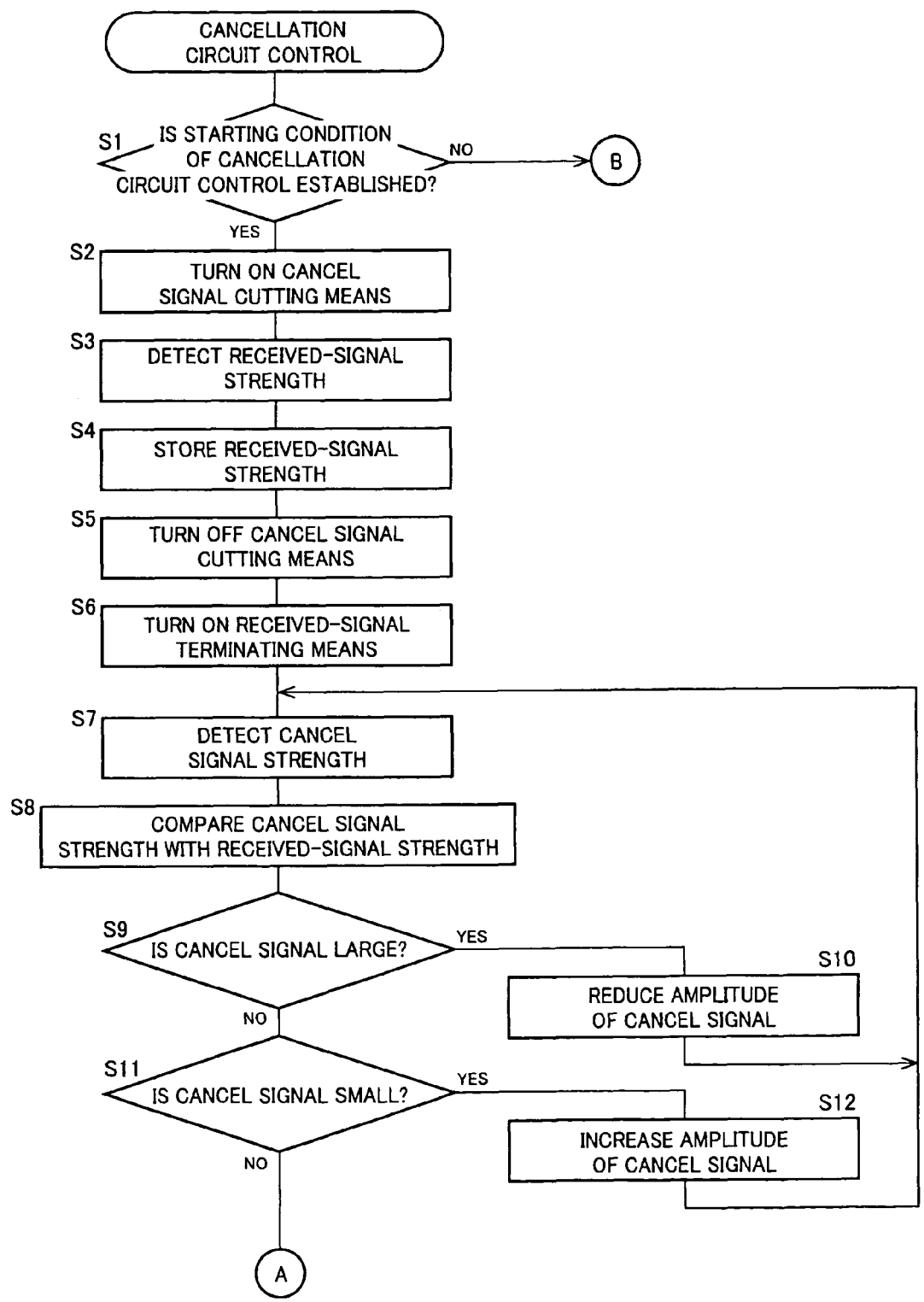
FIG. 7 is a part of a flowchart explaining an outline of a cancellation circuit control by a central controlling unit in the radio-frequency tag communication device shown in any of FIGS. 3 to 6.
Figure 8:
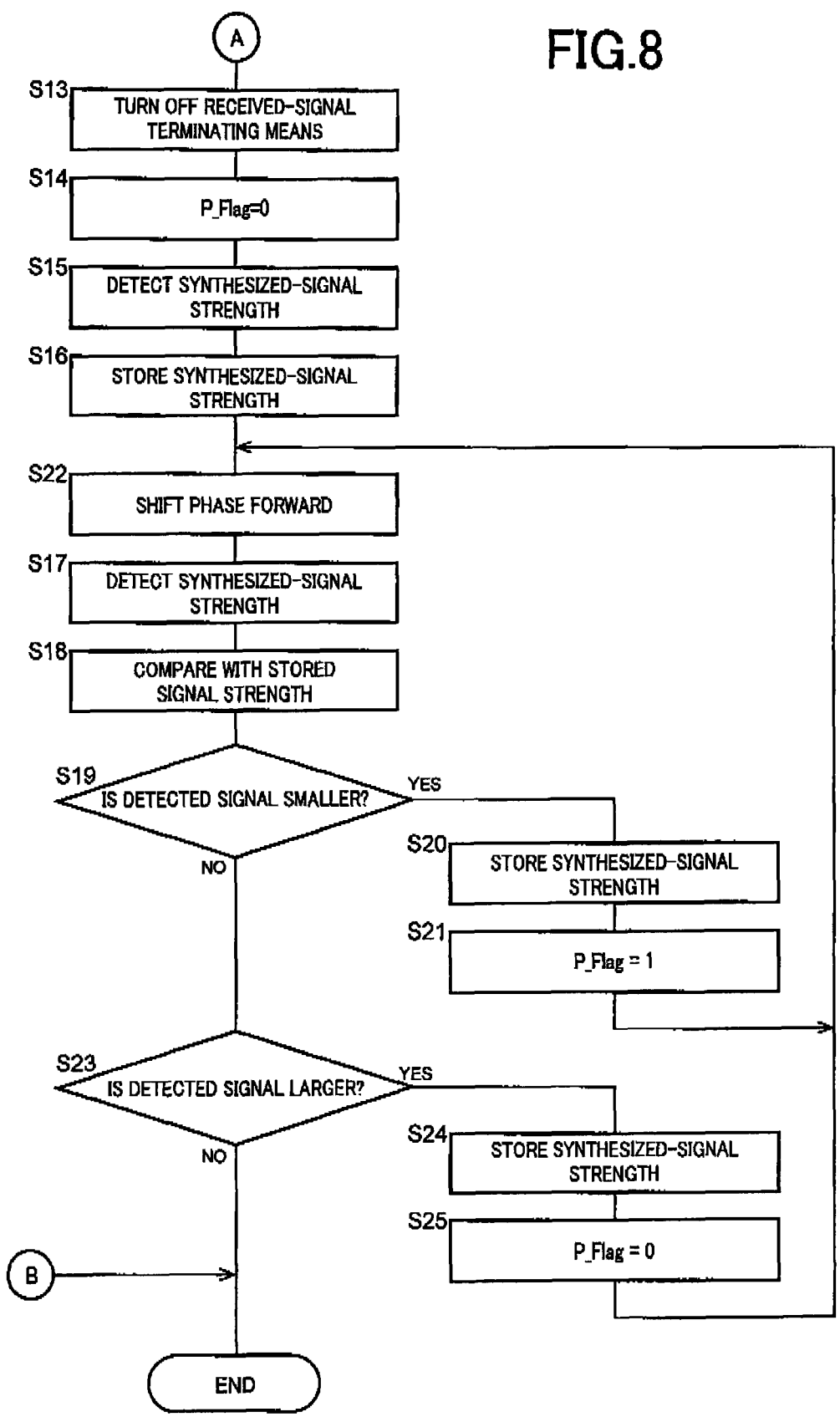
FIG. 8 is a part of the flowchart explaining the outline of the cancellation circuit control by the central controlling unit in the radio-frequency tag communication device shown in any one of FIGS. 3 to 6.

FIGS. 7 to 8 is a flowchart explaining an outline of the cancellation circuit control by the central controlling unit 34, where the control is repeatedly executed in a predetermined cycle. In the control, first, at step S1 (hereinafter "step" will be omitted), it is determined whether a starting condition for the cancellation circuit control has been established. Establishment is caused by switching the frequency of a transmitted signal (a carrier wave) by the transmission controlling unit 68, or allowing the strength of a synthesized signal of a received signal and a cancel signal detected by the signal strength detecting unit 78 to be made equal to or larger than a predetermined value, and the like. If the determination at S1 is negative, the present routine is then ended.

However, if the determination at S1 is positive, a cancel amplitude control signal is controlled at S2 so as to maximally reduce output from the cancel amplitude controlling unit 62, thereby stopping input of a cancel signal. Next, at S3, a signal strength of a received signal received via the reception antenna 48 or the array antenna 100 is detected, and at S4, the memory unit 82 stores the signal strength of the received signal detected at S3. Then, at S5, the cancel signal cutting means is turned off by controlling the cancel amplitude control signal or the like so as to necessarily and sufficiently increase output from the cancel amplitude controlling unit 62, thereby enabling input of a cancel signal to be valid.

Next, at S6, a received-signal terminating means is turned on by terminating the received-signal input terminal 64$i$ from the reception antenna 48 or the array antenna 100 to the cancel signal synthesizing unit 52 by the received-signal terminating unit 50 or 86, or the like. Then, at S7, a signal strength of a cancel signal generated by the cancel signal generating unit 46 is detected, and at S8, a comparison is made between the strength of the cancel signal detected at S7 and the strength of the received signal stored in the memory unit 82 at S4. Next, at S9, a determination is made as to whether the strength of the cancel signal detected at S7 has been larger or not in the comparison at S8.

If the determination at S8 is positive, at S10, the cancel signal amplitude control signal is controlled so as to allow a cancel signal amplitude output from the cancel amplitude controlling unit 62 to be smaller than an amplitude at the moment in time. After that, the processings at S7 and thereafter are executed again. Conversely, if the determination at S9 is negative, at S11, a determination is made as to whether the strength of the cancel signal detected at S7 has been smaller or not in the comparison at S8. If the determination at S11 is positive, at S12, the cancel amplitude control signal is controlled so as to allow a cancel signal amplitude output from the cancel amplitude controlling 62 larger than an amplitude at the moment in time. After that, the processings at S7 and thereafter are executed again. On the contrary, if the determination at S11 is negative, processings at S13 and thereafter shown in FIG. 8 are executed.

At S13 following the foregoing processing at S11, the received-signal terminating means is turned off by, connecting the received-signal input terminal 64$i$ from the reception antenna 48 or the array antenna 100 to the cancel signal synthesizing unit 52 to the antennas 48 and 100, or the like. Next, at S14, P flag (P_Flag) is set to zero. Then, at S15, a signal strength of a synthesized signal of the received signal and the cancel signal synthesized by the cancel signal synthesizing unit 52 is detected.

Next, at S16, the memory unit 18 stores the strength of the synthesized signal detected at S15. Then, at S22, the cancel phase controlling unit 60 controls the cancel phase control signal so as to shift a phase of the cancel signal forward by a predetermined value. Next, at S17, a signal strength of a synthesized signal of a received signal and a cancel signal synthesized by the cancel signal synthesizing unit 52 is detected. Then, at S18, a comparison is made between the signal strength of the synthesized signal detected at S17 and the signal strength of the synthesized signal stored in the memory unit 82 at S16.

Next, at S19, a determination is made as to whether the strength of the synthesized signal detected at S17 has been smaller or not in the comparison at S18. If the determination at S19 is negative, processings at S23 and thereafter are executed. If the determination at S19 is positive, at S20, the memory unit 82 stores the signal strength of the synthesized signal detected at S17.

Then, at S21, after setting P flag (P_Flag) to 1, processings at S22 and thereafter are executed. In processing at S23, a determination is made so as to whether the strength of the synthesized signal detected at S17 has been larger or not in the comparison at S18. If the determination at S23 is negative, the routine is then ended. In contrast, if the determination at S23 is positive, at S24, the memory unit 82 stores the signal strength of the synthesized signal detected at S17. Then, at S25, after setting P flag (P_Flag) to zero, the processings at S22 and thereafter are executed.

In the control described above, S1 to S25 correspond to operations of the cancel signal controlling unit 72; S2 and S5 correspond to operations of the cancel signal supply suppression controlling unit 74; S6 and S13 correspond to operations of the received-signal termination controlling unit 76; S3, S7, S15, and S17 correspond to operations of the signal strength detecting unit 78; and S8 and S18 correspond to operations of the signal strength comparing unit 80.

Figure 9:
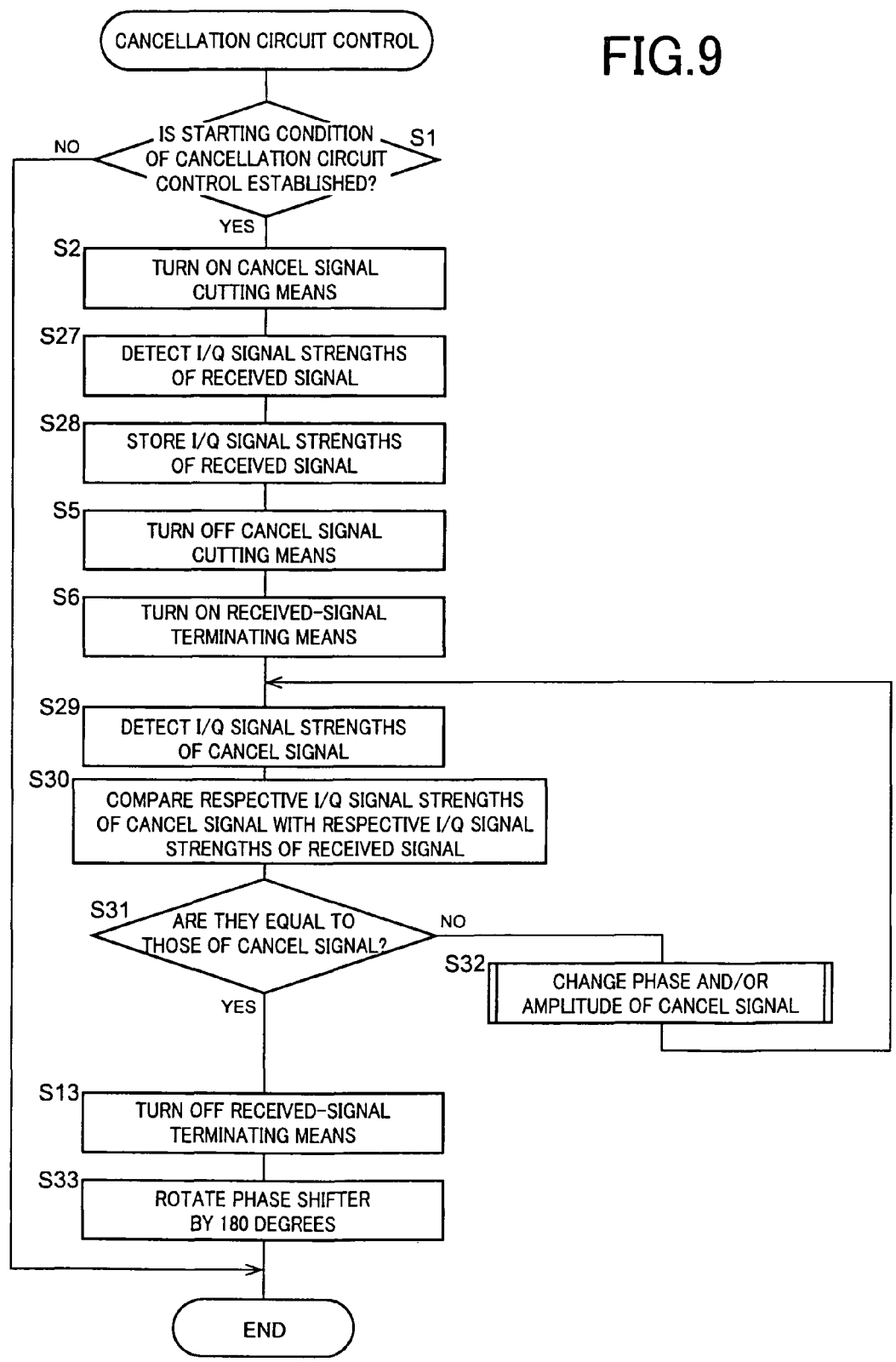
FIG. 9 is a flowchart explaining an outline of another example of the cancellation circuit control by the central controlling unit in the radio-frequency tag communication device shown in any one of FIGS. 3 to 6.

FIG. 9 is a flowchart explaining an outline of another example of the cancellation circuit control by the central controlling unit 34. A step sequence of the flowchart will be repeated in a predetermined cycle. In the control shown in FIG. 9, the same steps as in the control shown in FIGS. 7 to 8 are given the same reference numerals and descriptions thereof are omitted.

In the control shown in FIG. 9, at S27 following the described-above processing at S2, there are detected respective signal strengths of an in-phase component (an I-phase component) and a quadrature component (a Q-phase component) of a received signal supplied via the quadrature demodulating unit 54 from the reception antenna 48. Next, at S28, the memory unit 82 stores the signal strengths of the in-phase and the quadrature components of the received signal detected at S27. Then, after executing the foregoing processings of the S5 to S6, at S29, signal strengths of an in-phase component and a quadrature component of a cancel signal supplied via the quadrature demodulating unit 54 from the cancel signal generating unit 48 are detected.

Next, at S30 corresponding to the operations of the signal strength comparing unit 80, a comparison is made between the signal strengths of the in-phase and the quadrature components of the cancel signal detected at S29 and the signal strengths of the in-phase and the quadrature components of the received signal stored in the memory unit 82 at S28. Then, at S31, as a result of the comparison at S30, a determination is made as to whether the signal strength of the in-phase and the quadrature components of the cancel signal detected at S29 are equal to the strengths of those of the received signal stored in the memory unit 82 at S28.

If the determination at S31 is negative, at S32, the cancel phase control signal and/or the cancel amplitude control signal are controlled to change the phase and/or the amplitude of the cancel signal via the cancel phase controlling unit 60 and/or the cancel amplitude controlling unit 62. After that, the processings at S29 and thereafter are executed again. However, if the determination at S31 is positive, after the foregoing processing at step 13, at S33, the phase of the cancel phase controlling unit 60 is rotated by 180 degrees (shifted forward) and then, the present routine is ended. Throughout the control above, S1, S2, S5, S6, S13, S27 to S33 correspond to operations of the cancel signal controlling unit 72, and S27 and S29 correspond to operations of the signal strength detecting unit 78.

Figure 10:
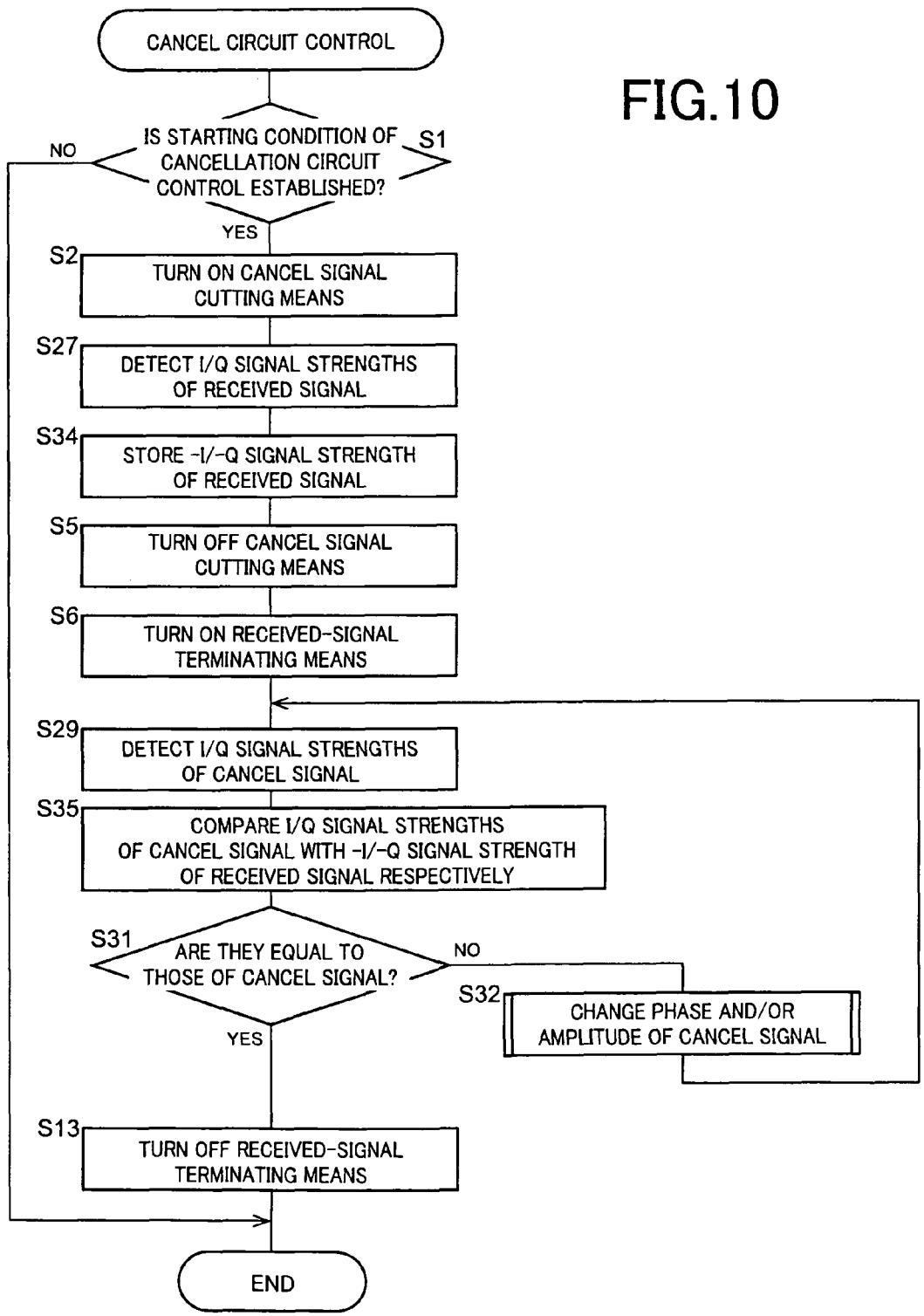
FIG. 10 is a flowchart explaining an outline of still another example of the cancellation circuit control by the central controlling unit in the radio-frequency tag communication device shown in any one of FIGS. 3 to 6.

FIG. 10 is a flowchart explaining an outline of another example of the cancellation circuit control by the central controlling unit 34. A step sequence of the flowchart will be repeated in a predetermined cycle. In the control shown in FIG. 10, the same steps as in the foregoing control shown in FIGS. 7 to 9 are given the same reference numerals and descriptions thereof are omitted.

In the control shown in FIG. 10, at S34 following the foregoing processing at S27, the memory unit 82 stores values obtained by reversing plus and minus signs of the respective signal strengths of the in-phase and the quadrature components of the received signal detected at S27. Next, after executing the foregoing processings at S5, S6, and S29, at S35 corresponding to the operation of the signal strength comparing unit 80, a comparison is made between the signal strengths of the in-phase and the quadrature components of the cancel signal detected at S29 and the signal strengths (the values with plus and minus signs reversed) of the in-phase and the quadrature components of the received signal stored in the memory unit 82 at S28. Then, after executing the foregoing processings at S31 and thereafter, the present routine is ended.

Hereinabove, the preferred embodiments of the first invention have been described in detail with reference to the drawings. However, the first invention is not restricted to them and is implemented in still other modes.

For example, in the foregoing embodiments, the cancel signal controlling unit 72, the signal strength detecting unit 78, the signal strength comparing unit 80, the memory unit 82, and the like are provided as controlling functions of the central controlling unit 34. However, the first invention is not restricted to them, and a controlling device having the same function as those may be provided as a body separate from the central controlling unit 34. Additionally, the cancel signal generating unit 46, the cancel signal synthesizing unit 52, the quadrature demodulating unit 54, and the like are provided as controlling devices separate from the central controlling unit 34. However, the same functions as those of the units may be given as controlling functions of the central controlling unit 34. Processings by those functions may be either digital or analog signal processings.

In the foregoing embodiments, using the cancel amplitude controlling unit 62 as the cancel signal supply suppressing unit, the amplitude of the carrier wave component is controlled so as to maximally reduce output from the cancel amplitude controlling unit 62 upon the suppression of supply of a cancel signal. However, as the cancel signal supply suppressing unit, other various modes can be employed. For example, like the foregoing third circuit switching unit 94 shown in FIG. 5, switching by a switch may allow the suppression of supply of a cancel signal.

In the foregoing embodiments, there has been described the example in which the received-signal input terminal 64i from the reception antenna 48 to the cancel signal synthesizing unit 52 is selectively terminated by switching the switch such as the circuit switching unit 64. However, as the structure of the received-signal terminating unit, similarly, various modes can be employed.

Additionally, in the radio-frequency tag communication device 12 and the like of the foregoing embodiments, the transmission antenna 44 and the reception antenna 48 are respectively provided as individually separate antennas. Alternatively, there may be integrally provided an antenna for both transmission and reception, thereby achieving an advantage of maximally simplifying the structure of the device. Furthermore, there may be another mode in which the radio-frequency tag communication device 98 includes a transmission array antenna and a reception array antenna that are respectively individually provided.

The structures of the foregoing embodiments can be applied to the common devices according to needs and simultaneously. For example, there may be mentioned a structure of applying the third circuit switching unit 94 and the third termination resistance 96 shown in FIG. 5 to the radio-frequency tag communication device 12 shown in FIG. 3, a structure of applying the array antenna 100, the directivity controlling unit 110, and the like shown in FIG. 6 to the radio-frequency tag communication device 12 shown in FIG. 3 and the radio-frequency tag communication device 84 shown in FIG. 4, and the like.

Furthermore, although further detailed exemplification will not be given, the first invention may be embodied with various alterations added, without departing from the scope of the invention.

Next will be described in detail preferred embodiments of radio-frequency tag communication devices according to second to fourth inventions of the present invention with reference to drawings. The radio-frequency tag communication devices of the second to the fourth inventions are suitably used in the radio-frequency tag communication system 10 described above by referring to FIG. 1. The radio-frequency tag 14 as the communication object includes the radio-frequency tag circuit element 16 as described above by referring to FIG. 2.

Figure 11:
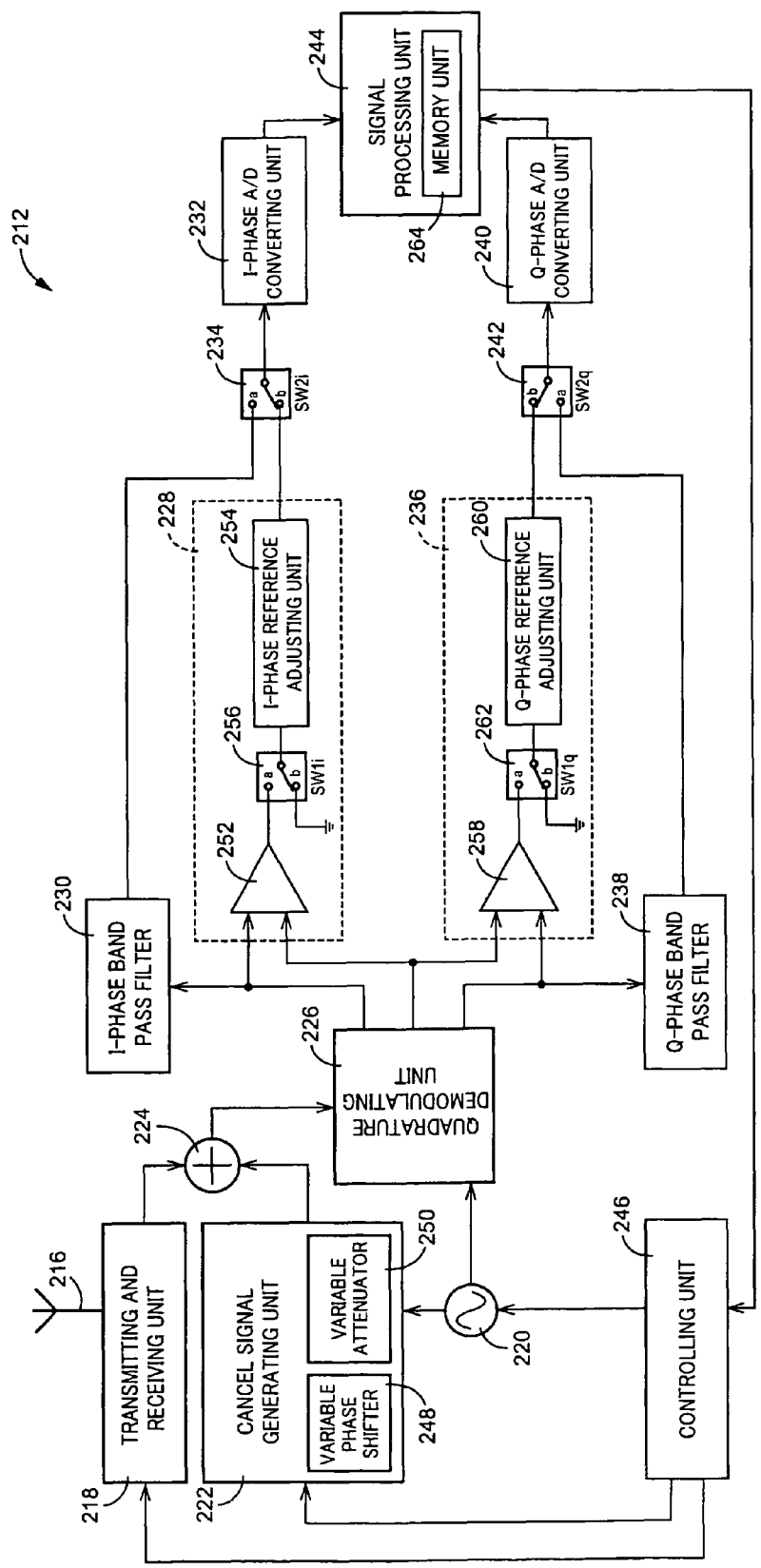
FIG. 11 is an illustration of a structure of a radio-frequency tag communication device as one embodiment of a radio-frequency communication device according to a second invention.

FIG. 11 illustrates a structure of a radio-frequency tag communication device 212 as one embodiment of the second invention. As shown in FIG. 11, the radio-frequency tag communication device 212 of the present embodiment includes an antenna 216 for both transmission and reception, a transmitting and receiving unit 218 that performs transmission and reception processings, a local oscillator 220 that generates a predetermined local signal, a cancel signal generating unit 222, a cancel signal synthesizing unit 224, and a quadrature demodulating unit 226. The transmitting and receiving unit 218 transmits a transmitted signal from the antenna 216 to the radio-frequency tag 14 and receives, by the antenna 216, a reply signal returned from the radio-frequency tag 14 in response to the transmitted signal. The cancel signal generating unit 222 generates a cancel signal for suppressing a direct wave component from a transmission side in a received signal received by the antenna 216 in response to a local signal supplied from the local oscillator 220. The cancel signal synthesizing unit 224 synthesizes the cancel signal generated by the cancel signal generating unit 222 and the received signal received by the antenna 216. The quadrature demodulating unit 226 demodulates the received signal supplied via the cancel signal synthesizing unit 224, as an I-phase component (an in-phase component) and a Q-phase component (a quadrature component) based on the local signal supplied from the local oscillator 220.

Additionally, the radio-frequency tag communication device 212 includes an I-phase direct wave detecting unit 228, an I-phase band pass filter 230, an I-phase A/D converting unit 232, a first circuit and a second circuit, an I-phase circuit switching unit 234 (SW2i), and a Q-phase direct-wave detecting unit 236. The I-phase direct wave detecting unit 228 detects a direct wave component from the transmission side in the I-phase component supplied from the quadrature demodulating unit 226; the I-phase band pass filter 230 passes a signal having a predetermined frequency band in the I-phase component supplied from the quadrature demodulating unit 226; the I-phase A/D converting unit 232 converts a signal output from the I-phase direct wave detecting unit 228 or a signal output from the I-phase band pass filter 230 into a digital signal to supply to a signal processing unit 244; the I-phase circuit switching unit 234 (SW2i) switches the first circuit supplying the signal output from the I-phase band pass filter 230 to the I-phase A/D converting unit 232, and the second circuit supplying the signal output from the I-phase direct wave detecting unit 228 to the I-phase A/D converting unit 232; and the Q-phase direct wave detecting unit 236 detects a direct wave component from the transmission side in the Q-phase component supplied from the quadrature demodulating unit 226.

Furthermore, the radio-frequency tag communication device 212 includes a Q-phase band pass filter 238, a Q-phase A/D converting unit 240, a first circuit and a second circuit, a Q-phase circuit switching unit 242 (SW2$q$), the signal processing unit 244, and a controlling unit 246. The Q-phase band pass filter 238 passes a signal having a predetermined frequency band in the Q-phase component from the quadrature demodulating unit 226; the Q-phase A/D converting unit 240 converts a signal output from the Q-phase direct wave detecting unit 236 or a signal output from the Q-phase band pass filter 238 into a digital signal to supply it to the signal processing unit 244; the Q-phase circuit switching unit 242 (SW2$q$) switches the first circuit supplying the signal output from the Q-phase band pass filter 238 to the Q-phase A/D converting unit 240, and the second circuit supplying the signal output from the Q-phase direct wave detecting unit 236 to the Q-phase A/D converting unit 240; the signal processing unit 244 processes a signal supplied from the I-phase A/D converting unit 232 or the Q-phase A/D converting unit 240; and the controlling unit 246 controls the transmission and reception operations by the transmitting and receiving unit 218, the cancel signal controlling operations by the cancel signal generating unit 222, and the like.

The cancel signal generating unit 222 includes a variable phase shifter 248 as a cancel phase controlling unit controlling a phase of a cancel signal, and a variable attenuator 250 as a cancel amplitude controlling unit controlling an amplitude of a cancel signal. The cancel signal generating unit 222 allows the variable phase shifter 248 and the variable attenuator 250 to control a phase and/or an amplitude of the local signal supplied from the local oscillator 220 to thereby generate a cancel signal for suppressing the direct wave component from the transmission side in the received signal. The cancel signal control is executed based on a result of processing by the signal processing unit 244 as described below. The cancel signal synthesizing unit 224 synthesizes (adds) the cancel signal generated by the cancel signal generating unit 222 to the received signal to thereby suppress a direct wave component (a leakage signal) from the transmission side included in the received signal.

Upon communication of the radio-frequency tag communication device 212 with the radio-frequency tag 14, the circuit switching units 234 and 242 are both connected to side "a". This establishes the first circuit, thereby allowing a received signal received by the antenna 216 to be supplied to the signal processing unit 244 via the band pass filters 230 and 236, and the like. In addition, upon the control of a cancel signal generated by the cancel signal generating unit 222, the circuit switching units 234 and 242 are both connected to side b. Thereby, the second circuit is established, thus allowing direct wave components detected by the direct wave detecting units 228 and 236 to be supplied to the signal processing unit 244.

The I-phase direct wave detecting unit 228 includes an I-phase direct wave extracting unit 252, an I-phase reference adjusting unit 254, and an I-phase switch 256 (SW1$i$). The I-phase direct wave extracting unit 252 is a differential amplifier extracting a direct wave component in an I-phase component (an I-phase signal) supplied from the quadrature demodulating unit 226 in accordance with a difference between the I-phase component and a predetermined reference signal; the I-phase reference adjusting unit 254 is provided between the I-phase direct wave extracting unit 252 and the I-phase A/D converting unit 232 to determine a reference value of the I-phase A/D converting unit 232; and the I-phase switch 256 (SW1$i$) connects or disconnects a circuit between the I-phase direct wave extracting unit 252 and the I-phase reference adjusting unit 254.

As shown in FIG. 11, a side-b terminal of the I-phase switch 256 is grounded. When the I-phase switch 256 and the I-phase circuit switching unit 234, respectively, are connected to side b, the I-phase reference adjusting unit 254 sets an input voltage of the I-phase A/D converting unit 232 to a predetermined reference value. Preferably, the reference value is an intermediate value in a range of voltages inputtable to the I-phase A/D converting unit 232, such as 1.65V. When the I-phase switch 256 is connected to side "a" and the I-phase circuit switching unit 234 is connected to side b, output from the I-phase direct-wave extracting unit 252 is supplied to the I-phase A/D converting unit 232 via the I-phase reference adjusting unit 254 and the I-phase circuit switching unit 234.

The Q-phase direct wave detecting unit 236 includes a Q-phase direct wave extracting unit 258, a Q-phase reference adjusting unit 260, and a Q-phase switch 262 (SW1$q$). The Q-phase direct wave extracting unit 258 is a differential amplifier extracting a direct wave component in an Q-phase component (a Q-phase signal) supplied from the quadrature demodulating unit 226 in accordance with a difference between the Q-phase component and a predetermined reference signal; the Q-phase reference adjusting unit 260 is provided between the Q-phase direct wave extracting unit 258 and the Q-phase A/D converting unit 240 to determine a reference value of the Q-phase A/D converting unit 240; and the Q-phase switch 262 (SW1$q$) connects or disconnects a circuit between the Q-phase direct wave extracting unit 258 and the Q-phase reference adjusting unit 260.

As shown in FIG. 11, a side-b terminal of the Q-phase switch 262 is grounded. When the Q-phase switch 262 and the Q-phase circuit switching unit 242, respectively, are connected to side b, the Q-phase reference adjusting unit 260 sets an input voltage of the Q-phase A/D converting unit 240 to a predetermined reference value. The reference value is preferably an intermediate value in a range of voltages inputtable to the Q-phase A/D converting unit 240, such as 1.65V. When the Q-phase switch 262 is connected to side a and the Q-phase circuit switching unit 242 is connected to side b, output from the Q-phase direct wave extracting unit 258 is supplied to the Q-phase A/D converting unit 240 via the Q-phase reference adjusting unit 260 and the Q-phase circuit switching unit 242.

The signal processing unit 244 is a so-called microcomputer system that includes a CPU, a ROM and a RAM, and uses a temporary storage function of the RAM to execute signal processing in accordance with a program prestored in the ROM. The signal processing unit 244 includes a memory unit 264 storing a signal supplied from the I-phase A/D converting unit 232 or the Q-phase A/D converting unit 240. The signal processing unit 244 calculates an operation value for setting a phase and/or an amplitude of the cancel signal based on reference values and actual output values in the digital conversions of the direct wave components by the I-phase A/D converting unit 232 and the Q-phase A/D converting unit 240 using a predetermined relationship.

Preferably, regarding the respective I-phase component and Q-phase component supplied from the I-phase A/D converting unit 232 and the Q-phase A/D converting unit 240, the signal processing unit 244 calculates an operation value for determining the phase and/or the amplitude of the cancel signal based on reference values and actual output values in the digital conversions by the I-phase A/D converting unit 232 and the Q-phase A/D converting unit 240 using the predetermined relationship. The operation value calculated by the signal processing unit 244 is supplied to the controlling unit 246. The calculation of the operation value will be described below by using a flowchart of FIG. 12.

The controlling unit 246 is a so-called microcomputer system that includes a CPU, a ROM, and a RAM and uses a temporary storage function of the RAM to execute signal processing in accordance with a program prestored in the ROM. The controlling unit 246 serves as a cancel signal controlling unit that controls the phase and/or the amplitude of a cancel signal generated by the cancel signal generating unit 222 based on a processing result by the signal processing unit 244. Additionally, the controlling unit 246 controls transmission and reception via the transmitting and receiving unit 218. For example, the controlling unit 246 controls a transmission timing for a transmitted signal transmitted by the transmitting and receiving unit 218, and allows the transmitting and receiving unit 218 to transmit a carrier wave including no command to detect a direct wave component.

Figure 12:
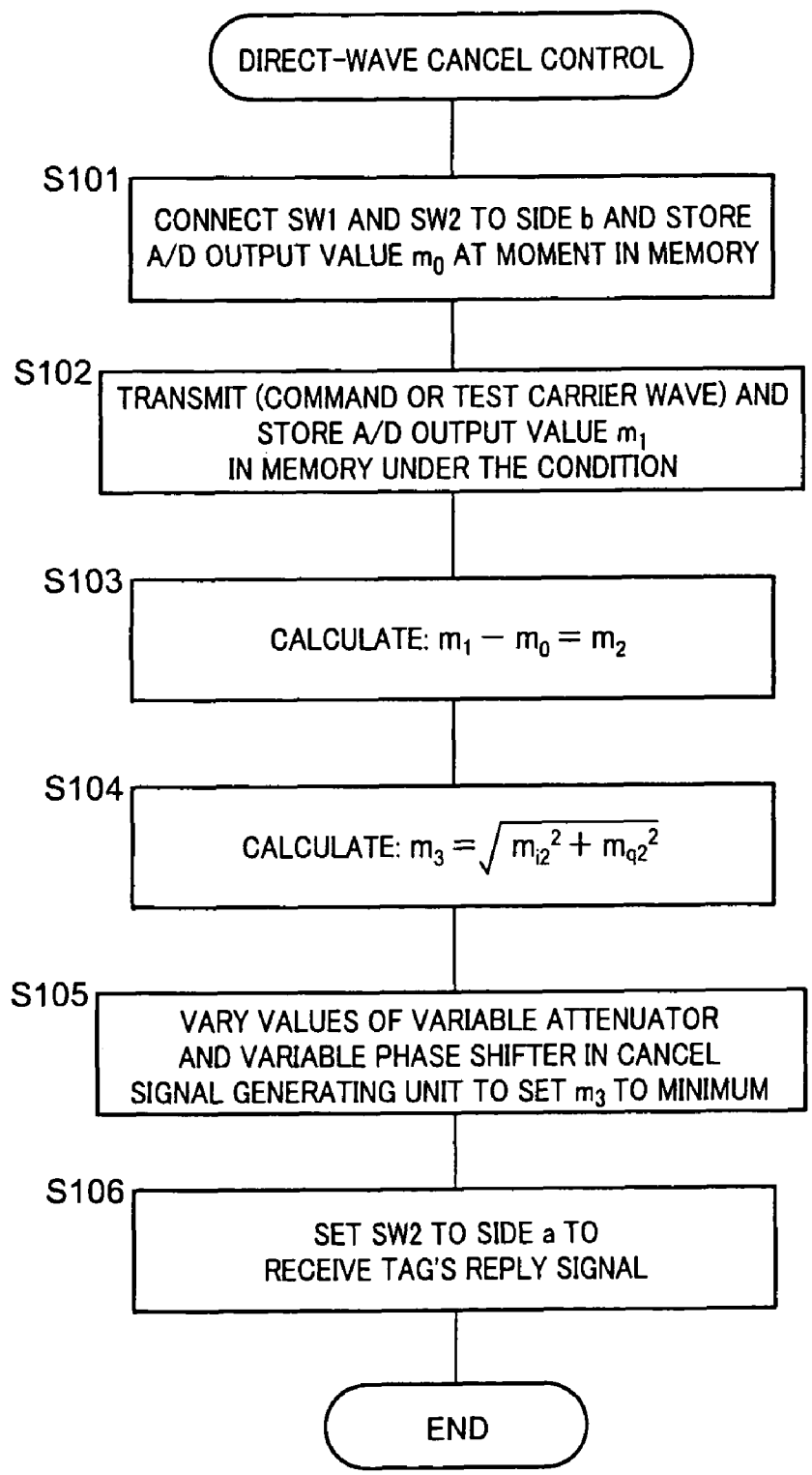
FIG. 12 is a flowchart explaining an outline of a direct-wave cancel control by a signal processing unit and a controlling unit in the radio-frequency tag communication device of FIG. 2.

FIG. 12 is a flowchart explaining an outline of a direct-wave cancellation control by the signal processing unit 244 and the controlling unit 246 of the radio-frequency tag communication device 212. A step sequence of the flowchart will be repeated in a predetermined cycle.

First, at step (hereinafter "step" will be omitted) S101, the I-phase circuit switching unit 234 (SW2$i$) is connected to side b, and the I-phase switch 256 (SW1$i$) of the I-phase direct-wave detecting unit 228 is also connected to side b. The memory unit 264 stores an output $m_{i0}$ of the I-phase A/D converting unit 232 at the moment in time. The output $m_{i0}$ is a value corresponding to a reference value of the I-phase reference adjusting unit 254. The Q-phase circuit switching unit 242 (SW2$q$) is connected to side b, and the Q-phase switch 262 (SW1$q$) of the Q-phase direct wave detecting unit 236 is also connected to side b. The memory unit 264 stores an output $m_{q0}$ of the Q-phase A/D converting unit 240 at the moment in time. The output $m_{q0}$ is a value corresponding to a reference value of the Q-phase reference adjusting unit 260.

Next, at S102, the I-phase switch 256 of the I-phase direct wave detecting unit 228 is switched to side "a" and the Q-phase switch 262 of the Q-phase direct wave detecting unit 236 is switched to side "a", whereby the transmitting and receiving unit 218 transmits a predetermined transmitted signal from the antenna 216. The transmitted signal may be either a signal including a predetermined command or a carrier wave including no command. The memory unit 264 stores an output mil of the I-phase A/D converting unit 232 and an output $m_{q1}$ of the Q-phase A/D converting unit 240. The outputs $m_{i1}$ and $m_{q1}$, respectively, are values corresponding to a direct wave component of the I-phase component detected by the I-phase direct wave detecting unit 228, and a direct wave component of the Q-phase component detected by the Q-phase direct wave detecting unit 236, respectively.

Next, at S103, regarding the I-phase component supplied via the I-phase direct wave detecting unit 228 and the I-phase A/D converting unit 232, a calculation is made to obtain a difference between a reference value and an actual output value in the digital conversion by the I-phase A/D converting unit 232. Specifically, there is calculated a difference $m_{i2}$ (=$m_{i1}-m_{i0}$) between the output mil corresponding to the direct wave component detected at S102, and the output $m_{i0}$ corresponding to the reference value detected at S101. Regarding the Q-phase component supplied via the Q-phase direct wave detecting unit 236 and the Q-phase A/D converting unit 240, a calculation is made to obtain a difference between a reference value and an actual output value in the digital conversion by the Q-phase A/D converting unit 240. Specifically, there is calculated a difference $m_{q2}$ (=$m_{q1}-m_{q0}$) between the output $m_{q1}$ corresponding to the direct wave component detected at S102, and the output $m_{q0}$ corresponding to the reference value detected at S101.

Next, at S104, a calculation is made to obtain an operation value, namely, a square root $m_3$ (=$\{m_{i2}^2+m_{q2}^2\}^{1/2}$) of a sum of squares of the differences $m_{i2}$ and $m_{q2}$ corresponding to the I-phase component and the Q-phase component calculated at S103. The operation value is supplied to the controlling unit 246 to set a phase and/or an amplitude of a cancel signal.

Next, at S105, the phase and/or the amplitude of the cancel signal is controlled via the variable phase shifter 248 and the variable attenuator 250 so as to maximally reduce the operation value supplied from the signal processing unit 244, namely $m_3$ calculated at S104.

Next, at S106, the I-phase circuit switching unit 234 and the Q-phase circuit switching unit 242, respectively, are switched to be connected to side "a", whereby the transmitting and receiving unit 218 transmits a transmitted signal including a predetermined command to the radio-frequency tag 14 from the antenna 216. The antenna 216 receives a reply signal returned from the radio-frequency tag 14 in response to the transmitted signal, and after the cancel signal synthesizing unit 224 synthesizes a cancel signal, the quadrature demodulating unit 226 demodulates the received signal. In this manner, communication with the radio-frequency tag 14 is performed, and then the routine is ended.

In the control described above, the controlling unit 246 controls the cancel signal based on the operation value $m_3$ calculated corresponding to the I-phase component and the Q-phase component. However, the cancel signal may be controlled based on a larger one of the difference $m_{i2}$ between a reference value and an actual output value in digital conversion by the I-phase A/D converting unit 232, and the difference $m_{q2}$ between a reference value and an actual output value in digital conversion by the Q-phase component. Both differences are calculated corresponding to the I-phase component and the Q-phase component, respectively, by the signal processing unit 244.

As described above, the radio-frequency tag communication device of the present embodiment includes the I-phase direct wave detecting unit 228 and the Q-phase direct wave detecting unit 236 each detecting a direct wave component from a transmission side in a received signal received by the antenna 216; the signal processing unit 244 processing the direct wave components detected by the I-phase direct wave detecting unit 228 and the Q-phase direct wave detecting unit 236; the cancel signal generating unit 222 generating a cancel signal for suppressing a direct wave component from the transmission side in the received signal based on a processing result by the signal processing unit 244; and the cancel signal synthesizing unit 224 synthesizing the cancel signal generated by the cancel signal generating unit 222 and the received signal received by the antenna 216. Thus, the device of the present embodiment can accurately detect a direct wave, namely a leakage signal from the transmission side, thereby suitably enabling control of the cancel signal based on the detection result. In short, the radio-frequency tag communication device 212 can sufficiently eliminate a leakage signal from the transmission side included in a received signal.

Additionally, the radio-frequency tag communication device 212 includes the quadrature demodulating unit 226 demodulating an I-phase component and a Q-phase component of a received signal received by the antenna 216. Accordingly, regarding a quadrature detection circuit particularly greatly influenced by a leakage signal from the transmission side, the leakage signal therefrom can be suitably suppressed.

Additionally, the radio-frequency tag communication device 212 includes the direct wave detecting units 228, 236, the A/D converting units 232, 240, and the circuit switching units 234, 242, which are respectively individually corresponding to the I-phase component and the Q-phase component demodulated by the quadrature demodulating unit 226. This enables immediate detection of a direct wave component corresponding to each of the I-phase and the Q-phase components.

The cancel signal generating unit 222 includes the variable phase shifter 248 serving as the cancel phase controlling unit that controls a phase of the cancel signal and the variable attenuator 250 serving as the cancel amplitude controlling unit that controls an amplitude thereof. Thus, the cancel signal can be controlled by the practical mode.

Additionally, the radio-frequency tag communication device 212 includes the I-phase circuit switching unit 234 and the Q-phase circuit switching unit 242. Both the switching units 234 and 242, respectively, switch the first circuit that supplies a received signal received by the antenna 216 to the signal processing unit 244, and the second circuit that supplies a direct wave component detected by the I-phase direct wave detecting unit 228 and the Q-phase direct wave detecting unit 236, respectively, to the signal processing unit 244. This can provide a simplified circuit structure.

The radio-frequency tag communication device 212 includes the I-phase A/D converting unit 232 and the Q-phase A/D converting unit 240, which, respectively, digitally convert a received signal received by the antenna 216 or a direct wave component detected by the I-phase direct wave detecting unit 228 and the Q-phase direct wave detecting unit 236, respectively, to supply it to the signal processing unit 244. In this manner, digital signal processing enables various processings regarding the received signal or the direct wave component.

The I-phase direct wave detecting unit 228 includes the I-phase direct wave extracting unit 252 extracting a direct wave component in an I-phase component in accordance with the difference between the I-phase component of a received signal received by the antenna 216 and a predetermined reference signal; the I-phase reference adjusting unit 254 provided between the I-phase direct wave extracting unit 252 and the I-phase A/D converting unit 232 to determine a reference value of the I-phase A/D converting unit 232; and the I-phase switch 256 connecting or disconnecting the circuit between the I-phase direct wave extracting unit 252 and the I-phase reference adjusting unit 254. Thus, the direct wave component included in the I-phase component of the received signal can be detected by the practical mode.

The Q-phase direct wave detecting unit 236 includes the Q-phase direct wave extracting unit 258 extracting a direct wave component in a Q-phase component in accordance with the difference between the Q-phase component of a received signal received by the antenna 216 and a predetermined reference signal; the Q-phase reference adjusting unit 260 provided between the Q-phase direct wave extracting unit 258 and the Q-phase A/D converting unit 240 to determine a reference value of the Q-phase A/D converting unit 240; and the Q-phase switch 262 connecting or disconnecting the circuit between the Q-phase direct wave extracting unit 258 and the Q-phase reference adjusting unit 260. Thus, the direct wave component included in the Q-phase component of the received signal can be detected by the practical mode.

The signal processing unit 244 calculates an operation value for determining a phase and/or an amplitude of the cancel signal based on reference values and actual output values in the digital conversions of the direct wave components by the I-phase A/D converting unit 232 and the Q-phase A/D converting unit 240 using the predetermined relationship. The controlling unit 246 controls the phase and/or the amplitude of a cancel signal generated by the cancel signal generating unit 222 based on the operation value using the predetermined relationship. Thus, the cancel signal can be suitably controlled based on the direct wave component.

The signal processing unit 244 includes the memory unit 264 storing signals supplied from the I-phase A/D converting unit 232 and the Q-phase A/D converting unit 240. The memory unit 264 stores the outputs $m_{i0}$ and $m_{q0}$ corresponding to the reference values before execution of the digital conversions of the direct wave components by the I-phase A/D converting unit 232 and the Q-phase A/D converting unit 240. Accordingly, the direct wave components can be suitably processed based on the outputs $m_{i0}$ and $m_{q0}$ corresponding to the reference values stored in the memory unit 264.

The signal processing unit 244 calculates an operation value for determining a phase and/or an amplitude of the cancel signal, regarding each of the I-phase component and the Q-phase component supplied via the direct wave detecting units 228, 236 and the A/C converting units 232, 240. The calculation is made based on the outputs $m_{i0}$ and $m_{q0}$ corresponding to the reference values and the actual output values $m_{i1}$ and $m_{q1}$ in the digital conversions by the respective A/D converting units 232 and 240 using the predetermined relationship. Thus, an operation value for controlling the cancel signal can be calculated based on the direct wave components.

Regarding the respective I-phase component and Q-phase component supplied via the direct wave detecting units 228, 236 and the A/D converting units 232, 240, the signal processing unit 244, first, obtains the respective differences $m_{i2}$ and $m_{q2}$ between reference values and actual output values in the digital conversions by the respective A/D converting units 232 and 240. Thereafter, as the operation value, the square root $m_3$ of the sum of the squares of the respective differences corresponding to the I-phase and the Q-phase components is calculated. Accordingly, the signal processing unit 244 can calculate the operation value for controlling the cancel signal based on the direct wave component by the practical mode.

The controlling unit 246 controls the phase and/or the amplitude of a cancel signal generated by the cancel signal generating unit 222 so as to maximally reduce the operation value $m_3$ calculated by the signal processing unit 244. This enables the cancel signal to be controlled based on the operation value by the practical mode.

The controlling unit 246 controls the phase and/or the amplitude of a cancel signal generated by the cancel signal generating unit 222 based on a larger one of the differences $m_{i2}$ and $m_{q2}$. The difference $m_{i2}$ is the difference between a reference value and an actual output value in the digital conversion by the I-phase A/D converting unit 232, calculated corresponding to the I-phase component by the signal processing unit 244. The difference $m_{q2}$ is the difference between a reference value and an actual output value in the digital conversion by the Q-phase A/D converting unit 240, calculated corresponding to the Q-phase component. Accordingly, the controlling unit 246 can control the cancel signal based on the operation value by the practical mode.

The signal processing unit 244 processes the direct wave component included in the received signal received by the antenna 216 in response to a carrier wave or a signal including a predetermined command transmitted from the antenna 216. Thus, the signal processing unit 244 can perform processings such as detection of the direct wave component and control of the cancel signal, for both a carrier wave not including a command and a signal including a command.

The communication object is the radio-frequency tag 14 that enables writing and/or reading of information via radio communication. The radio-frequency communication device is the radio-frequency tag communication device 212 that transmits a predetermined transmitted signal via the antenna 216 to the radio-frequency tag 14, and receives, via the antenna 216, a reply signal returned from the radio-frequency tag 14 in response to the transmitted signal, thereby communicating with the radio-frequency tag 14. Accordingly, in the radio-frequency tag communication device 212 particularly greatly influenced by a leakage signal from the transmission side, the leakage signal therefrom can be suitably suppressed.

Next, another preferable embodiment of the second invention of the present invention will be described in detail based on drawings. In the description below, elements common among the embodiments are given the same reference numerals and descriptions thereof are omitted.

Figure 13:
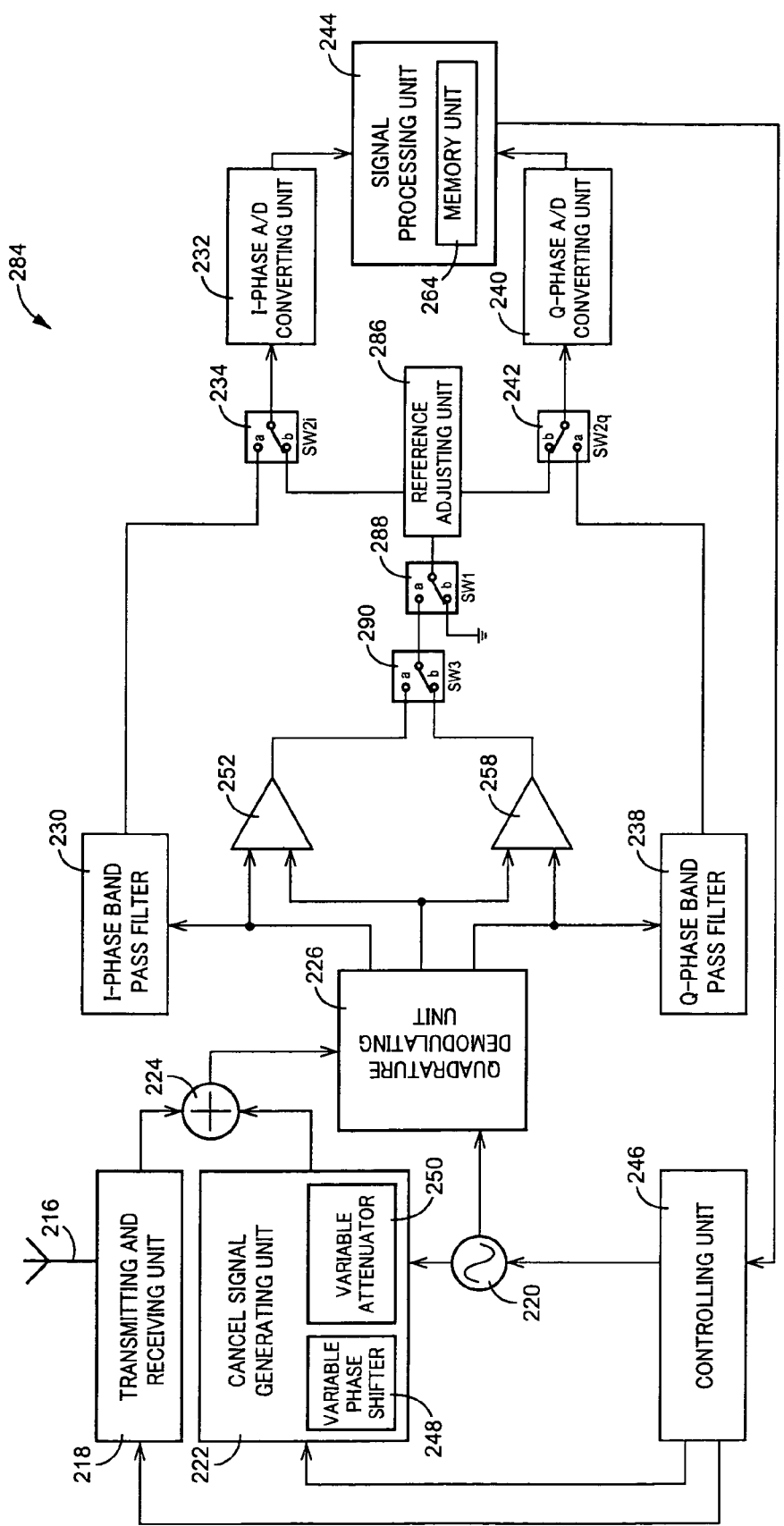
FIG. 13 is an illustration of a structure of a radio-frequency tag communication device as another embodiment of the radio-frequency communication device according to the second invention.

FIG. 13 illustrates a structure of a radio-frequency tag communication device 284 as a preferable embodiment of the radio-frequency communication device of the second invention. As shown in FIG. 13, the radio-frequency tag communication device 284 of the embodiment includes a reference adjusting unit 286, a switch 288 (SW1), and a second circuit switching unit 290 (SW3). The reference adjusting unit 286 is provided between the direct wave extracting units 252, 258 and the A/D converting units 232, 240 corresponding to the respective I-phase component and Q-phase component to determine reference values of the A/D converting units 232 and 240. The switch 288 (SW1) connects or disconnects a circuit between the direct wave extracting units 252, 258 corresponding to the I-phase and the Q-phase components and the reference adjusting unit 286. The second circuit switching unit 290 (SW3) switches a first circuit supplying an output from the I-phase direct wave extracting unit 252 provided corresponding to the I-phase component to the switch 288, and a second circuit supplying an output from the Q-phase direct wave extracting unit 258 provided corresponding to the Q-phase component to the switch 288.

A side-b terminal of the switch 288 is grounded. When the switch 288 is connected to side b and the circuit switching units 234 and 242 are also connected to side b, the reference adjusting unit 286 sets a voltage input of the A/D converting units 232 and 240 to a predetermined reference value. The reference value is preferably an intermediate value in a range of voltages inputtable into the A/D converting units 232 and 240, such as 1.65V. When the switch 288 is connected to side "a" and the circuit switching units 234 and 242 are connected to side b, an output from the I-phase direct wave extracting unit 252 or the Q-phase direct wave extracting unit 258 is supplied to the A/D converting unit 232 or 240 via the reference adjusting unit 286 and the circuit switching unit 234 or 242. When the circuit switching unit 290 is connected to side "a", an output from the I-phase direct wave extracting unit 252 is input to the switch 288, whereas when connected to side b, an output from the Q-phase direct wave extracting unit 258 is input to the switch 288.

In the radio-frequency tag communication device 284, the I-phase direct wave detecting unit is comprised of the I-phase direct wave extracting unit 252, the reference adjusting unit 286 and the switch 288; and the Q-phase direct wave detecting unit is comprised of the Q-phase direct wave extracting unit 258, the reference adjusting unit 286 and the switch 288, respectively.

Figure 14:
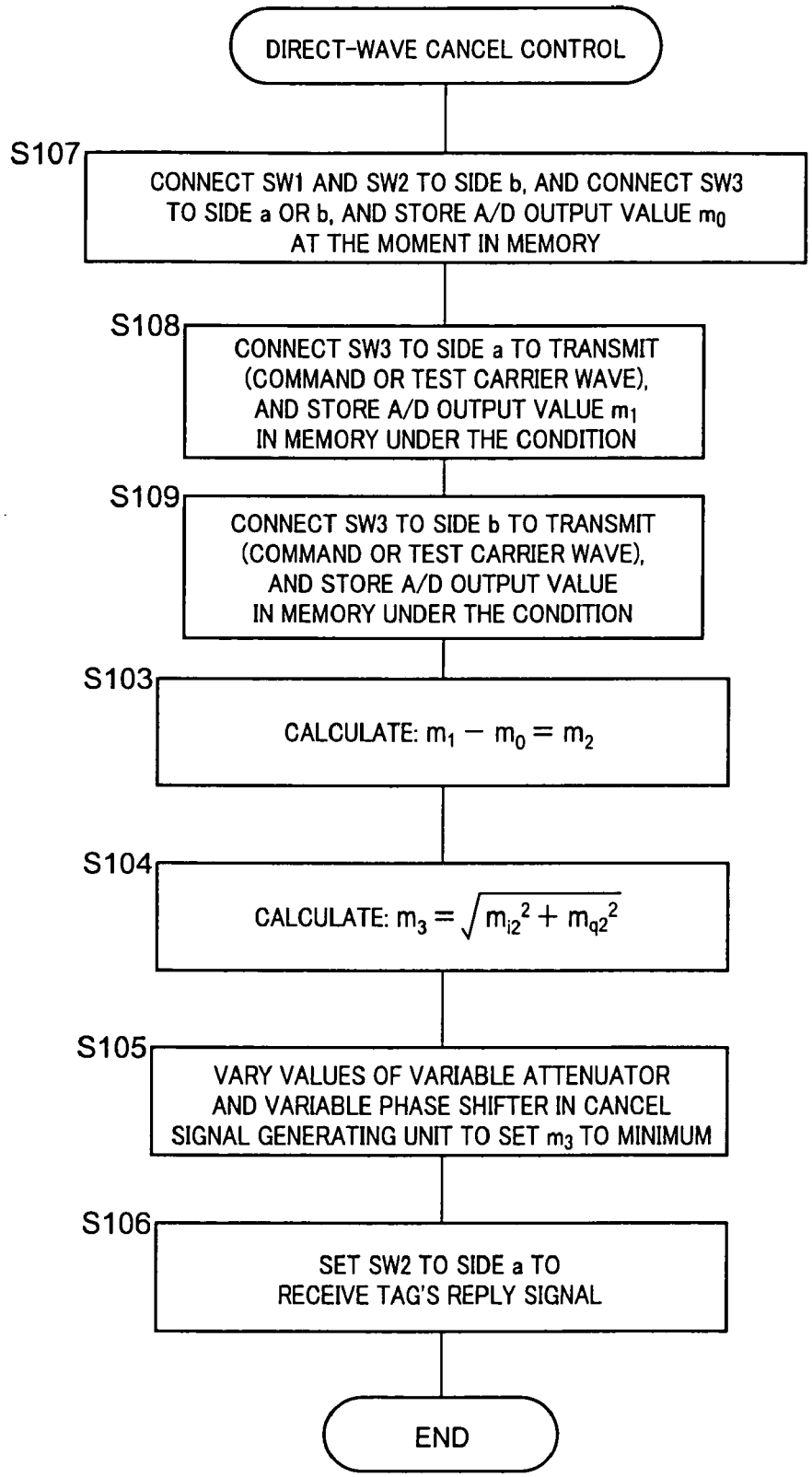
FIG. 14 is a flowchart explaining an outline of a direct-wave cancel control by a signal processing unit and a controlling unit in the radio-frequency tag communication device of FIG. 13.

FIG. 14 is a flowchart explaining an outline of direct wave cancellation control by the signal processing unit 244 and the controlling unit 246 in the radio-frequency tag communication device 284. A step sequence of the flowchart will be repeated in a predetermined cycle. In the control shown in FIG. 14, the same steps as in the foregoing control in FIG. 12 are given the same reference numerals and descriptions thereof are omitted.

First, at S107, the switch 288 (SW1) is connected to side b and the circuit switching units 234 (SW2$i$) and 242 (SW2$q$) are also connected to side b. Then, the memory unit 264 stores the outputs $m_{i0}$ and $m_{q0}$ of the A/D converting units 232 and 240 at the moment in time. The outputs $m_{i0}$ and $m_{q0}$ are values corresponding to the reference values determined by the reference adjusting unit 286. In this situation, the circuit switching unit 290 (SW3) may be connected either to side "a" or to side b.

Next, at S108, the circuit switching unit 290 is switched to be connected to side "a", whereby the transmitting and receiving unit 218 transmits a predetermined transmitted signal from the antenna 216. The transmitted signal may be either a signal including a predetermined command or a carrier wave not including a command. Then, the memory unit 264 stores the output mil of the I-phase A/D converting unit 232 corresponding to the transmitted signal. The output $m_{i1}$ is a value corresponding to a direct wave component in the I-phase component extracted by the I-phase direct wave extracting unit 252.

Next, at S109, the circuit switching unit 290 is switched to be connected to side b, whereby the transmitting and receiving unit 218 transmits a predetermined transmitted signal from the antenna 216. The transmitted signal may be either a signal including a predetermined command or a carrier wave not including a command. The memory unit 264 stores the output $m_{q1}$ of the Q-phase A/D converting unit 240 corresponding to the transmitted signal. The output $m_{q1}$ is a value corresponding to the direct wave component of the Q-phase component extracted by the Q-phase direct wave extracting unit 258. After the foregoing processings from S103 to S106, the present routine is ended.

As described above, the communication device of the present embodiment includes the direct wave extracting units 252, 258, the A/D converting units 232, 240, and the circuit switching units 234, 240, which are respectively individually provided corresponding to the I-phase component and the Q-phase component demodulated by the quadrature demodulating unit 226. In addition, the communication device of the embodiment includes the reference adjusting unit 286, the switch 288, and the second circuit switching unit 290.

The reference adjusting unit 286 is provided between the direct wave extracting units 252, 258 and the A/D converting units 232, 240 corresponding to the respective I-phase and the Q-phase components to determine the reference values of the A/D converting units 232, 240. The switch 288 connects or disconnects the circuit between the direct wave extracting units 252, 258 corresponding to the I-phase and the Q-phase components and the reference adjusting unit 286. The second circuit switching unit 290 switches the first circuit supplying an output from the I-phase direct wave extracting unit 252 provided corresponding to the I-phase component to the switch 288, and the second circuit supplying an output from the Q-phase direct wave extracting unit 258 provided corresponding to the Q-phase component to the switch 288. Thereby, the communication device of the present embodiment detects a direct wave component corresponding to each of the I-phase and the Q-phase components by using a more simplified circuit than in the foregoing radio-frequency tag communication device 212.

Hereinabove, although the preferable embodiment of the second invention has been described in detail with reference to the drawings, the second invention is not restricted to that but is implemented in still other modes.

For example, in the foregoing embodiment, the direct wave detecting units 228 and 236, respectively, include the direct wave extracting units 252 and 258, respectively, as the differential amplifiers. However, the second invention is not restricted to that. For example, a direct wave component can also be extracted by using a structure of adding a minus polarity to a received signal, or the like.

In the foregoing embodiment, the controlling unit 246 controls the phase and/or the amplitude of a cancel signal generated by the cancel signal generating unit 222 so as to maximally reduce the operation value $m_3$ calculated by the signal processing unit 244. However, for example, the radio-frequency communication device of the present embodiment may be a radio-frequency communication device including a low noise amplifier (LNA), which controls the phase and/or the amplitude of the cancel signal so as to maximize an output of the low noise amplifier.

The foregoing embodiment exemplifies the radio-frequency tag communication device 212 with the antenna 216 for both transmission and reception, and the like. However, the second invention of the present invention may be applied to a radio-frequency communication device with a transmission antenna and a reception antenna respectively individually provided therein.

Furthermore, although further detailed exemplification will not be given, the second invention of the present invention may be embodied with various alternations added, without departing from the scope of the invention.

Figure 15:
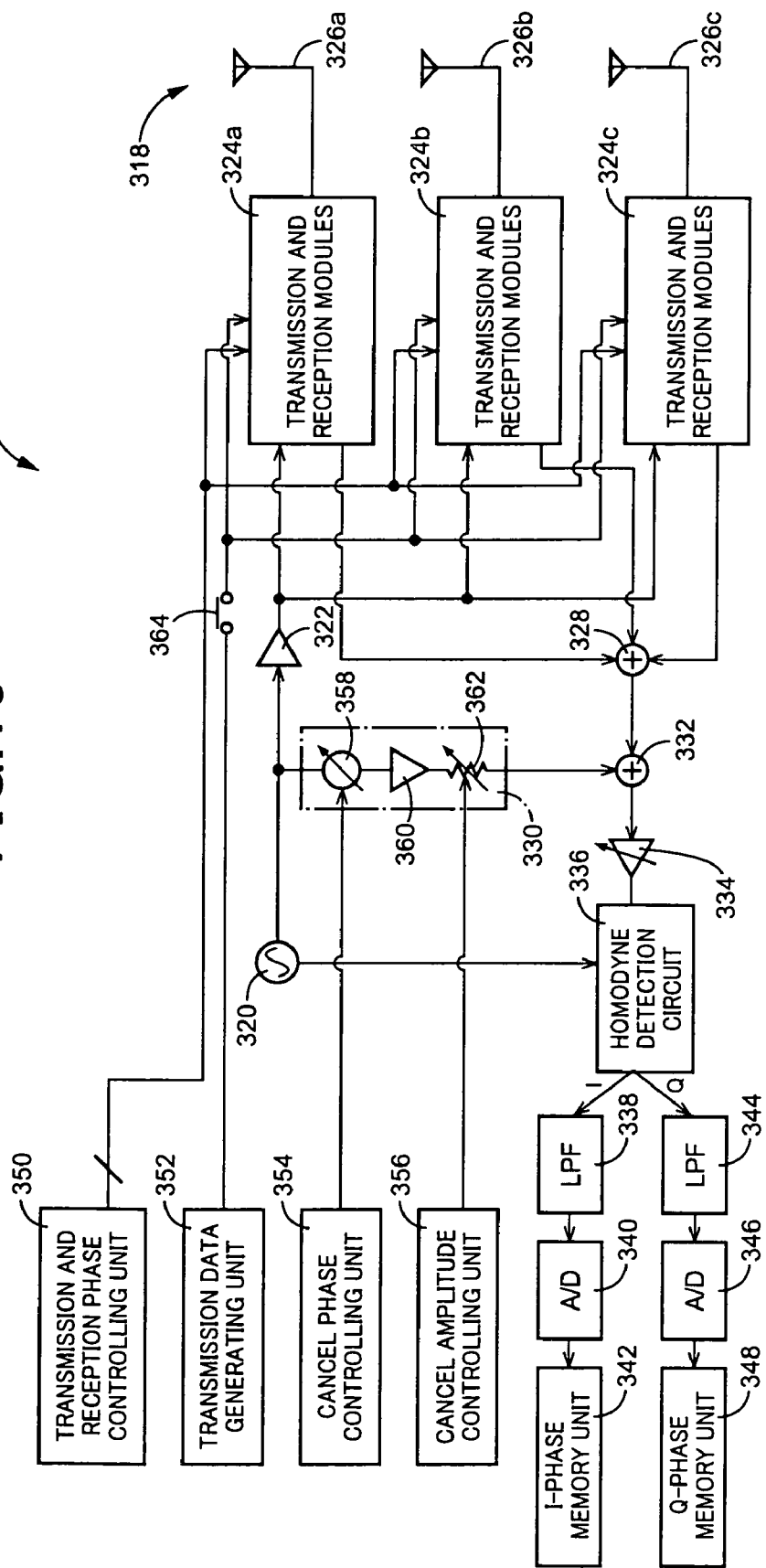
FIG. 15 is an illustration of a structure of a radio-frequency tag communication device as an embodiment of a radio-frequency communication device according to a third invention.

FIG. 15 illustrates a structure of a radio-frequency tag communication device 312 as an embodiment of the third invention. The radio-frequency tag communication device 312 of the embodiment includes a local oscillator 320, a carrier-wave amplifying unit 322, a plurality of (three in FIG. 15) transmission and reception modules i.e. transmission/reception modules 324a, 324b, and 324c, and antenna elements 326a, 326b, and 326c for both transmission and reception. The local oscillator 320 generates a predetermined local signal corresponding to a carrier wave; the carrier wave amplifying unit 322 amplifies the carrier wave output from the local oscillator unit 320; the transmission and reception modules 324a, 324b, and 324c (hereinafter referred to simply as the "transmission and reception module 324" when not distinguished) transmit, from the corresponding antenna elements 326, a transmitted signal based on the carrier wave supplied from the carrier wave amplifying unit 322 and process a received signal received by the antenna elements 326; and the antenna elements 326a, 326b, and 326c for both transmission and reception (hereinafter referred to simply as the "antenna element 326" when not distinguished) are provided corresponding to the respective transmission and reception modules 324a, 324b, and 324c.

Additionally, the radio-frequency tag communication device 312 includes a received-signal synthesizing unit 328, a cancel signal generating unit 330, a cancel signal synthesizing unit 332, a variable amplifying unit 334, and a homodyne detection circuit 336. The received-signal synthesizing unit 328 synthesizes (adds) received signals supplied from the transmission and reception modules 324; the cancel signal generating unit 330 generates a cancel signal for suppressing a leakage signal from a transmission side based on the carrier wave supplied from the local oscillator 320; the cancel signal synthesizing unit 332 synthesizes (adds) a synthesized received signal supplied from the received-signal synthesizing unit 328, and the cancel signal supplied from the cancel signal generating unit 330; the variable amplifying unit 334 amplifies a synthesized signal supplied from the cancel signal synthesizing unit 332; and the homodyne detection circuit 336 performs homodyne detection of the synthesized signal from the variable amplifying unit 334.

Furthermore, the radio-frequency tag communication device 312 includes an I-phase low pass filter (LPF) 338, an I-phase A/D converting unit 340, an I-phase memory unit 342, a Q-phase low pass filter (LPF) 344, a Q-phase A/D converting unit 346, a Q-phase memory unit 348, a transmission and reception phase controlling unit 350, a transmission data generating unit 352, a cancel phase controlling unit 354, and a cancel amplitude controlling unit 356. The I-phase LPF 338 passes only signals including a direct current component and having a predetermined frequency band among I-phase signals (in-phase components) output from the homodyne detection circuit 336; the I-phase A/D converting unit 340 digitally converts the I-phase signals supplied from the I-phase LPF 338; the I-phase memory unit 342 stores the I-phase signals supplied from the I-phase A/D converting unit 340; the Q-phase LPF 344 passes only signals including a direct current component and having a predetermined frequency band among Q-phase signals (quadrature component) output from the homodyne detection circuit 336; the Q-phase A/D converting unit 346 digitally converts the Q-phase signals supplied from the Q-phase LPF 344; and the Q-phase memory unit 348 stores the Q-phase signals supplied from the Q-phase A/D converting unit 346.

In the radio-frequency tag communication device 312 of the present embodiment, an array antenna 318 for both transmission and reception is comprised of the antenna elements 326a, 326b, and 326c. The array antenna 318 serves as a reception antenna and a transmission antenna.

The cancel signal generating unit 330 includes a cancel phase shifting unit 358, a cancellation amplifier 360, and a cancellation attenuator 362. The cancel phase shifting unit 358 is a variable phase shifter that controls a phase of the carrier wave, as a cancel signal, supplied from the local oscillator 320; the cancellation amplifier 360 is a variable gain amplifier that amplifies the cancel signal output from the cancel phase shifting unit 358; and the cancellation attenuator 362 is a variable attenuator that attenuates the cancel signal output from the cancellation amplifier 360 to supply to the cancel signal synthesizing unit 332.

The cancel phase controlling unit 354 outputs a phase control signal for controlling a phase of the cancel signal generated by the cancel signal synthesizing unit 330. The cancel phase shifting unit 358 controls a phase of the carrier wave (an amount of phase shift) in accordance with the phase control signal supplied from the cancel phase controlling unit 354. The cancel amplitude controlling unit 356 outputs an amplitude control signal for controlling an amplitude of the cancel signal generated by the cancel signal generating unit 330. The cancellation attenuator 362 controls an amplitude of the carrier wave (an amount of attenuation) in accordance with the amplitude control signal supplied from the cancel amplitude controlling unit 356.

In the radio-frequency tag communication device 312 of the present embodiment, the cancel phase controlling unit 354 and the cancel amplitude controlling unit 356 correspond to a cancel signal controlling unit. Thus, preferably, the cancel phase controlling unit 354 and the cancel amplitude controlling unit 356 control the phase and/or the amplitude of the cancel signal via the cancel phase shifting unit 358 and the cancellation attenuator 362 such that the cancel signal has an amplitude equal to an amplitude of and a phase opposite to a phase of the synthesized signal output from the received-signal synthesizing unit 328. The cancel phase shifting unit 358 has substantially the same characteristic as that of a transmission phase shifting unit 366 included in the transmission and reception module 324. The cancellation amplifier 360 has substantially the same characteristic as that of a transmission amplifier 368 included in the transmission and reception module 324. That will be described in detail below.

Figure 16:
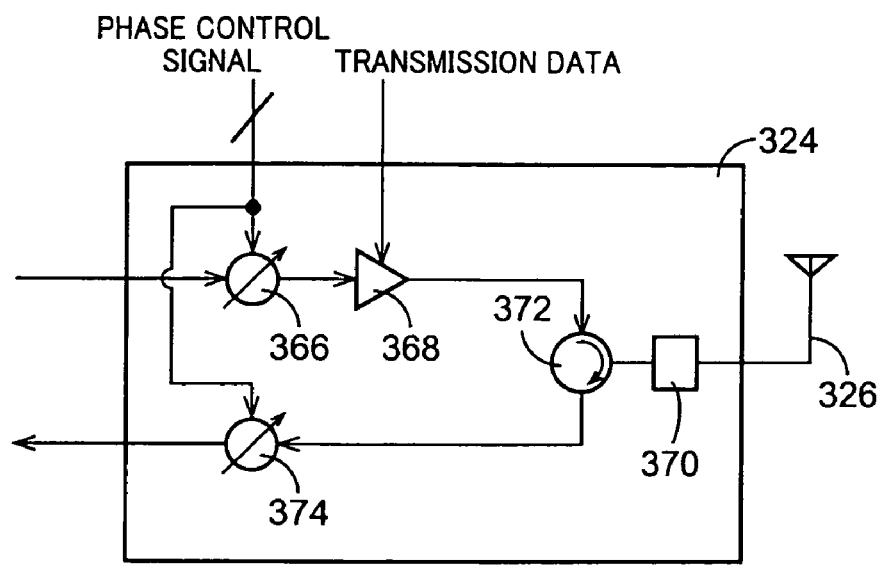
FIG. 16 is a detailed illustration of a structure of a transmission and reception module included in the radio-frequency tag communication device of FIG. 15.

FIG. 16 illustrates a structure of the transmission and reception module 324 in detail. As shown in FIG. 16, the transmission and reception module 324 includes the transmission phase shifting unit 366, the transmission amplifier 368, a transmission filter 370, a transmission and reception separating unit 372, and a reception phase shifting unit 374. The transmission phase shifting unit 366 is a variable phase shifter that controls a phase of a carrier wave supplied from the carrier wave amplifying unit 322; the transmission amplifier 368 is a variable gain amplifier that modulates a carrier wave output from the transmission phase shifting unit 366 based on a predetermined transmission data to output the transmitted signal; the transmission filter 370 is provided in a signal transmission path between the transmission amplifier 368 and the antenna element 326; and the reception phase shifting unit 374 is a variable phase shifter that controls a phase of a received signal supplied from the transmission and reception separating unit 372. The transmission and reception separating unit 372 supplies the transmitted signal output from the transmission amplifier 368 to the antenna element 326 via the transmission filter 370, as well as supplies a received signal received by the antenna element 326 and supplied via the transmission filter 370 to the reception phase shifting unit 374.

The transmission data generating unit 352 generates transmission data such as a command corresponding to transmitted information to supply it to the transmission amplifier 368 via a switch 364. The transmission amplifier 368 modulates the carrier wave based on the transmission data supplied from the transmission data generating unit 352. The switch 364 is switchingly controlled by the transmission data generating unit 352, for example. The switch 364 is connected when the carrier wave needs to be modulated based on the transmission data generated by the transmission data generating unit 352, whereas disconnected when demodulation of the carrier wave is not needed (e.g. a case of transmission of a carrier wave including no command).

The transmission and reception phase controlling unit 350 outputs a phase control signal for controlling a phase of a received signal received by the transmitted signal transmitted by the antenna element 326 and/or a phase of a received signal received by the antenna element 326. The transmission phase shifting unit 366 controls the phase (the amount of phase shift) of the transmitted signal in response to the phase control signal supplied form the transmission and reception phase controlling unit 350. The reception phase shifting unit 374 controls the phase (the amount of phase shift) of the received signal in response to the phase control signal supplied from the transmission and reception phase controlling unit 350.

In the radio-frequency tag communication device 312 of the present embodiment, the cancellation amplifier 360 included in the cancel signal generating unit 330 has substantially the same characteristic as that of the transmission amplifier 368 included in the transmission and reception module 324. Preferably, the cancel phase shifting unit 358 in the cancel signal generating unit 330 has substantially the same characteristic as that of the transmission phase shifting unit 366 included in the transmission and reception module 324. Preferably, the reception phase shifting unit 374 included in the transmission and reception module 324 has substantially the same characteristic as those of the cancel phase shifting unit 358 and the transmission phase shifting unit 366.

In that case, devices having substantially the same characteristics represent products i.e. articles such as the same products with the same model numbers manufactured by the same manufacturers, the same standardized products with the same standards but manufactured by different manufacturers, and compatible products. Preferably, regarding the phase shifting units, an error margin of a phase of an output signal with respect to a same input signal is ±1% or lower. In the amplifiers, an error margin of an amplification factor of an output signal with respect to a same input signal is ±1% or lower.

Figure 17:
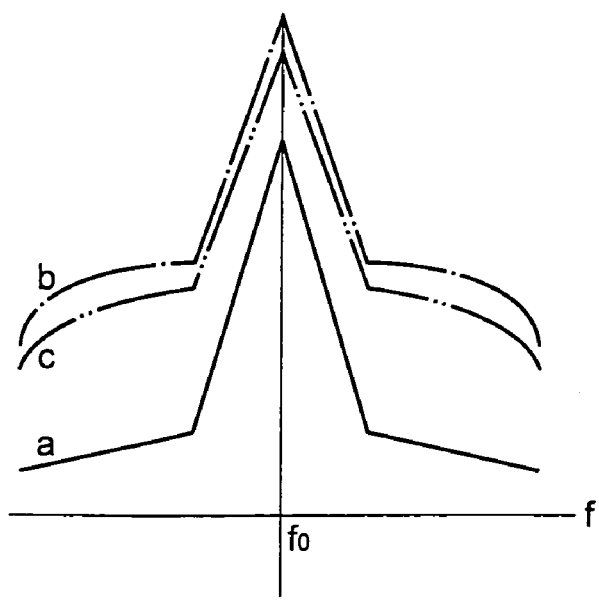
FIG. 17 is a diagram showing signals in respective units of the transmission and reception module of FIG. 16, where a solid line a represents a signal input to the transmission and reception module, a single-dotted chain line b represents a signal output from a transmission amplifier, and a double-dotted chain line c represents a received signal received by an antenna element.

FIG. 17 illustrates a signal of each unit of the transmission and reception module (a frequency band near a central frequency $f_0$ of a carrier wave). A solid line a represents an input signal to the transmission and reception module 324, namely, an output signal from the carrier wave amplifying unit 322. A single-dotted chain line b represents an output signal from the transmission amplifier 368, and a double-dotted chain line c represents a received signal received by the antenna element 326.

As shown in FIG. 17, the signal "a" input to the transmission and reception module 324 is phase-controlled by the transmission phase shifting unit 366 and amplified by the transmission amplifier 368. This increases a noise of the signal a due to a non-linearity of the transmission amplifier 368, thereby allowing the signal "a" to be output as a signal similar to the signal b from the transmission amplifier 368. The received signal received by the antenna element 326 is transferred from the antenna element 326 via the transmission filter 370. As a result, the transmission filter 370 and the antenna element 326 change frequency characteristics of the signal, resulting in becoming a signal similar to the signal c.

Meanwhile, the cancel signal synthesizing unit 332 suppresses a cancel signal by subtracting a cancel signal generated by the cancel signal generating unit 330 from a leakage signal as a synthesized signal of the signals b and c shown in FIG. 17. Thus, preferably, the cancellation amplifier 360 amplifies the cancel signal such that the cancel signal is highly correlated with the signals b and c. In this case, a signal input to the cancel phase shifting unit 358 of the cancel signal generating unit 330 is the carrier wave output from the local oscillator 320, thus resulting in substantially the same shape (but having a different amplitude) as that of the signal "a" shown in FIG. 17. The cancel signal generating unit 330 includes the cancel phase shifting unit 358 and the cancellation amplifier 360 having substantially the same characteristics as those of the transmission phase shifting unit 366 and the transmission amplifier 368 included in the transmission module 324. Accordingly, the cancel signal generating unit 330 can generate a cancel signal highly correlated with the signals b and c shown in FIG. 17. This can suitably suppress a noise increase upon suppression of a cancel signal in the cancel signal generating unit 332.

Figure 18:
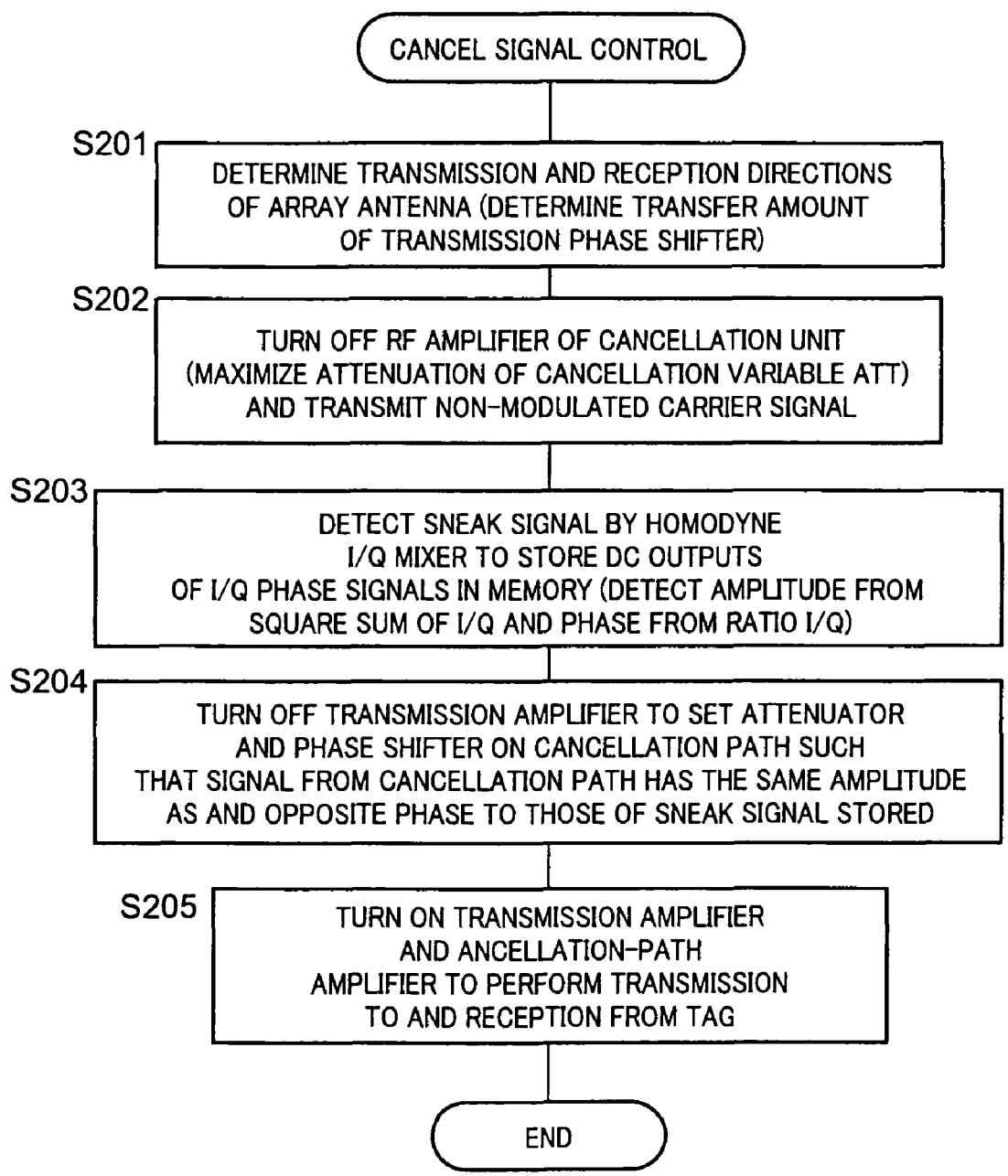
FIG. 18 is a flowchart explaining an outline of a cancel signal control by the radio-frequency tag communication device of FIG. 15.

FIG. 18 is a flowchart explaining an outline of the cancel signal control by the radio-frequency tag communication device 312. A step sequence of the flowchart will be repeated in a predetermined cycle.

First, at step (hereinafter "step" will be omitted) S201, the amount of phase shift in the transmission phase shifting unit 366 and/or the reception phase shifting unit 374 of each transmission and reception module 324 is determined, and then, a transmission and reception direction (a transmission and reception directivity) of the array antenna 318 is determined. Next, at S202, the cancellation amplifier 360 in the cancel signal generating unit 330 is turned off. Alternatively, after maximizing an attenuation amount of the cancellation attenuator 362, the switch 364 is released, that is, where transmission data is not transmitted. Under that condition, a not-modulated carrier wave, namely, a non-modulated carrier signal is transmitted from the array antenna 318.

Next, at S203, the homodyne detection circuit 336 detects a received signal received by the array antenna 318, and the I-phase memory unit 342 and/or the Q-phase memory unit 348 store DC outputs of I-phase signal and Q-phase signal (outputs having direct current components). In this case, preferably, an amplitude of a leakage signal is detected based on a sum of squares of the I-phase and the Q-phase signals, and a phase of the leakage signal is detected based on a ratio between the I-phase and the Q-phase signals. Next, at S204, the transmission amplifier 368 included in each transmission and reception module 324 is turned off. Thereby, the phase and/or the amplitude of the cancel signal are controlled via the cancel phase shifting unit 358 and the cancellation attenuator 362 so as to be equal to the amplitude of and opposite to the phase of the leakage signal stored in the I-phase memory unit 342 and/or the Q-phase memory unit 348.

Next, at S205, the transmission amplifier 368 included in the each transmission and reception module 324 is turned on, thereby resulting in a condition where the switch 364 is connected, that is, transmission data is transmitted. After a transmitted signal is transmitted from the array antenna 318 to the radio-frequency tag 14 as the communication object, the present routine is ended.

As described above, the communication device of the present embodiment includes the transmission amplifier 368 modulating a carrier wave based on a predetermined transmission data to output the transmitted signal; the cancel signal generating unit 330 including the cancel phase shifting unit 358 controlling the phase of a cancel signal based on the carrier wave and the cancellation amplifier 360 having substantially the same characteristic as that of the transmission amplifier 368 to amplify the cancel signal; and the cancel signal synthesizing unit 332 adding the cancel signal generated by the cancel signal generating unit 330 to a received signal received by the array antenna 318. Thus, the cancellation amplifier 360 having substantially the same characteristic as that of the transmission amplifier 368 used in a transmission circuit is used in a cancellation circuit. This can maximally equalize the characteristics of noise included in a leakage signal from the transmission side with the characteristics of noise included in a cancel signal. As a result, adding the cancel signal to the received signal can suitably reduce the noise. In other words, there can be provided the radio-frequency tag communication device 312 in which an SN ratio is improved while suitably eliminating a leakage signal from the transmission side included in the received signal.

The transmission antenna included in the radio-frequency tag communication device 312 is the array antenna 318 comprised of the plurality of antenna elements 326 and having the transmission amplifier 368 having substantially the same characteristics as those of the cancellation amplifier 360, corresponding to the each antenna element 326. Accordingly, the radio-frequency tag communication device 312 with the practical array antenna 318 can suitably eliminate the leakage signal from the transmission side included in the received signal, as well as can improve the SN ratio.

The transmission amplifier 368 and the cancellation amplifier 360 are variable gain amplifiers capable of changing an amplification factor. Thus, varying the amplification factor of each of the transmission amplifier 368 and the cancellation amplifier 360 as needed enables more suitable elimination of the leakage signal from the transmission side included in the received signal, and also enables maximum improvement of the SN ratio.

The radio-frequency tag communication device 312 includes the transmission phase shifting unit 366 controlling the phase of a transmitted signal transmitted from the array antenna 318 and the reception phase shifting unit 374 controlling the phase of a received signal received by the array antenna 318. Thus, the practical radio-frequency tag communication device 312 capable of executing phased array control enables suitable elimination of the leakage signal from the transmission side included in the received signal and also enables an improvement in the SN ratio.

The transmission phase shifting unit 366 and the reception phase shifting unit 374 have substantially the same characteristics as that of the cancel phase shifting unit 358. Including the transmission phase shifting unit 366 and the reception phase shifting unit 374 with substantially the same characteristics as that of the cancel phase shifting unit 358 used in the cancellation circuit enables the characteristics of noise in a leakage signal from the transmission side to be made maximally equal to those of noise in a cancel signal, when executing the phased array control.

The radio-frequency tag communication device 312 further includes the cancel phase controlling unit 354 and the cancel amplitude controlling unit 356, which serve as the cancel signal controlling unit that controls the phase and/or the amplitude of the cancel signal so as to be equal to the amplitude of and opposite to the phase of a received signal received by the array antenna 318. This enables a leakage signal from the transmission side included in the received signal to be maximally eliminated.

The radio-frequency communication device of the present embodiment transmits a predetermined transmitted signal to the radio-frequency tag 14 as the communication object from the array antenna 318, and receives, via the array antenna 318, a reply signal returned from the radio-frequency tag 14 in response to the transmitted signal, thereby communicating information with the radio-frequency tag 14. Thus, in the radio-frequency tag communication device 312 particularly greatly influenced by a leakage signal from the transmission side, the leakage signal therefrom included in the received signal can be suitably eliminated and also the SN ratio can be improved.

Next, other preferred embodiments of the third invention of the present invention will be described in detail with reference to drawings. The embodiments described below are modified examples of the cancel signal generating unit 330 in the radio-frequency tag communication device 312. Thus, descriptions of elements common among the embodiments are omitted. Additionally, the same elements as those in the foregoing embodiment are given the same reference numerals and descriptions thereof are omitted.

Figure 19:
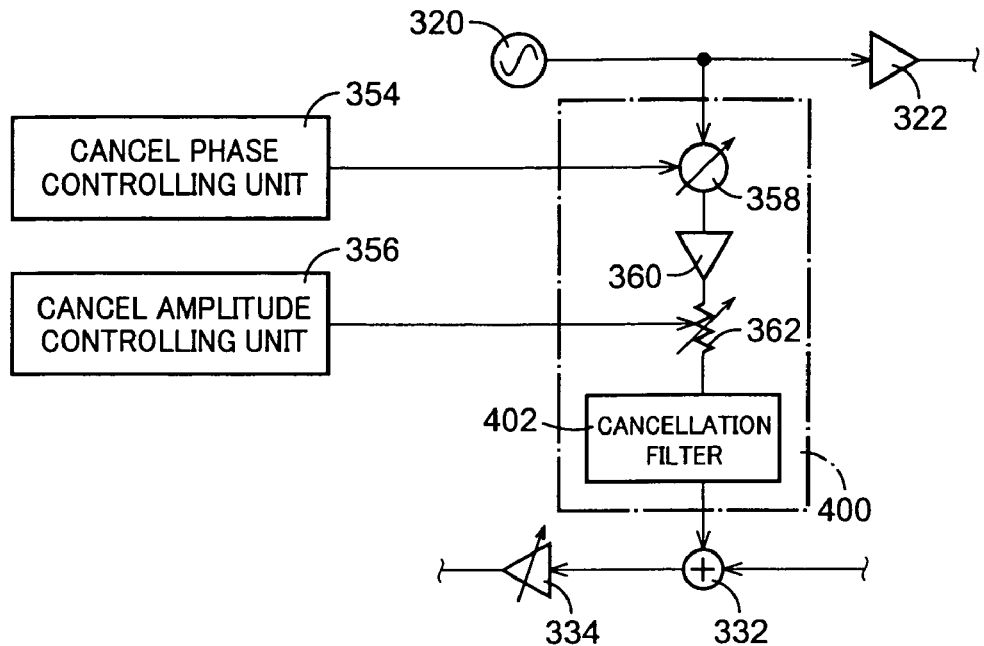
FIG. 19 is an illustration of a structure of a cancel signal generating unit used instead of a cancel signal generating unit in the radio-frequency tag communication device of FIG. 15.

FIG. 19 illustrates a structure of a cancel signal generating unit 400 used as an alternative to the cancel signal generating unit 330 in the radio-frequency tag communication device 312. As shown in FIG. 19, the cancel signal generating unit 400 of the present embodiment includes a cancellation filter 402 in the signal transmission path between the cancellation attenuator 362 and the cancel signal synthesizing unit 332. The cancellation filter 402 has substantially the same characteristics as that of the transmission filter 370 included in the transmission and reception module 324. A cancel signal generated by the cancel phase shifting unit 358, the cancellation amplifier 360, and the cancellation attenuator 362 is input to the cancel signal synthesizing unit 332 via the cancellation filter 402.

Accordingly, in the present embodiment, the transmission filter 370 is provided in the signal transmission path between the transmission amplifier 368 and the array antenna 318, as well as the cancellation filter 402 having substantially the same characteristics as that of the transmission filter 370 is provided in the signal transmission path between the cancellation amplifier 360 and the cancel signal synthesizing unit 332. The cancel filter 402 having substantially the same characteristics as that of the transmission filter 370 used in the transmission circuit is provided in the cancellation circuit. This can maximally equalize the characteristics of noise included in a leakage signal from the transmission side with the characteristics of noise included in a cancel signal.

Figure 20:
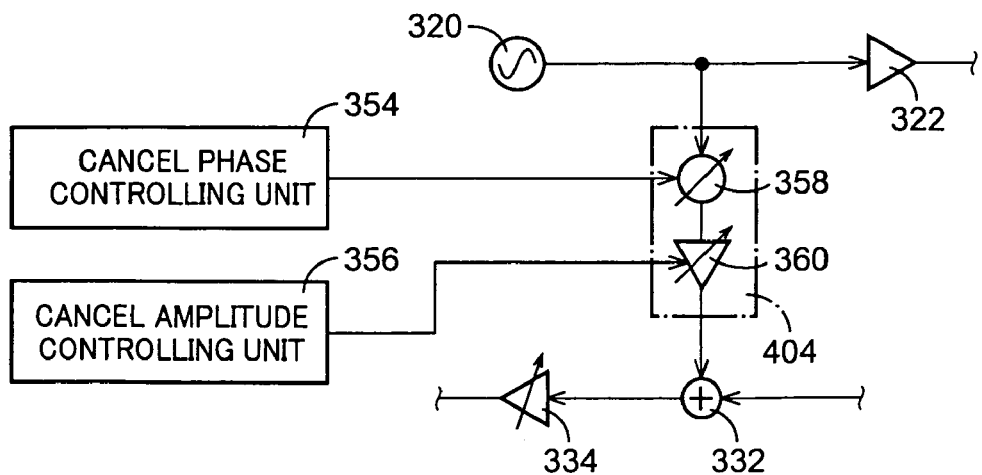
FIG. 20 is an illustration of a structure of a cancel signal generating unit used instead of the cancel signal generating unit in the radio-frequency tag communication device of FIG. 15.

FIG. 20 illustrates a structure of a cancel signal generating unit 404 used as an alternative to the cancel signal generating unit 330 in the radio-frequency tag communication device 312. As shown in FIG. 20, the cancel signal generating unit 404 of the present embodiment has a structure in which the cancellation attenuator 362 is excluded from the foregoing cancel signal generating unit 330, thereby allowing an output of the cancellation amplifier 360 to be input to the cancel signal synthesizing unit 332. In the cancel signal generating unit 404, the cancellation amplifier 360 as the variable gain amplifier controls an amplitude of the cancel signal in response to an amplitude control signal supplied from the cancel amplitude controlling unit 356.

Figure 21:
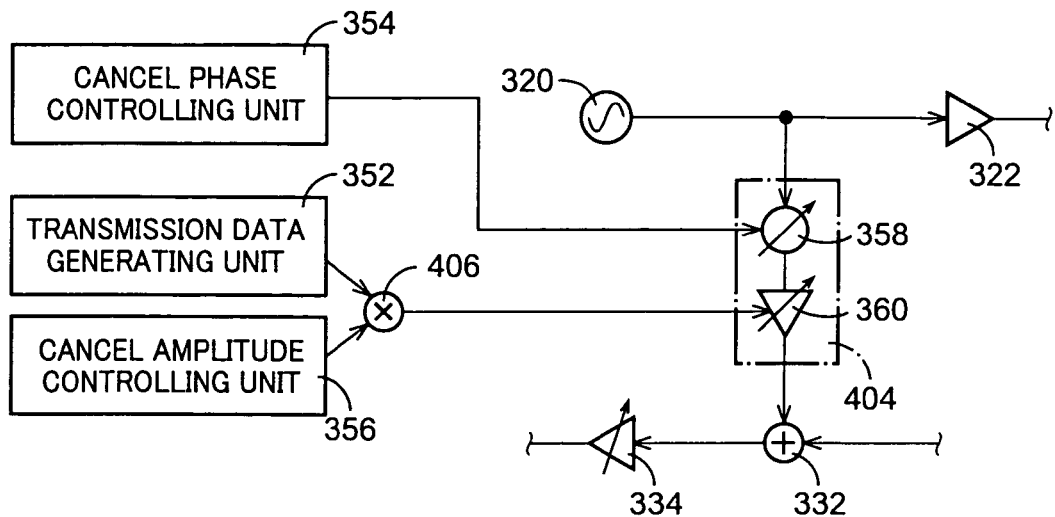
FIG. 21 is an illustration of a structure of a cancel signal generating unit used instead of the cancel signal generating unit in the radio-frequency tag communication device of FIG. 15.

As described above, the cancel signal generating unit 404 of the embodiment controls the amplitude of a carrier wave component in a transmitted signal transmitted from the array antenna 318 via the cancellation amplifier 360 to generate the cancel signal. Accordingly, an advantage is rendered that there is no need to additionally provide a variable attenuator or the like to control the amplitude of the cancel signal FIG. 21 illustrates a structure of the cancel signal generating unit 404 used instead of the cancel signal generating unit 330 in the radio-frequency tag communication device 312. As shown in FIG. 21, the cancel signal generating unit 404 of the present embodiment has a structured in which the cancellation attenuator 362 is excluded from the foregoing cancel signal generating unit 330, thereby input the output of the cancellation amplifier 360 to the cancel signal synthesizing unit 332.

In the present embodiment, a multiplying unit 406 multiplies an amplitude control signal output from the cancel amplitude controlling unit 356 by transmission data output from the transmission data generating unit 352 to supply to the cancel signal generating unit 404 i.e. the cancellation amplifier 360. The cancel signal generating unit 404 as the variable gain amplifier controls an amplitude of a cancel signal in response to a signal supplied from the multiplying unit 406. Thereby, the carrier wave is modulated based on the transmission data via the cancellation amplifier 360. Preferably, the above multiplying unit 406 is functionally included in a DSP (Digital Signal Processor) or the like to multiply the amplitude control signal by the transmission data by means of software processing.

In this manner, the cancel signal generating unit 404 of the present embodiment modulates the carrier wave based on the transmission data via the cancellation amplifier 360 to generate the cancel signal. This can maximally equalize the characteristics of noise included in a leakage signal from the transmission side with the characteristics of noise included in a cancel signal.

Figure 22:
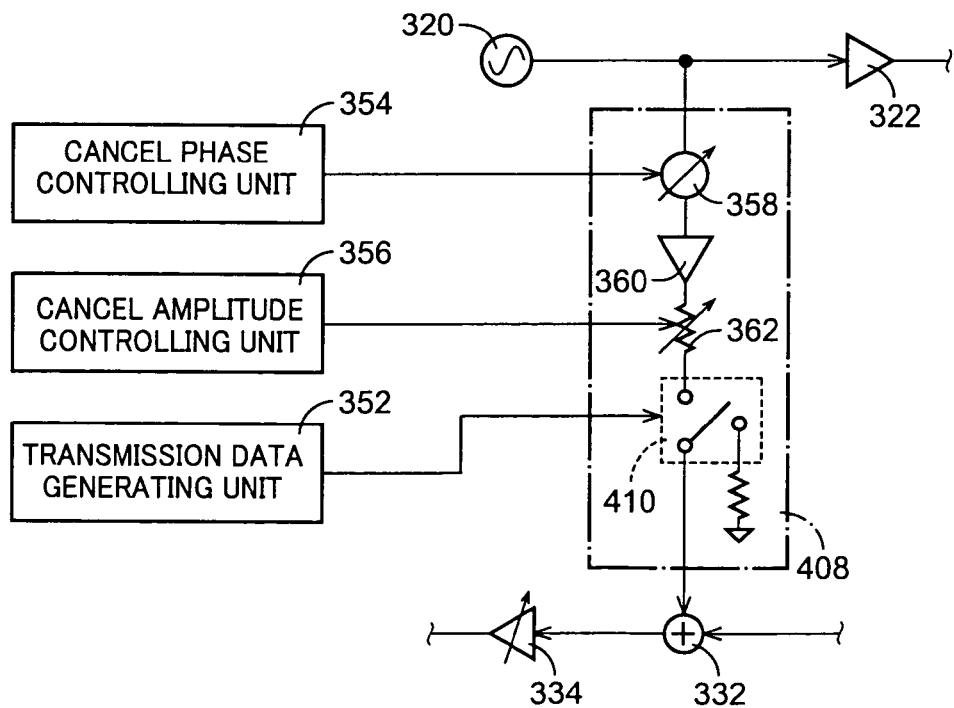
FIG. 22 is an illustration of a structure of a cancel signal generating unit used instead of the cancel signal generating unit in the radio-frequency tag communication device of FIG. 15.

FIG. 22 illustrates a structure of a cancel signal generating unit 408 used instead of the cancel signal generating unit 330 in the radio-frequency tag communication device 312. The cancel signal generating unit 408 is suitably used when the transmitted signal is wholly modulated by ASK (Amplitude Shift Keying), and includes an RF switch 410 in the signal transmission path between the cancellation attenuator 362 and the cancel signal synthesizing unit 332. The RF switch 410 is switchingly controlled in response to transmission data output from the transmission data generating unit 352. Based on the transmission data, the RF switch 410 performs ASK-modulation of a cancel signal generated by the cancel phase shifting unit 358, the cancellation amplifier 360, and the cancellation attenuator 362 to input the modulated signal to cancel signal synthesizing unit 332.

In this manner, the cancel signal generating unit 408 of the present embodiment performs the ASK-modulation of the carrier wave via the RF switch 410 based on the transmission data to generate the cancel signal. This can maximally equalize the characteristics of noise included in a leakage signal from the transmission side with the characteristics of noise included in a cancel signal.

Hereinabove, the preferred embodiments of the third invention have been described in detail with reference to the drawings. However, the third invention is not restricted to them and is implemented in still other modes.

For example, the foregoing embodiments have described the example in which the third invention is applied to the radio-frequency tag communication device 312 as the interrogator of the RFID system. However, the third invention is not restricted to that. The third invention can be widely applied to a radio-frequency communication device including a cancellation circuit for suppressing a leakage signal from a transmission side, based on a carrier wave component of a transmitted signal transmitted from a transmission antenna.

The foregoing embodiments have described the example in which the third invention is applied to the radio-frequency tag communication device 312 including the array antenna 318 used for both transmission and reception. However, the third invention is also suitably applied to a radio-frequency communication device including individually a transmission antenna and a reception antenna. Additionally, the third invention is suitably applied to a radio-frequency communication device including an antenna comprised of a single antenna element, which is not an array antenna.

In the foregoing embodiments, the transmission and reception phase controlling unit 350, the transmission data generating unit 352, the cancel phase controlling unit 354, and the cancel amplitude controlling unit 356 are independently provided as respectively separate controlling units. Alternatively, those controlling units may be included softwarewise as controlling functions of the DSP (Digital Signal Processor) or the like, for example.

In the foregoing embodiments, the modulating units based on transmission data are provided in the transmission and reception module 324 and the cancel signal generating unit 408. However, for example, the modulating units may be provided immediately after the local oscillator 320.

In the foregoing embodiment, the RF switch 410 in the cancel signal generating unit 408 is switchingly controlled in response to transmission data. Alternatively, the RF switch 410 may be controlled so as to be closed only during data reception.

Furthermore, although further detailed exemplification will not be given, the third invention may be embodied with various alterations added, without departing from the spirit of the invention.

Figure 23:
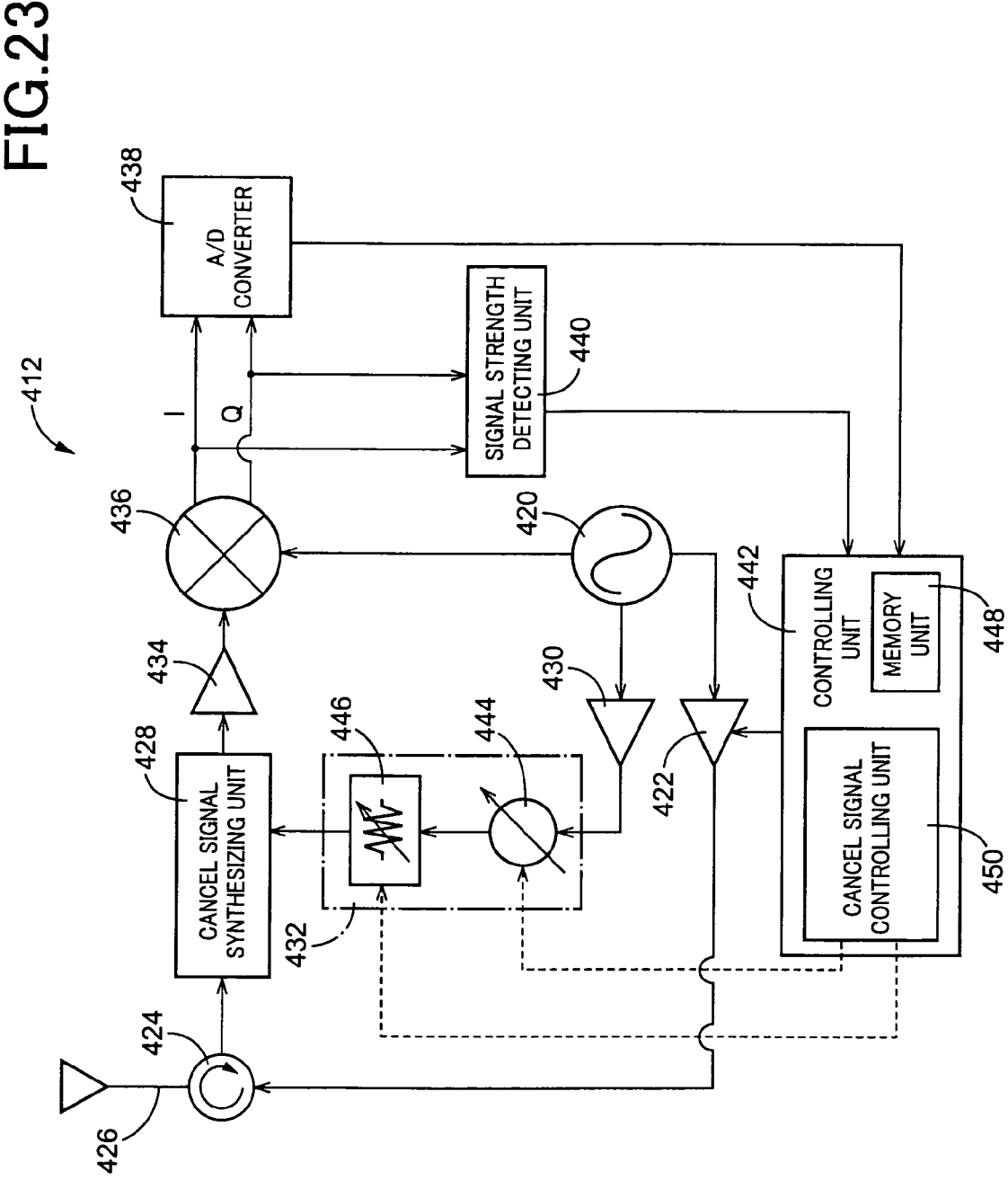
FIG. 23 is an illustration of a structure of a radio-frequency tag communication device as a preferable embodiment of a radio-frequency communication device according to a fourth invention.

FIG. 23 illustrates a structure of a radio-frequency tag communication device 412 as an embodiment of the fourth invention. As shown in FIG. 23, the radio-frequency tag communication device 412 of the present embodiment includes a local oscillator 420, a transmission amplifier 422, a transmission and reception separating unit 424, and an antenna 426 commonly used for transmission and reception. The local oscillator 420 generates a predetermined local signal corresponding to a carrier wave; the transmission amplifier 422 superimposes transmission information (transmission data) such as a predetermined command on the local signal output from the local oscillator 420 to supply it to the transmission and reception separating unit 424; the transmission and reception separating unit 424 supplies a transmitted signal output from the transmission amplifier 422 to the antenna 426, and supplies a received signal received by the antenna 426 to a cancel signal synthesizing unit 428; and the antenna 426 for transmission and reception transmits a transmitted signal supplied from a transmission-side circuit via the transmission and reception separating unit 424, and supplies the received signal to a reception-side circuit via the transmission and reception separating unit 424.

Additionally, the radio-frequency tag communication device 412 includes a local signal amplifying unit 430 that amplifies a local signal output from the local oscillator 420; a cancel signal generating unit 432 that generates a cancel signal for suppressing a leakage signal from the transmission side based on a signal supplied from the local signal amplifying unit 430, namely a carrier wave component of the transmitted signal; the cancel signal synthesizing unit 428 that synthesizes the cancel signal generated by the cancel signal generating unit 432 and the received signal received by the antenna 426; and a synthesized-signal amplifying unit 434 that amplifies a synthesized signal output from the cancel signal synthesizing unit 428.

Additionally, the radio-frequency tag communication device 412 includes a quadrature demodulating unit 436, an A/D converter 438, a signal strength detecting unit 440, and the controlling unit 442 as a central processing unit. The quadrature demodulating unit 436 executes quadrature-demodulation of the synthesized signal output from the synthesized-signal amplifying unit 434 based on the local signal output from the local oscillator 420; the A/D converter 438 digitally converts an I-phase signal (an in-phase component) and a Q-phase signal (a quadrature component) output from the quadrature demodulating unit 436 to supply it to the controlling unit 442; and the signal strength detecting unit 440 detects a signal strength of a direct current component in the demodulated signal demodulated by the quadrature demodulating unit 436 to supply a detection result to the controlling unit 442. As the transmission and reception separating unit 424, a well-known circulator, a well-known directional coupler, or the like can be preferably used.

The cancel signal generating unit 432 includes a variable phase shifting unit 444 as a cancel phase controlling unit, and a variable attenuating unit 446 as a cancel amplitude controlling unit. The variable phase shifting unit 444 controls a phase of the carrier wave component in the transmitted signal supplied from the local signal amplifying unit 430 in response to a phase-shift amount control signal, namely the cancel phase control signal supplied from the controlling unit 442; and the variable attenuating unit 446 controls an amplitude of the phase-controlled carrier wave component output from the variable phase shifting unit 444 in response to an attenuation-amount control signal, namely the cancel amplitude control signal supplied from the controlling unit 442. In other words, the variable phase shifting unit 444 and the variable attenuating unit 446 control the phase and/or the amplitude of a carrier wave component in a transmitted signal supplied from the local signal amplifying unit 430 to generate as a cancel signal. The cancel signal generated is input to the cancel signal synthesizing unit 428 to be synthesized with a received signal received by the antenna 426.

The controlling unit 442 is a so-called microcomputer system that performs signal processing according to a program prestored in a ROM, namely, a read-only memory or the like. The controlling unit 442 supplies transmission data to the transmission amplifier 422, controls a cancel signal generated by the cancel signal generating unit 432, and controls communication operation by the radio-frequency tag communication device 412. In order to execute those controls, the controlling unit 442 includes a memory unit 448 such as a RAM, namely a random access memory or the like, as well as functionally includes a cancel signal controlling unit 450, which will be described in detail below.

The memory unit 448 stores, as initial values, an amplitude and/or a phase of a cancel signal at a moment when the cancel signal is converged by a described-below control, as well as can store, as a control history, the phase and/or the amplitude of the cancel signal whenever necessary.

Hereinafter will be described in detail a cancel-signal control processing by the cancel signal controlling unit 450 included in the controlling unit 442 of the radio-frequency tag communication device 412 and a cancel-signal generating operation by the cancel signal generating unit 432 based on the above control processing.

The cancel signal controlling unit 450 controls the phase and/or the amplitude of the cancel signal such that a signal strength of the synthesized signal (a received signal with a cancel signal added) detected by the signal strength detecting unit 440 falls within a predetermined given range excluding zero. In other words, the cancel signal controlling unit 450 controls the cancel signal so as to necessarily and sufficiently eliminate a leakage signal included in the received signal, without completely eliminating the leakage signal therein.

Figure 24:
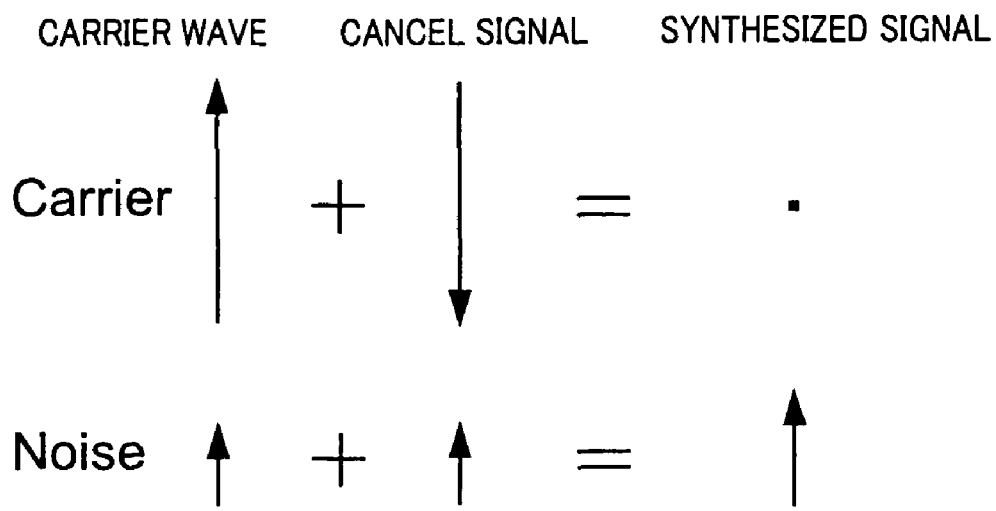
FIG. 24 is an illustration of a conventional control that completely eliminates a leakage signal included in a received signal.
Figure 25:
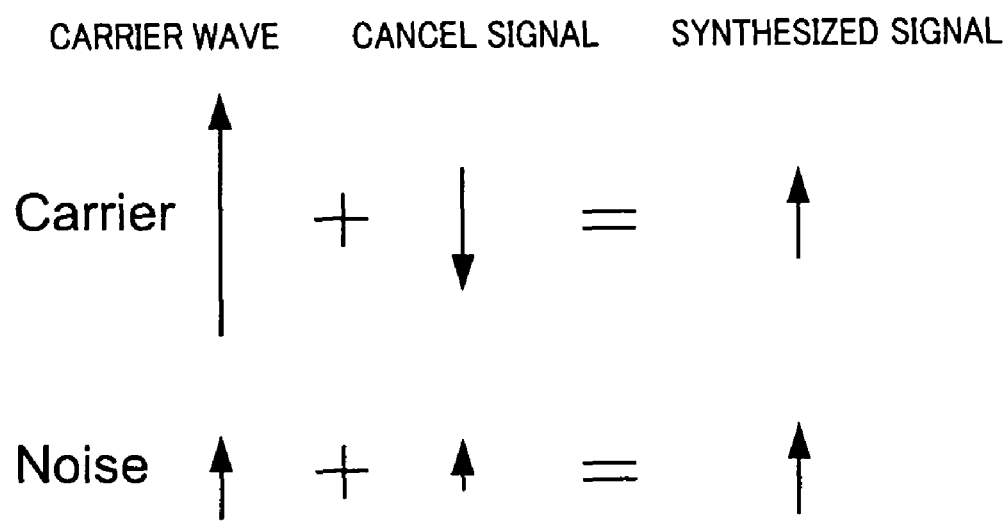
FIG. 25 is an illustration of a control of the present embodiment that does not completely eliminate a leakage signal included in a received signal.

FIGS. 24 and 25 illustrate a comparison between a conventional control that completely eliminates a leakage signal included in the received signal, and the present embodiment's control that necessarily and sufficiently eliminates the leakage signal without completely eliminating it. As shown in FIG. 24, in the conventional control completely eliminating the leakage signal in the received signal, there is generated and synthesized a cancel signal according to a magnitude of a carrier wave having an amplitude equal to that of the carrier wave and a phase opposite to that of the carrier wave. This causes a problem that, as the amplitude of a signal as an object for synthesis is larger, fluctuation upon adding becomes greater and noise in the cancel signal is significantly amplified. In the drawing, noise to be added is illustrated as an example having an equal phase, although a phase relationship is generally not specified. Noise is irregular, and adding a noise-including signal increases noise power.

Meanwhile, as shown in FIG. 25, the control by the present embodiment does not completely eliminate but necessarily and sufficiently eliminates a leakage signal included in a received signal, thereby allowing the amplitude of the cancel signal to be made smaller than that of the carrier wave to add to the carrier wave. Consequently, due to the smaller amplitude of the signal as the object for synthesis, fluctuation upon adding can be reduced and excessive amplification of noise included in the cancel signal is avoidable. Thus, according to the signal strengths of the received signal and a leakage signal from the transmission side included in the received signal, the amplitude of the cancel signal is appropriately determined. Thereby, the SN ratio can be increased as compared with the conventional control completely eliminating the leakage signal included in the received signal.

The signal strength detecting unit 440 can detect the signal strength of a received signal received by the antenna 426, that is, the signal strength of a received signal not synthesized with a cancel signal by the cancel signal synthesizing unit 428. Preferably, the cancel signal controlling unit 450 controls the amplitude of a cancel signal such that a signal strength of the cancel signal is smaller than that of the received signal detected by the signal strength detecting unit 440. Preferably, the cancel signal controlling unit 450 controls a cancel signal such that a signal strength of the synthesized signal detected by the signal strength detecting unit 440 is within a predetermined range and the signal strength of the cancel signal is maximally reduced. For example, the signal strength of the cancel signal is gradually increased from zero and fixed at a point in time when the signal strength of the synthesized signal detected by the signal strength detecting unit 440 falls within the predetermined range. Such a method realizes the above control.

Figure 26:
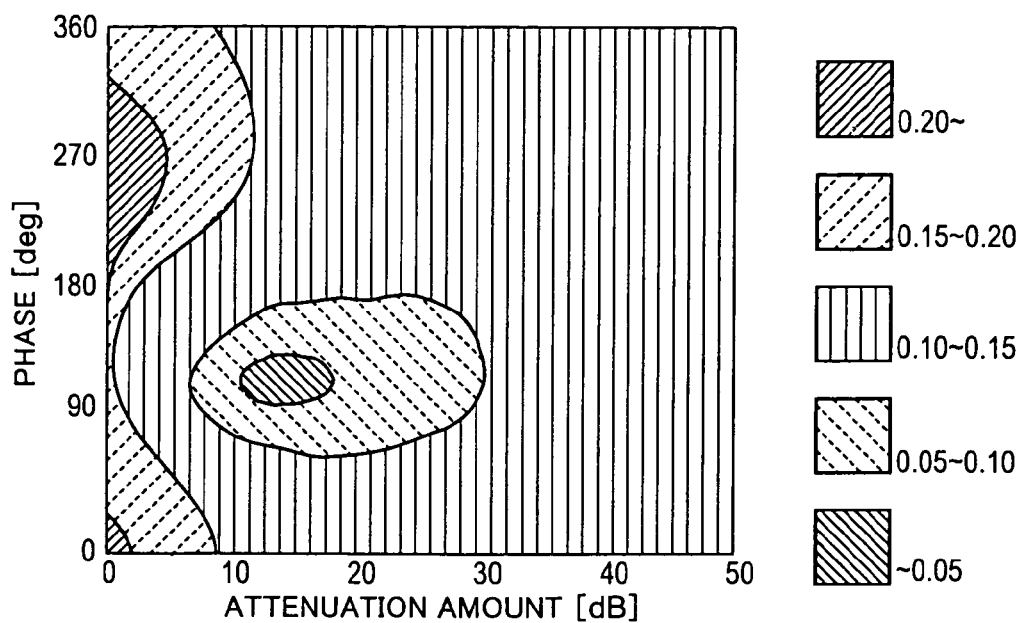
FIG. 26 is a diagram showing one example of a signal strength distribution of a synthesized signal detected by a signal strength detecting unit in the radio-frequency tag communication device of FIG. 23, and is an xy orthogonal projection of a three-dimensional orthogonal coordinate system with an x axis representing a signal strength of a cancel signal, a y axis representing a phase of the cancel signal, and a z axis representing a synthesized-signal strength.

FIG. 26 shows data measured in experiments conducted by the inventor of the present invention, as an example of a signal strength distribution of the synthesized signal detected by the signal strength detecting unit 440. It is an orthographic xy projection of the three-dimensional orthogonal coordinate system in which an x axis (a horizontal axis) represents the signal strength (dB) of a cancel signal with respect to the attenuation amount of the variable attenuating unit 446; a y axis (a vertical axis) represents the phase (deg) of the cancel signal with respect to the phase shift amount of the variable phase shifting unit 444; and a z axis (an axis vertical to an x-y plane) represents the strength of the synthesized signal.

The synthesized-signal strength corresponding to the z axis is a value equivalent to a square root ($=\{I^2+Q^2\}^{1/2}$) of a sum of respective squares of an I-phase signal and a Q-phase signal output from the quadrature demodulating unit 436. As shown on the right of the sheet, solid oblique lines extending from upper left to lower right indicate less than 0.05; broken oblique lines from upper left to lower right indicate 0.05 or more and 0.10 or less; solid lines from upper to lower indicate 0.10 or more and 0.15 or less; broken oblique lines from upper right to lower left indicate 0.15 or more and 0.20 or less; and solid oblique lines from upper right to lower left indicate 0.20 or more, as shown by hatching, respectively. In the example shown in FIG. 26, when the signal strength of the cancel signal is 8 to 18 (dB) and the phase thereof is 90 to 150 (deg), the signal strength of the synthesized signal is minimal. Thus, obviously, the leakage signal from the transmission side included in the received signal is most suppressed.

Figure 27:
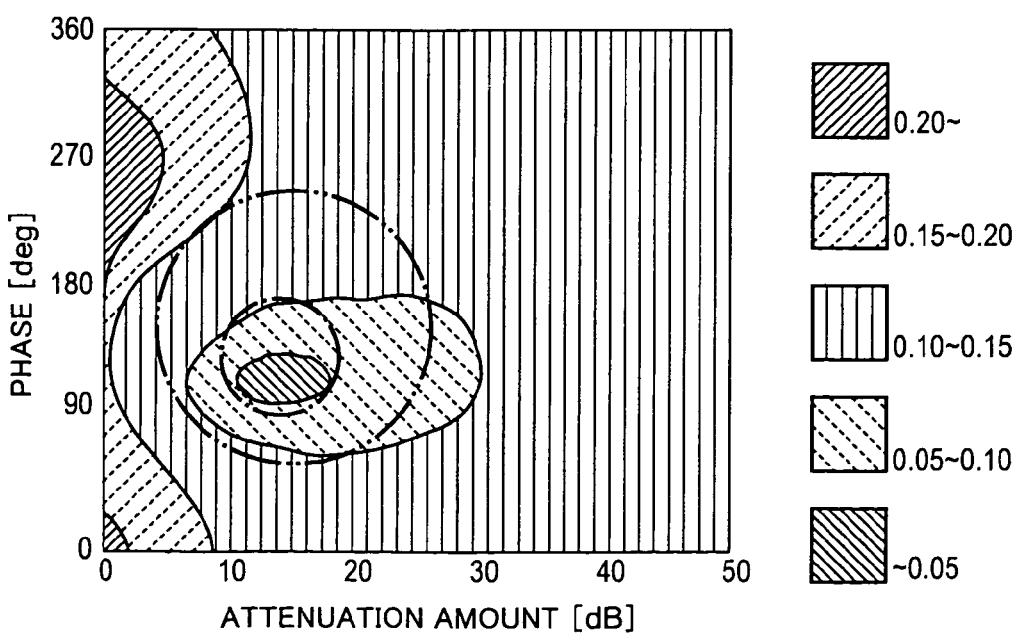
FIG. 27 is a diagram exemplifying a range suitable to determine a phase of and an amplitude of the cancel signal, regarding the signal strength distribution shown in FIG. 26.

FIG. 27 is an exemplification of a suitable range for determining the phase of and the amplitude of the cancel signal, regarding the signal strength distribution shown in FIG. 26. In the orthographic xy projection of the three-dimensional orthogonal coordinate system with the x axis representing the amplitude of the cancel signal, the y axis representing the phase of the cancel signal, and the z axis representing the synthesized-signal strength, preferably, the cancel signal controlling unit 450 controls the phase and/or the amplitude of the cancel signal as follows. That is, the cancel signal controlling unit 450 controls them within a predetermined range corresponding to a ringed region surrounding a predetermined region where the synthesized-signal strength detected by the signal strength detecting unit 440 is minimal.

For example, as shown in FIG. 27, the cancel signal controlling unit 450 controls the phase and/or the amplitude of the cancel signal so as to fall within a range between circles indicated by single-dotted and double-dotted chain lines, namely within a range corresponding to a ringed region outside the circle indicated by the single-dotted chain line and inside the circle indicated by the double-dotted chain line. In this mode, as described above, the range where the leakage signal from the transmission side included in the received signal is most suppressed (an inside of the circle indicated by the single-dotted chain line) is intentionally regarded as being outside the predetermined range. As described above by referring to FIGS. 24 and 25, this is intended to inhibit the SN ratio from being conversely reduced by an attempt to completely eliminate the leakage signal from the transmission side in the received signal.

Additionally, a region outside the circle indicated by the double-dotted chain line is not included in the predetermined range. The reason for this is that the leakage signal from the transmission side in the received signal is not be sufficiently suppressed within that region. Therefore, controlling the phase and/or the amplitude of the cancel signal so as to fall within the range between the circles indicated by the single-dotted and the double-dotted chain lines enables the leakage signal from the transmission side in the received signal to be necessarily and sufficiently eliminated, as well as enables reduction of the SN ratio to be maximally suppressed.

Figure 28:
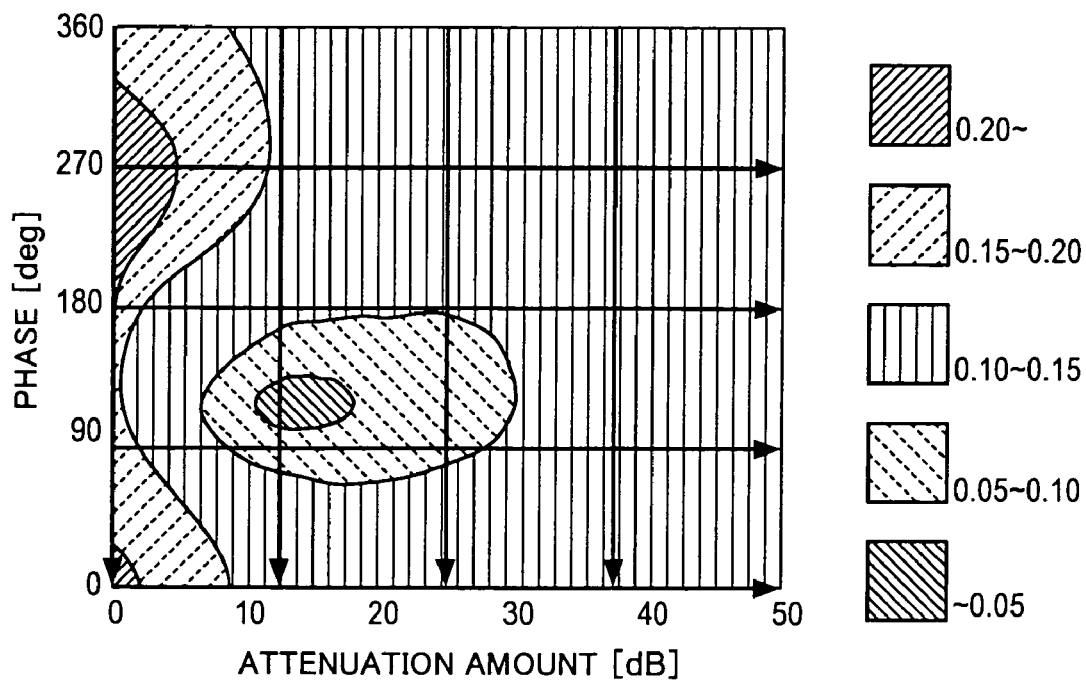
FIG. 28 is an illustration of a way to obtain suitable values of the phase of and the amplitude of the cancel signal, regarding the signal strength distribution shown in FIG. 26.

In addition, as shown in FIG. 28, preferably, the synthesized-signal strength corresponding to the phase shift amount of the variable phase shifting unit 444 and the attenuation amount of the variable attenuating unit 446 is obtained in advance, and an obtained result is stored as a map in the memory unit 448. This enables the cancel signal to be easily and immediately converged to a suitable value.

Figure 29:
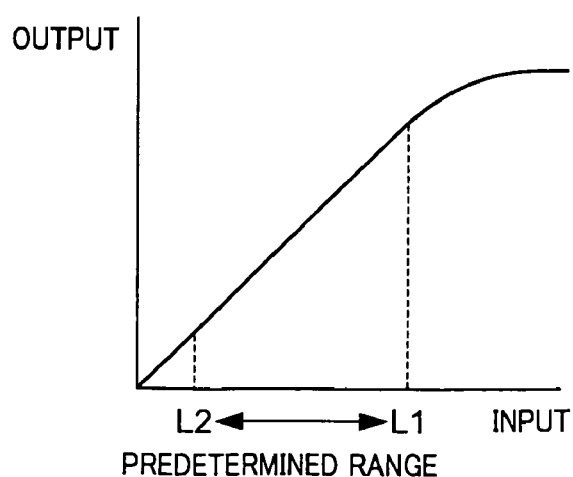
FIG. 29 is an illustration of a range that does not cause saturation of a synthesized-signal amplifying unit or a quadrature demodulating unit included in the radio-frequency tag communication device of FIG. 23.

Furthermore, preferably, the cancel signal controlling unit 450 controls the phase and/or the amplitude of the cancel signal so as to maximally reduce the signal strength of the cancel signal within a range that does not cause saturation of the synthesized-signal amplifying unit 434 or the quadrature demodulating unit 436. FIG. 29 illustrates the range inhibiting the saturation of the synthesized-signal amplifying unit 434 or the quadrature demodulating unit 436. In the drawing, an upper limit value L1 is a limit value that can secure linearities of the synthesized-signal amplifying unit 434 and the quadrature demodulating unit 436, and is determined depending on performances (specifications) of the units 434 and 436.

Additionally, a lower limit value L2 shown in FIG. 29 is 1/10 of the limit value securing the linearities of the synthesized-signal amplifying unit 434 and the quadrature demodulating unit 436. The cancel signal controlling unit 450 controls the phase and/or the amplitude of the cancel signal so as to maximally reduce the cancel-signal strength within a range from the lower limit value L2 to the upper limit value L1. This enables the leakage signal from the transmission side in the received signal to be necessarily and sufficiently eliminated, as well as enables reduction of the SN ratio to be maximally suppressed.

Preferably, upon initial setting of a cancel signal, the cancel signal controlling unit 450 transmits a carrier wave component via the antenna 426. Then, the cancel signal controlling unit 450 controls the cancel signal in accordance with a received signal received by the antenna 426 in response to the carrier wave component. In that situation, at a moment when the signal strength of a synthesized signal detected by the signal strength detecting unit 440 falls within the predetermined range, the memory unit 448 stores values of the amplitude and/or the phase of the cancel signal as initial values. After the initial setting of the cancel signal has been executed as above, the cancel signal controlling unit 450 controls the phase and/or the amplitude of the cancel signal based on the initial values stored in the memory unit 448. Upon the control of the phase and/or the amplitude of the cancel signal based on the initial values stored therein, if the signal strength of the synthesized signal detected by the signal strength detecting unit 440 falls outside the predetermined range, the cancel signal controlling unit 450 controls the phase and/or the amplitude of the cancel signal based on the control history stored in the memory unit 448. The above control can facilitate and accelerate the convergence of the cancel signal to a suitable value.

Figure 30:
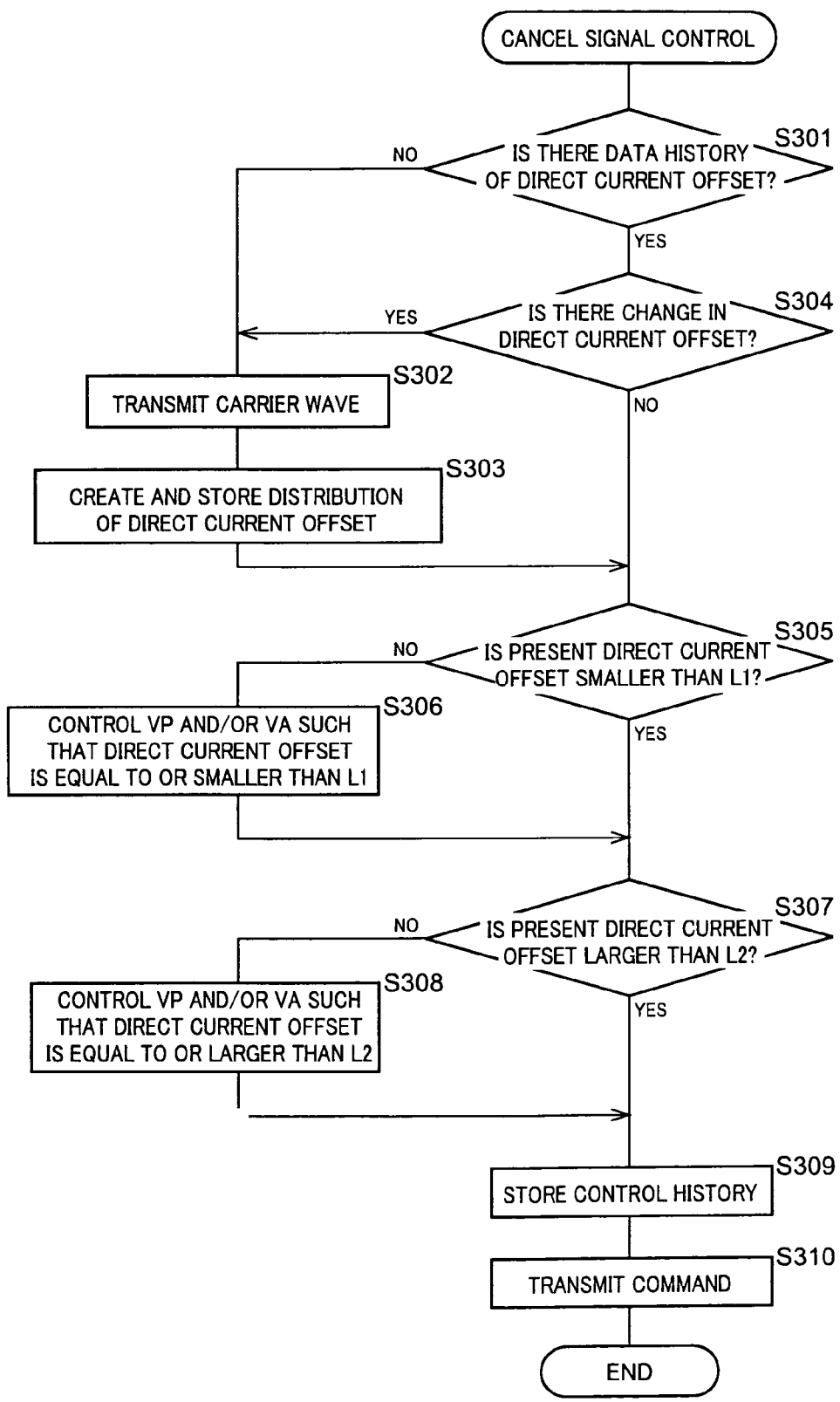
FIG. 30 is a flowchart explaining an outline of a cancel signal control by a controlling unit of the radio-frequency tag communication device of FIG. 23.

FIG. 30 is a flowchart explaining an outline of the cancel signal control executed by the controlling unit 442. A step sequence of the flowchart will be repeated in a predetermined cycle.

First, at step (hereinafter "step" will be omitted) S301, it is determined whether the memory unit 448 has the data record of a direct current component (a DC offset) therein. If the determination at S301 is negative, a carrier wave including no command is transmitted via the antenna 426 at S302. After that, at S303, the signal strength detecting unit 440 detects a signal strength of the direct current component in a received signal received by the antenna 426 in response to the carrier wave. Then, after a distribution of the direct current component corresponding to the detected signal strength is created and stored in the memory unit 448, processings at S305 and thereafter are executed.

In contrast, if the determination at S301 is positive, at S304, it is determined whether there is any change in the direct current component detected by the signal strength detecting unit 440 as compared with the data record of the direct current component stored in the memory unit 448. If the determination at S304 is positive, processings at s302 and thereafter are executed. Meanwhile, if negative, at S305, it is determined whether the signal strength of the direct current component detected by the signal strength detecting unit 440 is smaller than the predetermined upper limit value L1. If the determination at S305 is negative, at S306, the phase shift amount VP of the variable phase shifting unit 444 and/or the attenuation amount VA of the variable attenuating unit 446 are controlled so as to allow the signal strength of the direct current component detected by the signal strength detecting unit 440 to be equal to or less than L1. Then, processings at S307 thereafter are executed.

On the other hand, if the determination at S305 is positive, at S307, it is determined whether the direct current component detected by the signal strength detecting unit 440 is larger than the predetermined lower limit value L2. If the determination at S307 is negative, at S308, the phase shift amount VP of the variable phase shifting unit 444 and/or the attenuation amount VA of the variable attenuating unit 446 are controlled so as to allow the direct current component detected by the signal strength detecting unit 440 to be equal to or larger than L2. Then, processings at S309 thereafter are executed. Meanwhile, if the determination at S307 is positive, at S309, the memory unit 448 stores the control history of the control signal, that is, the phase shift amount VP of the variable phase shifting unit 444 and/or the attenuation amount VA of the variable attenuating unit 446. Next, at S310, the transmission amplifier 422 transmits a transmitted signal including a predetermined command via the antenna 426, thereby starting communication with the radio-frequency tag 14. Then, the present routine is ended. In the control described above, processings from S301 to S309 correspond to operations of the cancel signal controlling unit 450.

As described hereinabove, the present embodiment includes the cancel signal generating unit 432 generating a cancel signal for suppressing a leakage signal from the transmission side based on a carrier wave component of a transmitted signal transmitted via the antenna 426; the cancel signal synthesizing unit 428 synthesizing the cancel signal generated by the cancel signal generating unit 432 and a received signal received by the antenna 426; the signal strength detecting unit 440 detecting the signal strength of a synthesized signal synthesized by the cancel signal synthesizing unit 428; and the cancel signal controlling unit 450 controlling the phase and/or the amplitude of the cancel signal such that the signal strength detected by the signal strength detecting unit 440 falls within a predetermined designated range excluding zero (S301 to S309).

Thereby, the cancel signal is controlled such that the leakage signal included in the received signal is not completely but necessarily and sufficiently eliminated. This can suppress an increase in the level of noise included in the cancel signal, resulting in suppression of reduction of the SN ratio. Additionally, the leakage signal from the transmission side is not suppressed more than necessary. This can maximally reduce fluctuation of the synthesized signal due to fluctuation of the phase and the amplitude of the cancel signal, thus enabling stable reception. That is, there can be provided the radio-frequency tag communication device 412 that can improve the SN ratio while suitably eliminating the leakage signal from the transmission side in the received signal, thereby securing stable reception.

The present invention performs the cancel signal control so as to necessarily and sufficiently eliminate the leakage signal included in the received signal. Accordingly, the cancel signal control can be easier than the control of completely eliminating the leakage signal, as well as an amount of a cancel signal can be immediately determined.

The signal strength detecting unit 440 can detect the signal strength of a received signal received by the antenna 426. In addition, the cancel signal controlling unit 450 controls the amplitude of a cancel signal such that the signal strength of the cancel signal becomes smaller than the signal strength of the received signal detected by the signal strength detecting unit 440. As a result, suppressing the amplitude of the cancel signal to a small level can inhibit an increase in the level of noise in the cancel signal.

The cancel signal controlling unit 450 controls the cancel signal such that the signal strength of the synthesized signal detected by the signal strength detecting unit 440 falls within the predetermined range and the signal strength of the cancel signal is maximally reduced. This enables the cancel signal to be amplified by the practical mode so as to necessarily and sufficiently eliminate a leakage signal from the transmission side.

The present embodiment includes the quadrature demodulating unit 436 that executes quadrature demodulation of a synthesized signal output from the cancel signal synthesizing unit 428. The signal strength detecting unit 440 detects a signal strength of a direct current component in the demodulated signal demodulated by the quadrature demodulating unit 436. Accordingly, signal strengths of the synthesized signal and the received signal can be detected by the practical mode.

Upon the initial setting of a cancel signal, after a carrier wave is transmitted via the antenna 426, the cancel signal controlling unit 450 controls the cancel signal in accordance with a received signal received by the antenna 426 in response to the carrier wave. At the moment when the signal strength of a synthesized signal detected by the signal strength detecting unit 440 falls within the predetermined range, the memory unit 448 stores the amplitude and/or the phase of the cancel signal at that moment, as initial values. Thereby, the cancel signal can be amplified by the practical mode so as to necessarily and sufficiently eliminate a leakage signal from the transmission side.

After the initial setting of the cancel signal has been done, the cancel signal controlling unit 450 controls the phase and/or the amplitude of the cancel signal based on the initial values stored in the memory unit 448. Thus, the cancel signal controlling unit 450 enables the cancel signal to be maximally immediately converged based on the initial values stored in the memory unit 448.

The memory unit 448 can store the phase and/or the amplitude of the cancel signal as a control history of the cancel signal whenever necessary. The cancel signal controlling unit 450 controls the phase and/or the amplitude of the cancel signal based on the initial values stored in the memory unit 448. In this occasion, when the signal strength of the synthesized signal detected by the signal strength detecting unit 440 is outside the predetermined range, the cancel signal controlling unit 450 controls the phase and/or the amplitude of the cancel signal based on the control history stored in the memory unit 448. Consequently, the cancel signal controlling unit 450 enables the cancel signal to be maximally immediately converged based on the initial values and the control history stored in the memory unit 448.

The present embodiment includes the synthesized-signal amplifying unit 434 that amplifies a synthesized signal output from the cancel signal synthesizing unit 428, and the quadrature demodulating unit 436 that quadrature-demodulates the synthesized signal amplified by the synthesized-signal amplifying unit 434. The predetermined range is designated in advance so as to maximally reduce the signal strength of the cancel signal within the range that does not cause saturation of the synthesized-signal amplifying unit 434 or the quadrature demodulating unit 436. Accordingly, maximally reducing amplification of the cancel signal can inhibit an increase in the level of noise in the cancel signal.

The predetermined range corresponds to the ringed region surrounding the predetermined region where the synthesized-signal strength is minimal in the orthographic xy projection of the three-dimensional orthogonal coordinate system with the x axis representing the amplitude of the cancel signal, the y axis representing the phase thereof, and the z axis representing the synthesized-signal strength. Thus, reducing amplification of the cancel signal can inhibit noise included in the cancel signal from becoming larger.

The antenna 426 for transmission and reception, which is used both as a transmission antenna and a reception antenna, is connected to the circuits of the transmission side and the reception side via the transmission and reception separating unit 424. Thereby, the radio-frequency tag communication device 412 with the practical transmission and reception antenna can improve the SN ratio while suitably eliminating a leakage signal from the transmission side included in the received signal.

The radio-frequency tag communication device 412 of the present embodiment transmits a predetermined transmitted signal via the antenna 426 to the radio-frequency tag 14 as the communication object, and receives, via the antenna 426, a reply signal returned from the radio-frequency tag 14 in response to the transmitted signal. In this manner, the radio-frequency tag communication device 412 communicates information with the radio-frequency tag 14. Thereby, in the radio-frequency tag communication device 412 particularly greatly influenced by a leakage signal included in the received signal from the transmission side, the SN ratio can be improved while suitably eliminating the leakage signal therefrom in the received signal.

Next, another preferred embodiment of the radio-frequency communication device according to the fourth invention will be described in detail with reference to a drawing. In the description below, elements common among the embodiments are given the same reference numerals and descriptions thereof will be omitted.

Figure 31:
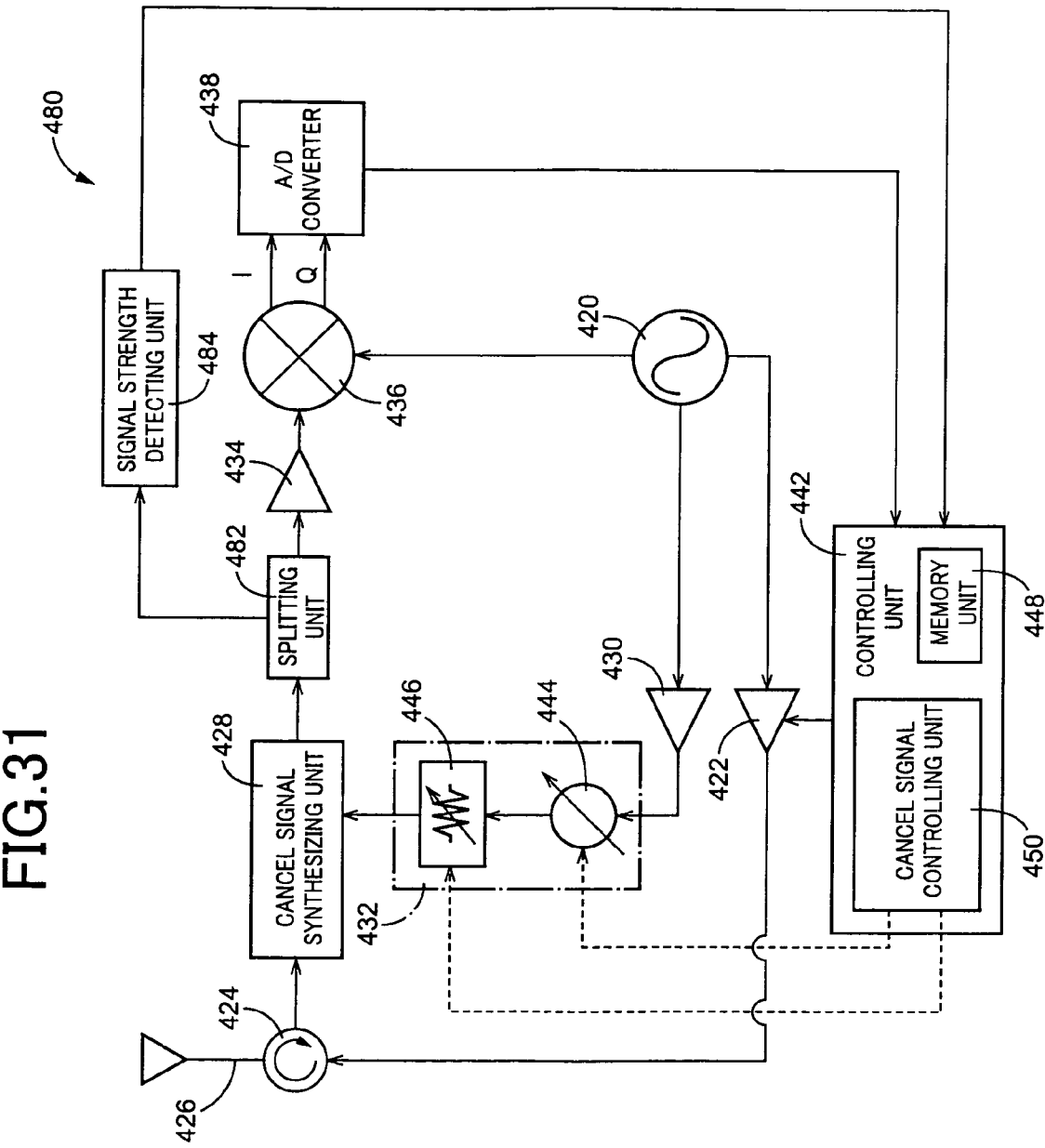
FIG. 31 is an illustration of a structure of a radio-frequency tag communication device as another preferable embodiment of the radio-frequency communication device according to the fourth invention.

FIG. 31 illustrates a structure of a radio-frequency tag communication device 480 as an embodiment of the radio-frequency communication device of the fourth invention. As shown in FIG. 31, the radio-frequency tag communication device 480 of the present embodiment includes a splitting unit 482 that splits a synthesized signal output from the cancel signal synthesizing unit 428 into parts fed to a signal strength detecting unit 484 and to the synthesized-signal amplifying unit 434, and the signal strength detecting unit 484 that detects the signal strength of the synthesized signal split by the splitting unit 482 to supply a result of the detection to the controlling unit 442.

As the splitting unit 482, for example, a coupler (20:1 dB) is preferably used, in which 1 to 20 dB of the synthesized signal supplied to the synthesized signal amplifying unit 434 is fed to the signal strength detecting unit 484. The signal strength detecting unit 482 detects a signal strength of a direct current component in the synthesized signal by diode detection or the like, for example. In this case, the cancel signal controlling unit 450 included in the radio-frequency tag communication device 480 preferably controls the phase and/or the amplitude of the cancel signal as below. That is, the cancel signal controlling unit 450 controls the phase and/or the amplitude of the cancel signal such that the signal strength detected by the signal strength detecting unit 484 is less than a saturation-starting input value of the synthesized-signal amplifying unit 434 or the quadrature demodulating unit 436 and falls within a range from the saturation-starting input value to 3 or 10 dB.

As described above, the present embodiment includes the splitting unit 482 splitting the synthesized signal output from the cancel signal synthesized unit 428 into parts. The signal strength detecting unit 484 detects the signal strength of the synthesized signal split by the splitting unit 482, thus enabling the signal strengths of the synthesized signal and the received signal to be detected by the practical mode.

The predetermined range is less than the saturation-starting input value of the synthesized-signal amplifying unit 434 or the quadrature demodulating unit 436 and falls within the range from the saturation-starting input value to 3 or 10 dB. This can suitably prevent saturation of the synthesized-signal amplifying unit 434 or the quadrature demodulating unit 436, as well as can necessarily and sufficiently eliminate a leakage signal from the transmission side.

Hereinabove, the preferred embodiments of the fourth invention have been described in detail with reference to the drawings. However, the fourth invention is not restricted to them and is implemented in still other modes.

For example, the foregoing embodiment has described the example in which the fourth invention is applied to the radio-frequency tag communication device 412 as the interrogator of the RFID system. However, the fourth invention is not restricted to that and can be widely applied to a radio-frequency communication device including a cancellation circuit for suppressing a leakage signal from a transmission side based on a carrier wave component of a transmitted signal transmitted via a transmission antenna.

The foregoing embodiment has described the example in which the fourth invention is applied to the radio-frequency tag communication device 412 including the antenna 426 commonly used for both transmission and reception. However, the fourth invention can also be suitably applied to a radio-frequency communication device including individually a transmission antenna and a reception antenna.

In the foregoing embodiment, the cancel signal controlling unit 450 controls the cancel signal before communicating with the radio-frequency tag 14. However, the cancel signal may be controlled in real time during communication with the radio-frequency tag 14.

Although not particularly referred to in the foregoing embodiments, upon control of the cancel signal by the cancel signal controlling unit 450, the signal strength of a synthesized signal detected by the signal strength detecting unit 440 or the like may become transiently zero. That is, the cancel signal controlling unit 450 has only to control such that a signal strength detected by the signal strength detecting unit 440 or the like is converged within the predetermined range excluding zero. The fourth invention does not prohibit output of a cancel signal completely suppressing a leakage signal from the transmission side included in a received signal, through the cancel signal control.

Furthermore, although further detailed exemplification will not be given, the fourth invention may be embodied with various alterations added, without departing from the scope of the invention.

The invention claimed is:

1. A radio-frequency communication device comprising a splitting unit splitting a carrier wave component of a transmitted signal transmitted via a transmission antenna, an amplitude controlling unit controlling an amplitude of the carrier wave component split by the splitting unit, a phase controlling unit controlling a phase of the carrier wave component split by the splitting unit, and a cancel signal synthesizing unit adding a cancel signal generated with the carrier wave component via the amplitude controlling unit and the phase controlling unit to a received signal received via a reception antenna, the radio-frequency communication device characterized by:
a cancel signal supply suppressing unit that selectively suppresses supply of the cancel signal to the cancel signal synthesizing unit;
a received-signal terminating unit that selectively terminates a received-signal input terminal from the reception antenna to the cancel signal synthesizing unit;
a signal strength detecting unit that detects strengths of the cancel signal, the received signal, and a synthesized signal of the cancel signal and the received signal;
a memory unit that stores the strength of the received signal detected by the signal strength detecting unit;
a signal strength comparing unit that compares the strength of the received signal read out from the memory unit with the strength of the cancel signal detected by the signal strength detecting unit; and
a cancel signal controlling unit that controls an amplitude and a phase of the cancel signal via the amplitude controlling unit and the phase controlling unit based on a comparison result by the signal strength comparing unit;
wherein the strength of the cancel signal is detected by the signal strength detecting unit by detecting the strength of the synthesized signal when the received-signal terminating unit terminates the received signal input terminal;
the strength of the received signal is detected by the signal strength detecting unit by detecting the strength of the synthesized signal when the cancel signal supply suppressing unit suppresses the supply of the cancel signal; and
first, in a state allowing the cancel signal supply suppressing unit to suppress cancel signal supply to the cancel signal synthesizing unit, the cancel signal controlling unit allows the signal strength detecting unit to detect the strength of the received signal and then allows the memory unit to store a result of the detection;
next, in a state releasing the suppression of the cancel signal supply to the cancel signal synthesizing unit and allowing the received-signal terminating unit to terminate the received-signal input terminal, the cancel signal controlling unit controls the amplitude of the cancel signal such that the strength of the cancel signal detected by the signal strength detecting unit is made equal to the strength of the received signal stored in the memory unit; and
next, in a state releasing the termination of the received-signal input terminal by the received-signal terminating unit, the cancel signal controlling unit separately controls a phase of the cancel signal from the amplitude of the cancel signal such that the strength of the synthesized signal of the received signal and the cancel signal detected by the signal strength detecting unit is maximally reduced.

2. The radio-frequency communication device of claim 1, wherein the received-signal terminating unit includes a circuit switching unit that switches a circuit between the reception antenna and the received-signal input terminal, and a termination resistance connected to the circuit switching unit; and upon detection of the strength of the cancel signal, the circuit switching unit connects the received-signal input terminal to the termination resistance.

3. The radio-frequency communication device of claim 2, wherein the received-signal terminating unit includes, at a side of the reception antenna relative to the circuit switching unit and the termination resistance, a second circuit switching unit that switches a circuit between the reception antenna and the circuit switching unit and a second termination resistance connected to the second circuit switching unit, and upon detection of the strength of the cancel signal, the second circuit switching unit connects the reception antenna and the second termination resistance.

4. The radio-frequency communication device of claim 1, wherein upon detection of the strength of the received signal, the cancel signal supply suppressing unit controls the amplitude of the carrier wave component such that an output from the amplitude controlling unit is maximally reduced.

5. The radio-frequency communication device of claim 1, wherein the cancel signal supply suppressing unit includes a third circuit switching unit that switches a circuit between the amplitude controlling unit and a cancel signal input terminal and a third termination resistance connected to the third circuit switching unit, the cancel signal supply suppressing unit connecting the cancel signal input terminal and the third termination resistance upon detection of the strength of the received signal.

6. The radio-frequency communication device of claim 1, wherein the transmission antenna and the reception antenna are individually provided as separate antennas.

7. The radio-frequency communication device of claim 1, wherein the transmission antenna and the reception antenna are integrally provided as an antenna commonly used for transmission and reception.

8. The radio-frequency communication device of claim 1, wherein upon detection of the strength of the cancel signal, the transmission antenna transmits a transmitted signal having a signal strength smaller than that of a transmitted signal to communicate with a predetermined communication object.

9. The radio-frequency communication device of claim 1, wherein the cancel signal controlling unit executes a cancel signal control prior to transmission of information to the predetermined communication object.

10. The radio-frequency communication device of claim 1, wherein the cancel signal controlling unit executes a cancel signal control during transmission of information to the predetermined communication object.

11. The radio-frequency communication device of claim 1, wherein the cancel signal controlling unit executes a cancel signal control at every switching of a frequency of the transmitted signal.

12. The radio-frequency communication device of claim 1, wherein the cancel signal controlling unit executes a cancel signal control, when the strength of the synthesized signal of the received signal and the cancel signal detected by the signal strength detecting unit is equal to or larger than a predetermined value.

13. The radio-frequency communication device of claim 1, wherein the transmission antenna includes an array antenna having a plurality of transmission antenna elements as the transmission antenna and a transmission phase controlling unit that controls respective phases of transmitted signals sent to the respective transmission antenna elements to control a transmission directivity, and upon a phase change of the transmission phase controlling unit, the cancel signal controlling unit executes a cancel signal control.

14. The radio-frequency communication device of claim 1, wherein the reception antenna includes an array antenna having a plurality of reception antenna elements and a reception phase controlling unit that controls respective phases of received signals sent from the respective reception antenna elements to control a reception directivity, and upon a phase change of the reception phase controlling unit, the cancel signal controlling unit executes a cancel signal control.

15. The radio-frequency communication device of claim 1, further comprising a homodyne detection circuit as a demodulating unit for the received signal.

16. The radio-frequency communication device of claim 1, wherein the radio-frequency communication device is a radio-frequency communication tag device that transmits a predetermined transmitted signal via the transmission antenna to a radio-frequency tag, and receives, via the reception antenna, a reply signal returned from the radio-frequency tag in response to the transmitted signal to perform information communication with the radio-frequency tag.

* * * * *